United States Patent
Yao et al.

(10) Patent No.: US 11,921,265 B2
(45) Date of Patent: *Mar. 5, 2024

(54) OPTICAL LENS COMPRISING TWO LENS GROUPS OF −+ REFRACTIVE POWERS HAVING SIX LENSES OF −−+−++, −+++−++, −−++−+ OR −−+−+− REFRACTIVE POWERS

(71) Applicant: Ningbo Sunny Automotive Optech Co., Ltd., Ningbo (CN)

(72) Inventors: Bo Yao, Ningbo (CN); Qiansen Xie, Ningbo (CN); Dongfang Wang, Ningbo (CN)

(73) Assignee: Ningbo Sunny Automotive Optech Co., Ltd. (CN)

( * ) Notice: Subject to any disclaimer, the term of this patent is extended or adjusted under 35 U.S.C. 154(b) by 20 days.

This patent is subject to a terminal disclaimer.

(21) Appl. No.: 17/580,188

(22) Filed: Jan. 20, 2022

(65) Prior Publication Data

US 2022/0137376 A1 May 5, 2022

Related U.S. Application Data

(63) Continuation of application No. 16/349,891, filed as application No. PCT/CN2017/111193 on Nov. 15, 2017, now Pat. No. 11,275,233.

(30) Foreign Application Priority Data

Nov. 15, 2016 (CN) .......................... 201611032907.1

(51) Int. Cl.
G02B 13/00 (2006.01)
G02B 13/02 (2006.01)
G02B 15/177 (2006.01)

(52) U.S. Cl.
CPC ...... *G02B 13/0055* (2013.01); *G02B 13/0045* (2013.01); *G02B 13/02* (2013.01); *G02B 15/177* (2013.01)

(58) Field of Classification Search
CPC ................... G02B 13/0055; G02B 13/0045; G02B 13/02; G02B 15/177; G02B 9/62
See application file for complete search history.

(56) References Cited

U.S. PATENT DOCUMENTS 9,715,088 B1   7/2017 Yang
2011/0317285 A1   12/2011 Ohashi et al.
(Continued)

FOREIGN PATENT DOCUMENTS

CN   102455493 A   5/2012
CN   103676092 A   3/2014
(Continued)

*Primary Examiner* — Wen Huang
(74) *Attorney, Agent, or Firm* — Barnes & Thornburg LLP

(57) ABSTRACT

An optical lens comprises: a first lens (L1) having a negative focal power; a second lens (L2); a third lens (L3); a fourth lens (L4); a fifth lens (L5), wherein the fourth lens (L4) and the fifth lens (L5) forms an achromatic lens group; and a sixth lens (L6), wherein the first lens (L1), the second lens (L2), the third lens (L3), the fourth lens (L4), the fifth lens (L5), and the sixth lens (L6) are sequentially disposed along a direction from an object side to an image side, wherein the first lens (L1) has at least one object surface (S1) facing the object side, and the object surface (S1) of the first lens (L1) is convex, and wherein the second lens (L2) has at least one image surface (S4) facing the image side, and the image surface (S4) of the second lens (L2) is convex so as to facilitate forming a concentric circle structure.

21 Claims, 11 Drawing Sheets

(56) References Cited

U.S. PATENT DOCUMENTS

| | | |
|---|---|---|
| 2012/0105973 A1 | 5/2012 | Peng et al. |
| 2014/0029115 A1* | 1/2014 | Liao .................. G02B 1/04 |
| | | 359/713 |
| 2015/0049394 A1 | 2/2015 | Tsai et al. |
| 2015/0219883 A1 | 8/2015 | Mogi |
| 2015/0268446 A1 | 9/2015 | Chen et al. |
| 2015/0309289 A1 | 10/2015 | Nakamura |
| 2016/0195716 A1 | 7/2016 | Nakanuma |
| 2016/0216484 A1 | 7/2016 | Chen et al. |
| 2016/0282588 A1 | 9/2016 | Sekine et al. |
| 2017/0269334 A1 | 9/2017 | Usui et al. |

FOREIGN PATENT DOCUMENTS

| | | |
|---|---|---|
| CN | 103777329 A | 5/2014 |
| CN | 104238082 A | 12/2014 |
| CN | 104459948 A | 3/2015 |
| CN | 104865682 A | 8/2015 |
| CN | 104919353 A | 9/2015 |
| CN | 104950423 A | 9/2015 |
| CN | 104991331 A | 10/2015 |
| CN | 105487209 A | 4/2016 |
| CN | 105911671 A | 8/2016 |
| CN | 106054355 A | 10/2016 |
| CN | 107203032 A | 9/2017 |
| IN | 105652419 A | 6/2016 |
| JP | H01185330 A | 7/1989 |
| JP | 2004341376 A | 12/2004 |
| JP | 2007279555 A | 10/2007 |
| TW | I480576 B | 4/2015 |

\* cited by examiner

OPTICAL LENS COMPRISING TWO LENS GROUPS OF −+ REFRACTIVE POWERS HAVING SIX LENSES OF −−+−++, −+++−++, −−++−+ OR −−+−+− REFRACTIVE POWERS

CROSS-REFERENCE TO RELATED APPLICATIONS

This application is a continuation of the U.S. patent application Ser. No. 16/349,891, filed on May 14, 2019, which is a national stage of International Application No. PCT/CN2017/111193 filed on Nov. 15, 2017, claiming priority to Chinese Patent Application No. 201611032907.1, filed with the China National Intellectual Property Administration (CNIPA) on Nov. 15, 2016. The contents of the patent applications are incorporated herein by reference in their entirety.

TECHNICAL FIELD

The present disclosure relates to the technical field of optical imaging, and more particularly relates to an optical lens for optical imaging.

TECHNICAL BACKGROUND

In recent years, with the development of electronic technology, the application range of the cameras is becoming wider and wider. In-vehicle cameras are one of the important aspects, and optical lenses are an important component in the in-vehicle cameras.

At present, a conventional car camera has different functions due to different installation positions. For example, a front-view camera usually needs to observe distant objects, and thus the focal length of the optical lens is required to be longer. However, this makes the field of view of the lens to be limited, and the field of view is smaller so that a larger angle range around the vehicle is difficult to be observed. In order to enable the environmental conditions within the larger angle range around the vehicle to be observed at the same time, it is necessary to incorporate an optical lens with a larger field of view, such as a wide-angle lens.

At present, a conventional driving assistance system uses a front-view camera lens to capture and observe distant objects, and incorporates a wide-angle lens with a short focal length and a wide field of view to observe the environment conditions within a large angle range around the vehicle. Then, the images captured by the two lenses are combined by means of software to obtain a wide-range and long-distance image of the entire region. However, the entire driving assistance system needs to use two or more optical lenses to cooperate with each other, so that the cost of the lenses increases and the space occupied by the lenses in the vehicle body increases. Moreover, the captured images need to be stitched by means of software, so that the components and operation steps of the auxiliary system may be increased.

SUMMARY OF THE DISCLOSURE

An advantage of the present disclosure is to provide an optical lens, wherein the optical lens combines with telephoto and wide-angle integrated features while achieving both conventional telephoto and wide-angle functions through one lens.

An advantage of the present disclosure is to provide an optical lens, wherein the optical lens has a longer focal length and a larger viewing distance in a smaller range of field of view near its center.

An advantage of the present disclosure is to provide an optical lens, wherein the optical lens has a larger overall field of view and a wide viewing range.

An advantage of the present disclosure is to provide an optical lens, wherein the optical lens has higher resolution.

An advantage of the present disclosure is to provide an optical lens, wherein the optical lens has a larger aperture.

An advantage of the present disclosure is to provide an optical lens, wherein the optical lens is suitable for an in-vehicle environment, and both telephoto and wide-angle functions can be simultaneously realized by one lens, thereby reducing the lens cost of the driving system.

An advantage of the present disclosure is to provide an optical lens, wherein the optical lens has a central region of high angular resolution and high environmental recognition.

In order to achieve at least one of the above objects, the present disclosure provides an optical lens comprising: a first lens, the first lens having a negative focal power, an object surface of the first lens being convex and an image surface of the first lens being concave; a second lens, an object surface of the second lens being concave and an image surface of the second lens being convex; a third lens, the third lens having a positive focal power, an object surface of the third lens being convex and an image surface of the third lens being convex; a fourth lens; a fifth lens; and a sixth lens, where a maximum field of view FOVm of the optical lens and an image height Ym corresponding to the maximum field of view of the optical lens satisfy: $(FOVm \times F)/Ym \geq 45°$.

According to some embodiments, in the optical lens, the second lens has a negative focal power.

According to some embodiments, in the optical lens, the second lens has a positive focal power.

According to some embodiments, in the optical lens, the fourth lens has a negative focal power, an object side surface of the fourth lens is concave and an image side surface of the fourth lens is concave.

According to some embodiments, in the optical lens, the fourth lens has a negative focal power, an object side surface of the fourth lens is convex and an image side surface of the fourth lens is concave.

According to some embodiments, in the optical lens, the fourth lens has a positive focal power, an object side surface of the fourth lens is convex and an image side surface of the fourth lens is convex.

According to some embodiments, in the optical lens, the fifth lens has a positive focal power, an object side surface of the fifth lens is convex and an image side surface of the fifth lens is convex.

According to some embodiments, in the optical lens, the fifth lens has a positive focal power, an object side surface of the fifth lens is convex and an image side surface of the fifth lens is concave.

According to some embodiments, in the optical lens, the fifth lens has a negative focal power, an object side surface of the fifth lens is concave and an image side surface of the fifth lens is convex.

According to some embodiments, in the optical lens, the sixth lens has a positive focal power, an object side surface of the sixth lens is convex and an image side surface of the sixth lens is convex.

According to some embodiments, in the optical lens, the sixth lens has a positive focal power, an object side surface of the sixth lens is convex and an image side surface of the sixth lens is concave.

According to some embodiments, in the optical lens, the sixth lens has a negative focal power, an object side surface of the sixth lens is concave and an image side surface of the sixth lens is convex.

According to some embodiments, in the optical lens, the sixth lens has a negative focal power, an object side surface of the sixth lens is concave and an image side surface of the sixth lens is concave.

According to some embodiments, in the optical lens, the fourth lens and the fifth lens forms an achromatic lens group, and one of them has a positive focal power and the other has a negative focal power.

According to some embodiments, in the optical lens, the fourth lens and the fifth lens are glued to each other.

According to some embodiments, in the optical lens, a radius of curvature R1 of the object surface of the first lens, a radius of curvature R2 of the image surface of the first lens, and a center thickness d1 of the first lens satisfy: $0.5 \leq R1/(R2+d1) \leq 1.5$.

According to some embodiments, in the optical lens, a radius of curvature R3 of the object surface of the second lens, a radius of curvature R4 of the image surface of the second lens, and a center thickness d2 of the second lens satisfy: $0.45 \leq |R4|/(|R3|+d2) \leq 1.3$.

According to some embodiments, in the optical lens, a focal length F1 of the first lens and an overall focal length F of the optical lens satisfy: $-3.5 \leq F1/F \leq -1$.

According to some embodiments, in the optical lens, a focal length F2 of the second lens and an overall focal length F of the optical lens satisfy: $|F2/F| \geq 5$.

According to some embodiments, in the optical lens, a total track length TTL of an optical system of the optical lens and an overall focal length F of the optical lens satisfy: $2.0 \leq TTL/F \leq 6.0$.

According to some embodiments, in the optical lens, a maximum field of view FOVm of the optical lens and an image height Ym corresponding to the maximum field of view of the optical lens satisfy: $(FOVm \times F)/Ym \geq 58.952°$.

According to some embodiments, in the optical lens, the fourth lens has an object surface and an image surface, the object surface of the fourth lens faces the object side, the image surface of the fourth lens faces the image side, the object surface of the fourth lens is concave, and the image surface of the fourth lens is concave, where the fifth lens has an object surface and an image surface, the object surface of the fifth lens faces the object side, and the image surface of the fifth lens faces the image side, and wherein the object surface of the fifth lens is convex, the image surface of the fifth lens is convex, and the sixth lens has a positive focal power.

According to some embodiments, in the optical lens, the fourth lens has an object surface and an image surface, the object surface of the fourth lens faces the object side, the image surface of the fourth lens faces the image side, the object surface of the fourth lens is convex, the image surface of the fourth lens is concave, the fifth lens has an object surface and an image surface, the object surface of the fifth lens faces the object side, the image surface of the fifth lens faces the image side, the object surface of the fifth lens is convex, the image surface of the fifth lens is convex, the sixth lens has an object surface and an image surface, the object surface of the sixth lens faces the object side, the image surface faces the image side, the object surface of the sixth lens is convex, the image surface of the sixth lens is convex, and the sixth lens has a positive focal power.

According to some embodiments, in the optical lens, the fifth lens has an object surface and an image surface, the object surface of the fifth lens faces the object side, the image surface of the fifth lens faces the image side, the object surface of the fifth lens is convex, the image surface of the fifth lens is concave, the sixth lens has an object surface and an image surface, the object surface of the sixth lens faces the object side, the image surface of the sixth lens faces the image side, the object surface of the sixth lens is convex, the image surface of the sixth lens is convex, and the sixth lens has a positive focal power.

According to some embodiments, in the optical lens, the fourth lens has an object surface and an image surface, the object surface of the fourth lens faces the object side, the image surface of the fourth lens faces the image side, the object surface of the fourth lens is convex, the image surface of the fourth lens is concave, the fifth lens has an object surface and an image surface, the object surface of the fifth lens faces the object side, and the image surface of the fifth lens faces the image side, the object surface of the fifth lens is convex, the image surface of the fifth lens is convex, and the sixth lens has a negative focal power.

According to some embodiments, in the optical lens, the fourth lens has an object surface and an image surface, the object surface of the fourth lens faces the object side, the image surface of the fourth lens faces the image side, the object surface of the fourth lens is convex, the image surface of the fourth lens is convex, the fifth lens has an object surface and an image surface, the object surface of the fifth lens faces the object side, the image surface of the fifth lens faces the image side, the object surface of the fifth lens is concave, the image surface of the fifth lens is convex, the sixth lens has an object surface and an image surface, the object surface of the sixth lens faces the object side, the image surface of the sixth lens faces the image side, the object surface of the sixth lens is convex, the image surface of the sixth lens is convex, and the sixth lens has a positive focal power.

According to some embodiments, in the optical lens, the fourth lens has an object surface and an image surface, the object surface of the fourth lens faces the object side, the image surface of the fourth lens faces the image side, the object surface of the fourth lens is convex, the image surface of the fourth lens is concave, the fifth lens has an object surface and an image surface, the object surface of the fifth lens faces the object side, the image surface of the fifth lens faces the image side, the object surface of the fifth lens is convex, the image surface of the fifth lens is convex, the sixth lens has an object surface and an image surface, the object surface of the sixth lens faces the object side, the image surface of the sixth lens faces the image side, the object surface of the sixth lens is convex, the image surface of the sixth lens is concave, and the sixth lens has a positive focal power.

According to some embodiments, in the optical lens, the first lens is an aspherical lens, the object surface of the first lens has a central region and an edge region extending outwardly from the central region, the central region of the object surface of the first lens is convex, and the edge region of the object surface of the first lens is concave.

According to some embodiments, in the optical lens, the first lens and the second lens are aspheric lenses.

DETAILED DESCRIPTION OF THE EMBODIMENTS

The following description is presented to disclose the present disclosure to enable those skilled in the art to practice the present disclosure. The preferred embodiments in the following description are by way of example only, and other obvious modifications will occur to those skilled in the art. The basic principles of the present disclosure as defined in the following description may be applied to other embodiments, modifications, improvements, equivalents, and other embodiments without departing from the spirit and scope of the present disclosure.

It should be understood by those skilled in the art that in the disclosure of the present disclosure, the orientation or positional relationship indicated by the terms "longitudinal", "transverse", "upper", "lower", "front", "back", "left", "right", ""upright", "horizontal", "top", "bottom", "inside", "outside", etc. is based on the orientation or positional relationship shown in the figures, which is merely for convenience of description of the present disclosure, and does not indicate or imply that the mentioned device or element must have a particular orientation and be constructed and operated in a particular orientation. Therefore, the above terms are not to be construed as limiting the present disclosure.

First Embodiment

Figure 1:
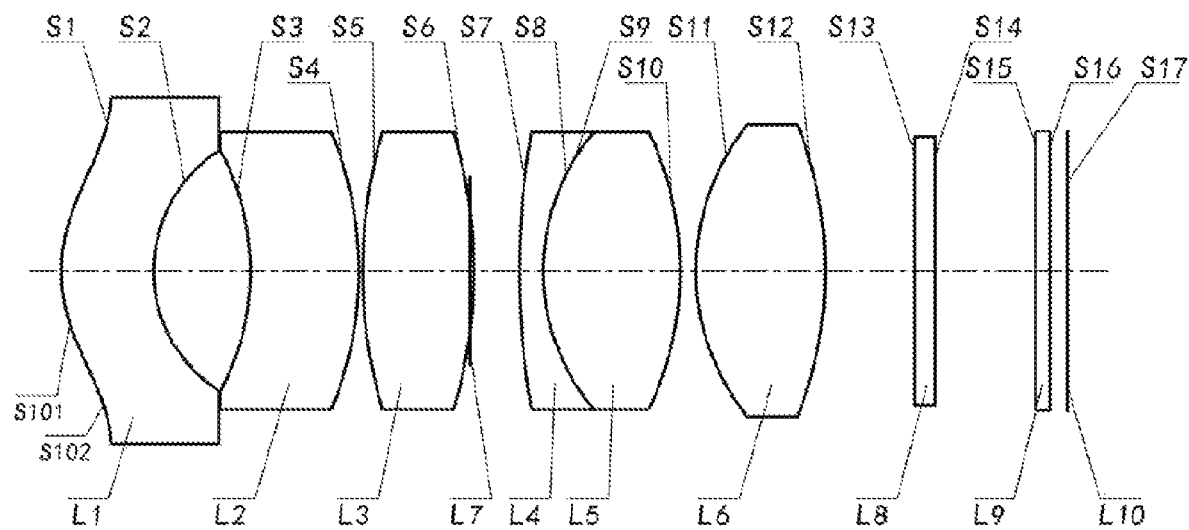
FIG. 1 is a structural schematic view of an optical lens according to a first embodiment of the present disclosure.
Figure 2:
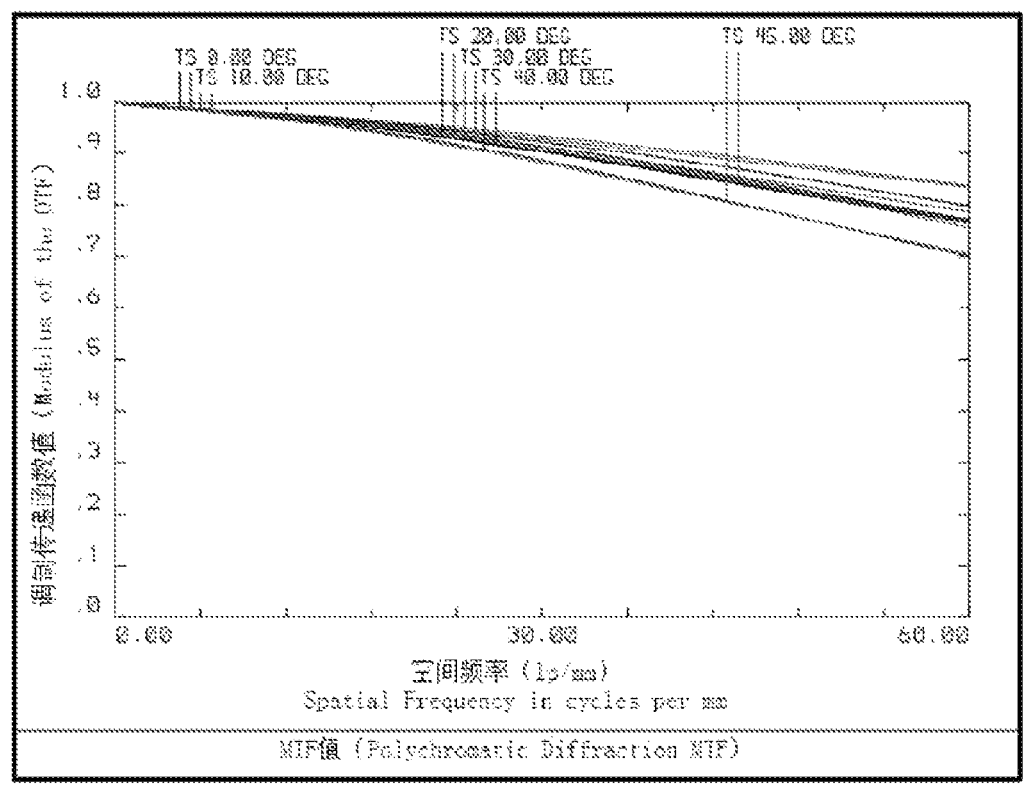
FIG. 2 is a MTF graph of the optical lens according to the first embodiment of the present disclosure.

Referring to FIGS. 1 and 2 of the accompanying drawings, an optical lens according to a first embodiment of the present disclosure is explained, wherein the optical lens includes at least one first lens L1, at least one second lens L2, a third lens L3, a fourth lens L4, a fifth lens L5 and a sixth lens L6. The first lens L1, the second lens L2, the third lens L3, the fourth lens L4, the fifth lens L5, and the sixth lens L6 are sequentially arranged along a direction from an object side to an image side.

The first lens L1 has a negative focal power, and the first lens L1 has an object surface S1 facing the object side and an image surface S2 facing the image side. According to this embodiment of the present disclosure, the object surface S1 of the first lens L1 is convex in order to increase the luminous flux of the optical lens. That is, the convex object surface S1 of the first lens L1 converges light at a larger angle to increase the luminous flux entering the optical lens from the object side. Preferably, the object surface S1 of the first lens L1 is an aspherical lens in order to reduce the processing difficulty. Of course, in other embodiments of the present disclosure, the first lens L1 may be a spherical lens.

Further, according to this embodiment of the present disclosure, the image surface S2 of the first lens L1 is concave. That is, the first lens L1 includes two surfaces S1 and S2, one of which is convex, and the other of which is concave. The concave surface and the convex surface form a meniscus shape, and the meniscus is convex toward the object side so as to increase the light entering the optical lens.

It should be noted that, in the imaging system lens group provided by the present disclosure, when the lens surface is convex and the position of the convex surface is not defined, it indicates that the lens surface is convex near the optical axis; When the lens surface is concave and the position of the concave surface is not defined, it indicates that the lens surface is concave near the optical axis.

The second lens L2 has an object surface S3 facing the object side and an image surface S4 facing the image side. According to this embodiment of the present disclosure, the image surface S4 of the second lens L2 is convex to facilitate proper divergence of light passing through the first lens L1 to be transmitted to the rear of the optical lens. The second lens L2 has a negative focal power. The second lens L2 has an effect of transition light to smoothly transition the light of the first lens L1 to the third lens L3. Preferably, the second lens L2 is an aspherical lens so as to reduce the processing difficulty. Of course, in other embodiments of the present disclosure, the second lens L2 may be a spherical lens.

Further, according to this embodiment of the present disclosure, the object surface S3 of the second lens L2 is convex. That is, the second lens L2 includes two surfaces S3 and S4, one of which is convex and the other of which is concave. The convex surface and the concave surface form a meniscus shape, and the meniscus is convex toward the image side to facilitate divergence of light passing through the first lens L1 to be transmitted backward.

It is worth mentioning that the meniscus shapes of the first lens L1 and the second lens L2 are oppositely disposed to be close to a concentric circle structure, which contributes to achieving a larger overall field of view with a larger focal length at the center of the optical lens, i.e. a higher central angle resolution.

The third lens L3 has an object surface S5 facing the object side, and an image surface S6 facing the image side. The object surface S5 and the image surface S6 of the third lens L3 both are convex to facilitate convergence of the light transmitted by the second lens L2 to be transmitted toward the rear of the optical lens. In other words, the third lens L3 is a biconvex lens having light transition and convergence effects.

According to this embodiment of the present disclosure, the third lens L3 has a positive focal power.

The fourth lens L4 and the fifth lens L5 form an achromatic lens group so as to reduce chromatic aberration of the light transmitted by the front components of the optical lens.

Referring to FIG. 1, the first lens L1, the second lens L2, the third lens L3, the fourth lens L4, the fifth lens L5, and the sixth lens L6 form a front lens group and a rear lens group, wherein the front lens group includes the first lens L1, the second lens L2, and the third lens L3, and the rear lens group includes the fourth lens L4, the fifth lens L5 and the sixth lens L6. The front lens group and the rear lens group are sequentially disposed along the direction from the object side to the image side.

Referring to FIG. 1, according to the first embodiment of the present disclosure, the optical centers of the first lens L1, the second lens L2, the third lens L3, the fourth lens L4, the fifth lens L5 and the sixth lens L6 of the optical lens are coaxial. In other words, the principal optical axes of the first lens L1, the second lens L2, the third lens L3, the fourth lens L4, the fifth lens L5, and the sixth lens L6 of the optical lens are consistent.

Referring to FIG. 1, according to the first embodiment of the present disclosure, the optical lens further includes a diaphragm L7, wherein the front lens group and the rear lens group are separately disposed on both sides of the diaphragm L7, and wherein the optical center of the diaphragm L7 is coaxial with the optical centers of the first lens L1, the second lens L2, the third lens L3, the fourth lens L4, the fifth lens L5 and the sixth lens L6. Preferably, the diaphragm L7 is disposed between the third lens L3 and the fourth lens L4.

It is worth mentioning that, referring to FIG. 1, in this embodiment of the present disclosure, the diaphragm L7 is disposed between the third lens L3 and the fourth lens L4 to reduce the stray light in the optical lens so that the optical lens have a good imaging effect. In other embodiments of the present disclosure, the diaphragm L7 may be disposed at other positions, for example, between the second lens L2 and the third lens L3, between the fourth lens L4 and the fifth lens L5, between the fifth lens L5 and the sixth lens L6 or the like. It should be understood by those skilled in the art that the position of the diaphragm L7 is not a limitation of the present disclosure. In other words, the front lens group is not limited to consist of the first lens L1, the second lens L2, and the third lens L3, and the rear lens group is not limited to consist of the fourth lens L4, the fifth lens L5, and the sixth lens L6. When the diaphragm L7 is disposed at different positions, the optical lens may form different front lens groups and rear lens groups.

As shown in FIG. 1, according to the first embodiment of the present disclosure, the fourth lens L4 has an object surface S7 facing the object side and an image surface S8 facing the image side. Further, the object surface S7 of the fourth lens L4 is convex, and the image surface S8 of the fourth lens L4 is concave. In other words, the fourth lens L4 has two surfaces S7 and S8, which are a convex surface and a concave surface, respectively, the convex surface and the concave surface form a meniscus shape, and the meniscus is convex toward the object side. Further, according to this embodiment of the present disclosure, the fourth lens L4 has a negative focal power.

According to this embodiment of the present disclosure, the fifth lens L5 has an object surface S9 facing the object side, and an image surface S10 facing the image side. Further, the object surface S9 of the fifth lens L5 is convex, and the image surface S10 of the fifth lens L5 is convex. In other words, the fifth lens L5 is a biconvex lens. Further, according to this embodiment of the present disclosure, the fifth lens L5 has a positive focal power.

Further, the image surface S8 of the fourth lens L4 and the object surface S9 of the fifth lens L5 are disposed to face each other. In other words, the image surface S8 of the fourth lens L4 and the object surface S9 of the fifth lens L5 are oppositely disposed. In this embodiment, the concave surface of the fourth lens L4 and the convex surfaces of the fifth lens L5 are disposed to face each other.

According to this embodiment of the present disclosure, the sixth lens L6 has an object surface S11 facing the object side, and an image surface S12 facing the image side. Further, the object surface S11 of the sixth lens L6 is convex, and the image surface S12 of the sixth lens L6 is convex. In other words, the sixth lens L6 is a biconvex lens. Further, the sixth lens L6 has a positive focal power. The aberration and distortion are further corrected by the sixth lens L6, so that the imaging quality of the optical lens is better.

It is worth mentioning that, in this embodiment of the present disclosure, the sixth lens L6 is used to appropriately increase the distortion of the lens edge of the front lenses of the optical lens, so that light at a large angle can reach an imaging plane L10 with a predetermined size, such as the photosensitive chip surface. Moreover, the image can be continuously corrected by software post-processing, so that the image formed by the light after passing through the sixth lens L6 is restored to normal, namely obtaining large-angle imaging.

According to this embodiment of the present disclosure, the optical lens further includes a plane lens L9 for protecting the optical lens by isolation. Of course, in other embodiments of the present disclosure, the plane lens L9 may not be provided, and the present disclosure is not limited in this respect.

Referring to FIG. 1, according to this embodiment of the present disclosure, the first lens L1 of the optical lens has a convex surface and a concave surface, and the second lens L2 has a concave surface and a convex surface, wherein the convex surface of the first lens L1 is disposed to face the object side, the concave surface of the first lens L1 is disposed to face the image side, the concave surface of the second lens L2 is disposed to face the object side, and the convex surface of the second lens L2 is disposed to face the image side. The third lens L3 has two convex surfaces facing the object side and the image side, respectively. The fourth lens L4 has a convex surface and a concave surface facing the object side and the image side, respectively, and the fifth lens L5 has two convex surfaces facing the object side and the image side, respectively, wherein the concave surface of the fourth lens L4 and the convex surface of the fifth lens L5 is disposed to face each other. The sixth lens L6 has two convex surfaces, which are disposed to face the object side and the image side, respectively.

According to this embodiment of the present disclosure, the achromatic lens group of the optical lens is preferably a glued lens. In other words, the fourth lens L4 and the fifth lens L5 are glued together to form the achromatic lens group. At this time, since the fourth lens L4 and the fifth lens L5 are glued together, the image surface S8 of the concave surface of the fourth lens L4 and the object surface S9 of the convex surface of the fifth lens L5 are disposed in a glued manner to face each other. Of course, in other embodiments of the present disclosure, the achromatic lens group may also be a separation-type achromatic lens group. It should be understood that when the achromatic lens group is a separation-type achromatic lens group, the fourth lens L4 and the fifth lens L5 are separately disposed.

It is worth mentioning that the first lens L1 and the second lens L2 may be made of a glass material, or may be made of other materials having good light transmission performance, such as plastics and resins. It should be understood by those skilled in the art that in the optical lens of the present disclosure, light enters from the first lens L1, and is transmitted to the second lens L2 after being converged by the first lens L1. Therefore, light at a large angle can be collected by the first lens L1. Further, the light reaches the second lens L2 after passing through the first lens L1, and the light converged by the first lens L1 is appropriately diverged by the second lens L2 to be transmitted to the rear of the optical lens. Therefore, the refractive indices Nd of the first lens L1 and the second lens L2 need to match with each other. However, it should be understood by those skilled in the art that the refractive indices Nd of the first lens L1 and the second lens L2 are not a limitation of the present disclosure. On the other hand, in the present disclosure, the first lens L1 and the second lens L2 are provided with an Abbe constant Vd, so that the lens has better image quality. However, it should be understood by those skilled in the art that the Abbe constants Vd of the first lens L1 and the second lens L2 are not a limitation of the present disclosure.

As shown in FIG. 1, it is a structural schematic view of the optical lens according to the first embodiment of the present disclosure. The optical lens includes, sequentially from the object side to the image side, a front lens group, a diaphragm L7, a rear lens group, a filter element L8, a plane lens L9, and an imaging plane L10.

Herein, the front lens group includes, sequentially from the object side to the image side: a first lens L1, a second lens L2, and a third lens L3, the first lens L1 being a meniscus lens having a negative focal power, the second lens L2 being a meniscus lens having a negative focal power, the concave surface of the first lens L1 being opposite to the concave surface of the second lens L2, and the third lens L3 being a biconvex lens having positive focal power; and the rear lens group includes, sequentially from the object side to the image side: a fourth lens L4, a fifth lens L5, and a sixth lens L6, the fourth lens L4 being a meniscus lens having a negative focal power, the fifth lens L5 being a biconvex lens having a positive focal power, and the concave surface of the fourth lens L4 being opposite to the convex surface of the fifth lens L5. Further, the concave surface of the fourth lens L4 and the convex surface of the fifth lens L5 are glued. The sixth lens L6 is a biconvex lens having a positive focal power.

In this embodiment, the first lens L1 satisfies the following condition: $0.5 \leq R1/(R2+d1) \leq 1.5$;
where R1 is a radius of curvature of the object surface S1 of the first lens L1, R2 is a radius of curvature of the image surface S2 of the first lens L1, and d1 is a center thickness of the first lens L1.

The second lens L2 satisfies the following condition: $0.45 \leq |R4|/(|R3|+d2) \leq 1.3$;
where R3 is a radius of curvature of the object surface S3 of the second lens L2, R4 is a radius of curvature of the image surface S4 of the second lens L2, and d2 is a center thickness of the second lens L2.

By the above conditions, the relationships between the respective radii of curvature and thickness of the first lens L1 and the second lens L2 are restricted so that the first lens L1 and the second lens L2 are close to a concentric circle. Therefore, when the concave surfaces of the first lens L1 and the second lens L2 are oppositely disposed, light at a large angle can be collected to enter the optical lens, and be appropriately diverged by the second lens L2 to be transmitted backward.

In this embodiment of the present disclosure, the focal length F1 of the first lens L1 and the overall focal length F of the optical lens satisfy the following condition: $-3.5 \leq F1/F \leq -1$.

The focal length F2 of the second lens L2 and the overall focal length F of the optical lens satisfy the following condition: $|F2/F| \geq 5.0$.

If the optical system of the optical lens has a total track length TTL, and the overall focal length of the optical lens is F, then $2.0 \leq TTL/F \leq 6.0$.

If the maximum field of view of the optical lens is FOVm and the image height corresponding to the maximum field of view of the optical lens is Ym, then $(FOVm \times F)/Ym \geq 45°$.

In this embodiment of the present disclosure, the first lens L1, the second lens L2, and the sixth lens L6 are aspherical lenses.

Preferably, the first lens L1, the second lens L2, and the sixth lens L6 are glass aspherical lenses, and the third lens L3, the fourth lens L4, and the fifth lens L5 are spherical lenses. It should be understood by those skilled in the art that the first lens L1, the second lens L2, and the sixth lens L6 are not limited to glass aspherical lenses, and may be plastic aspherical or spherical lenses or the like. The third lens L3, the fourth lens IA, and the fifth lens L5 are not limited to glass spherical lenses, and may be glass aspheric surfaces, plastic aspheric surfaces, resin aspheric surfaces or the like. The present disclosure is not limited in this respect. In particular, in some embodiments of the present disclosure, the optical lens is composed by using six lenses consisting of three glass spherical surfaces and three glass aspheric surfaces. For example, the first lens L1, the second lens L2, and the sixth lens L6 are glass aspherical lenses, and the third lens L3, the fourth lens L4, and the fifth lens L5 are glass spherical lenses, so that the optical lens has the characteristics of a long focal length and a large field of view, and the resolution of the optical lens is ensured by the glass aspherical lenses while reducing chromatic aberration.

In this embodiment of the present disclosure, the first lens L1, the second lens L2, and the sixth lens L6 are aspherical lenses. The first lens L1 and the second lens L2 are close to the concentric lens, and are aspherical, so that light at a large angle can be effectively and smoothly converged, and due to the aspherical setting, the processing difficulty of the conventional spherical concentric lenses is avoided.

Further, in some embodiments, the object surface S1 of the first lens L1 has a central region S101 and an edge region S102 extending outwardly from the central region S101, the central region S101 of the object surface S1 of the first lens L1 is convex, and the edge region S102 of the object surface S1 of the first lens L1 is concave. It should be understood by those skilled in the art that the specific structure of the aspherical surface and the specific structures and ranges of the central and edge regions of the first lens L1 are not a limitation of the present disclosure.

The aspherical lens surfaces of the first lens L1, the second lens L2, and the sixth lens L6 satisfy the following formula (1):

$$Z(h) = \frac{ch^2}{1 + \sqrt{1 - (1+k)c^2h^2}} + Ah^4 + Bh^6 + Ch^8 + Dh^{10} + Eh^{12} \quad (1)$$

where Z(h) is the distance between the aspheric surface and the aspherical apex at a position of height h in the direction of the optical axis, c=1/r, r denotes the radius of curvature of the aspherical lens surface, k is the conic coefficient conic, and A, B, C, D, and E are high-order aspheric coefficients.

As shown in FIG. 2, it is a graph of the optical performance of this embodiment of the present disclosure. It can be seen from the MTF graph of the optical lens that the optical lens has a higher resolution and better optical performance.

Parameters of the optical lens of this embodiment of the present disclosure are as shown in Table 1 below. It should be noted that the two surfaces, i.e. the object surface and the image surface, of the first lens L1, are S1 and S2, respectively, the two surfaces, i.e. the object surface and the image surface, of the second lens L2, are S3 and S4, respectively, the two surfaces, i.e. the object surface and the image surface, of the third lens L3, are S5 and S6, respectively, the two surfaces, i.e. the object surface and the image surface, of the fourth lens L4, are S7 and S8, respectively, the two surfaces, i.e. the object surface and the image surface, of the fifth lens L5, are S9 and S10, respectively, the two surfaces, i.e. the object surface and the image surface, of the sixth lens L6, are S11 and S12, respectively, the two surfaces of the filter element L8 are S13 and S14, respectively, the two surfaces of the plane lens L9 are S15 and S16, respectively, and the imaging plane is S17; and S1-S17 are in one-to-one correspondence with the surface numbers in Tables 1 and 2 below.

TABLE 1

Parameters of the optical lens of the first embodiment

| Surface No. | Radius of curvature R | Center thickness d | Refractive index Nd | Abbe constant Vd |
|---|---|---|---|---|
| 1 | 4.9050 | 2.6367 | 1.80 | 40.9 |
| 2 | 2.4376 | 2.7259 | | |
| 3 | -8.0588 | 3.0953 | 1.80 | 40.9 |
| 4 | -9.9674 | 0.1049 | | |
| 5 | 14.1643 | 3.2000 | 1.90 | 37.1 |
| 6 | -14.1643 | -0.1049 | | |
| 7 | Infinity | 1.4037 | | |

TABLE 1-continued

Parameters of the optical lens of the first embodiment

| Surface No. | Radius of curvature R | Center thickness d | Refractive index Nd | Abbe constant Vd |
|---|---|---|---|---|
| 8 | 23.0405 | 0.6500 | 1.92 | 20.9 |
| 9 | 6.1274 | 3.3500 | 1.51 | 81.6 |
| 10 | -25.1704 | 0.1300 | | |
| 11 | 7.5543 | 2.9378 | 1.50 | 81.6 |
| 12 | -52.4602 | 1.5738 | | |
| 13 | Infinity | 0.5500 | 1.52 | 64.1 |
| 14 | Infinity | 2.3236 | | |
| 15 | Infinity | 0.4000 | 1.52 | 64.1 |
| 16 | Infinity | 0.2162 | | |
| 17 | Infinity | | | |

TABLE 2

Aspheric coefficients of the first embodiment

| Surface No. | K | A | B | C | D | E |
|---|---|---|---|---|---|---|
| 1 | -1.070362 | -6.0341E-04 | -1.2184E-04 | 1.2473E-06 | 1.4275E-07 | -3.2004E-09 |
| 2 | -1.94196 | -1.3447E-03 | -1.1271E-03 | 1.4246E-04 | -9.3777E-06 | 3.2504E-07 |
| 3 | 0.405509 | -1.0877E-04 | -5.7325E-05 | 1.4179E-06 | 9.3500E-07 | -4.4727E-09 |
| 4 | 0.157856 | -8.1067E-05 | -1.0152E-06 | 3.0806E-06 | -1.3393E-07 | -7.8945E-10 |
| 11 | -4.928835 | 9.3393E-04 | 6.5361E-05 | -5.7931E-06 | 2.4979E-07 | -3.1287E-09 |
| 12 | 122.5036 | -9.8038E-04 | 1.4311E-05 | -3.8790E-06 | 1.2150E-07 | 2.5818E-09 |

Based on the above data, the numerical values of the formulas involved in this embodiment are calculated as follows:

R1/(R2+d1)=0.967, |R4|/(|R3|+d2)=0.894, F1/F=−1.753, |F2|/F=28.922, TTL/F=3.848, and (FOVm×F)/Ym=70.258°. As shown in Tables 1 and 2, in this embodiment, as a set of specific embodiment parameters, the optical lenses with these parameters can achieve better optical performance, have a longer overall focal length, and have a larger field of view.

In summary, the optical lens of the present disclosure can satisfy the requirements of miniaturization and realize a long focal length, a large field of view, and a large aperture through the design of the six-lens structure and aspherical lenses close to a concentric circle. Moreover, it can meet the high definition requirements and effectively correct various aberrations of the optical system, especially suitable for in-vehicle camera systems. It can capture distant objects, and the overall field of vision is enlarged. The functions of both the conventional telephoto lens and the conventional wide-angle lens can be realized by one lens, reducing the cost of the in-vehicle camera system and improving the actual performance of the lens.

Second Embodiment

Figure 3:
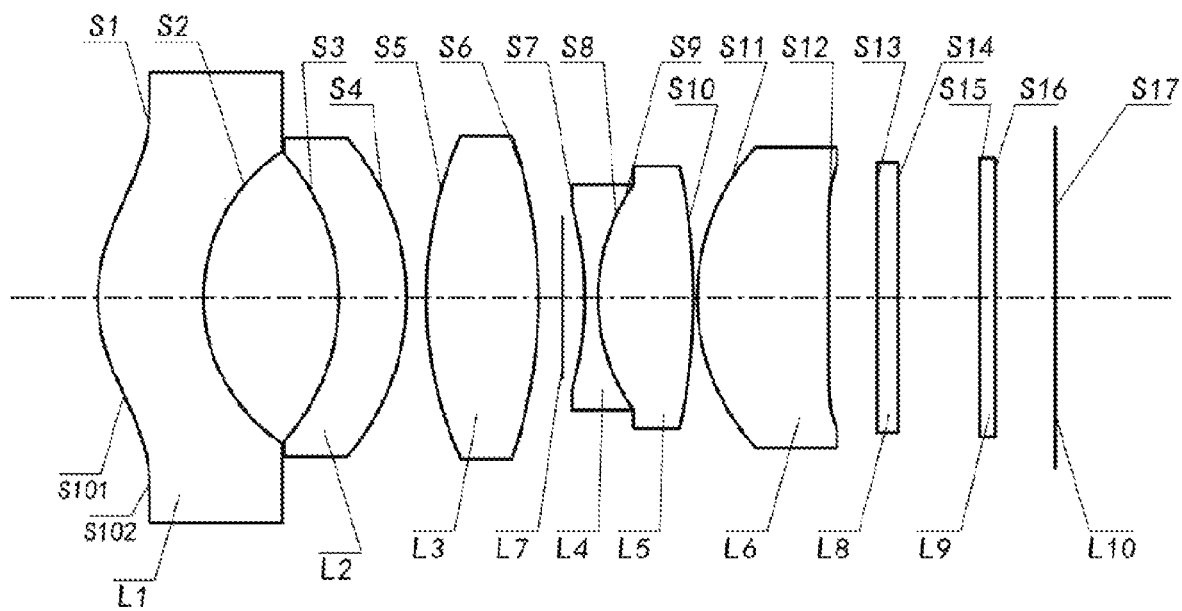
FIG. 3 is a structural schematic view of an optical lens according to a second embodiment of the present disclosure.
Figure 4:
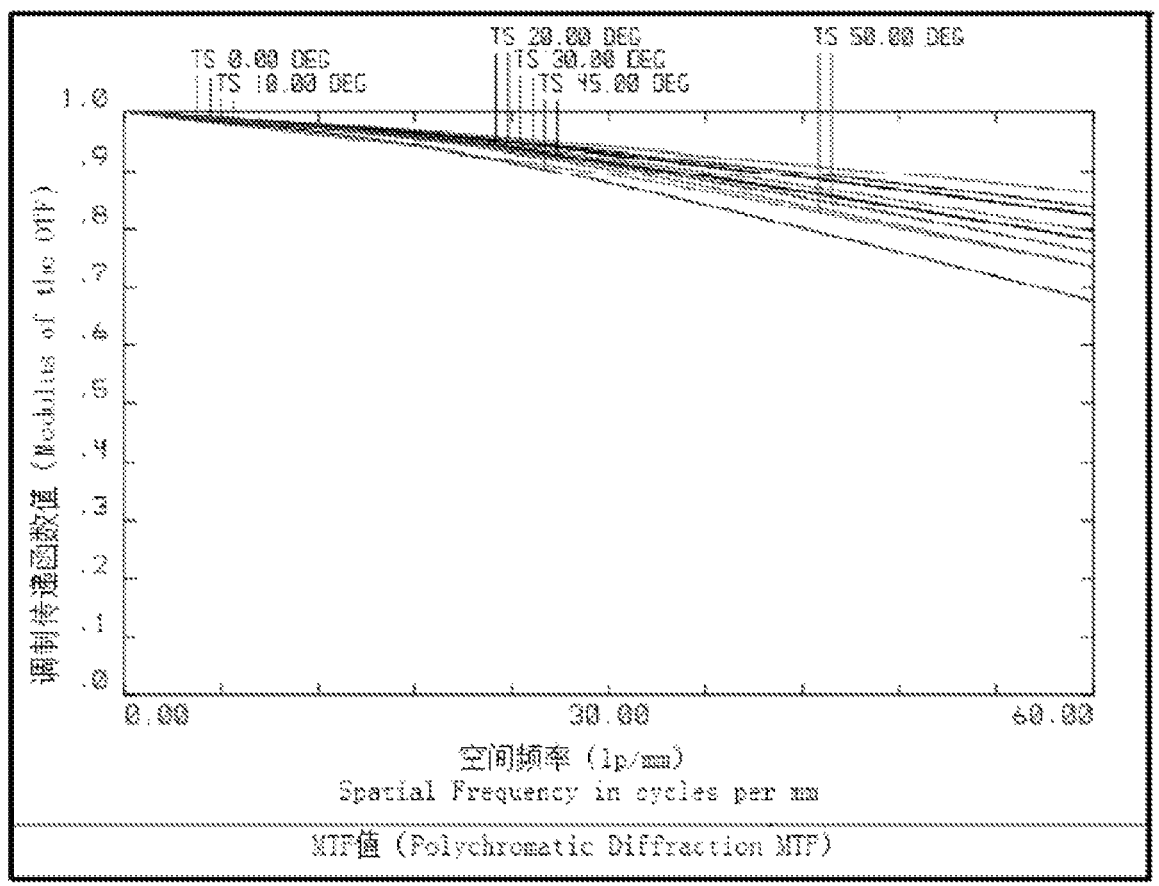
FIG. 4 is a MTF graph of the optical lens according to the second embodiment of the present disclosure.

Referring to FIGS. 3 and 4, an optical lens according to a second embodiment of the present disclosure is explained, wherein the optical lens includes at least one first lens L1, at least one second lens L2, a third lens L3, a fourth lens L4, a fifth lens L5 and a sixth lens L6. The first lens L1, the second lens L2, the third lens L3, the fourth lens L4, the fifth lens L5, and the sixth lens L6 are sequentially arranged along a direction from an object side to an image side.

The first lens L1 has a negative focal power, and the first lens L1 has an object surface S1 facing the object side and an image surface S2 facing the image side. According to this embodiment of the disclosure, the object surface S1 of the first lens L1 is convex in order to increase the luminous flux of the optical lens. That is, the convex object surface S1 of the first lens L1 converges light at a large angle to increase the luminous flux entering the optical lens from the object side. Preferably, the object surface S1 of the first lens L1 is an aspherical lens in order to reduce the processing difficulty. Of course, in other embodiments of the present disclosure, the first lens L1 may be a spherical lens.

Further, according to this embodiment of the present disclosure, the image surface S2 of the first lens L1 is concave. That is, the first lens L1 includes two surfaces S1 and S2, one of which is convex, and the other of which is concave. The concave surface and the convex surface form a meniscus shape, and the meniscus is convex toward the object side so as to increase the light entering the optical lens.

It should be noted that, in the imaging system lens group provided by the present disclosure, when the lens surface is convex and the position of the convex surface is not defined, it indicates that the lens surface is convex near the optical axis; When the lens surface is concave and the position of the concave surface is not defined, it indicates that the lens surface is concave near the optical axis.

The second lens L2 has an object surface S3 facing the object side and an image surface S4 facing the image side. According to this embodiment of the present disclosure, the image surface S4 of the second lens L2 is convex to facilitate proper divergence of light passing through the first lens L1 to be transmitted to the rear of the optical lens. The second lens L2 has a positive focal power. That is, the second lens L2 has an effect of transition light to smoothly transition the light of the first lens L1 to the third lens L3. Preferably, the second lens L2 is an aspherical lens so as to reduce the processing difficulty. Of course, in other embodiments of the present disclosure, the second lens L2 may be a spherical lens.

Further, according to this embodiment of the present disclosure, the object surface S3 of the second lens L2 is convex. That is, the second lens L2 includes two surfaces S3 and S4, one of which is convex and the other of which is concave. The convex surface and the concave surface form a meniscus shape, and the meniscus is convex toward the image side to facilitate divergence of light passing through the first lens L1 to be transmitted backward.

It is worth mentioning that the meniscus shapes of the first lens L1 and the second lens L2 are oppositely disposed to be close to a concentric circle structure, so that the optical lens has a smaller field of view, a larger focal length, and a higher angle resolution near the center.

The third lens L3 has an object surface S5 facing the object side, and an image surface S6 facing the image side. The object surface S5 and the image surface S6 of the third lens L3 both are convex to facilitate convergence of the light transmitted by the second lens L2 to be transmitted toward the rear of the optical lens. In other words, the third lens L3 is a biconvex lens having light transition and convergence effects.

According to this embodiment of the present disclosure, the third lens L3 has a positive focal power.

The fourth lens L4 and the fifth lens L5 form an achromatic lens group so as to reduce chromatic aberration of the light transmitted by the front components of the optical lens.

Referring to FIG. 3, the first lens L1, the second lens L2, the third lens L3, the fourth lens L4, the fifth lens L5, and the sixth lens L6 form a front lens group and a rear lens group, wherein the front lens group includes the first lens L1, the second lens L2, and the third lens L3, and the rear lens group includes the fourth lens L4, the fifth lens L5 and the sixth lens L6. The front lens group and the rear lens group are sequentially disposed along the direction from the object side to the image side.

Referring to FIG. 3, according to the second embodiment of the present disclosure, the optical centers of the first lens L1, the second lens L2, the third lens L3, the fourth lens L4, the fifth lens L5 and the sixth lens L6 of the optical lens are coaxial. In other words, the principal optical axes of the first lens L1, the second lens L2, the third lens L3, the fourth lens L4, the fifth lens L5, and the sixth lens L6 of the optical lens are consistent.

Referring to FIG. 3, according to the second embodiment of the present disclosure, the optical lens further includes a diaphragm L7, wherein the front lens group and the rear lens group are separately disposed on both sides of the diaphragm L7, and wherein the optical center of the diaphragm L7 is coaxial with the optical centers of the first lens L1, the second lens L2, the third lens L3, the fourth lens L4, the fifth lens L5 and the sixth lens L6. Preferably, the diaphragm L7 is disposed between the third lens L3 and the fourth lens L4.

It is worth mentioning that, referring to FIG. 3, in this embodiment of the present disclosure, the diaphragm L7 is disposed between the third lens L3 and the fourth lens L4 to reduce the stray light in the optical lens so that the optical lens have a good imaging effect. In other embodiments of the present disclosure, the diaphragm L7 may be disposed at other positions, for example, between the second lens L2 and the third lens L3, between the fourth lens L4 and the fifth lens L5, between the fifth lens L5 and the sixth lens L6 or the like. It should be understood by those skilled in the art that the position of the diaphragm L7 is not a limitation of the present disclosure. In other words, the front lens group is not limited to consist of the first lens L1, the second lens L2, and the third lens L3, and the rear lens group is not limited to consist of the fourth lens L4, the fifth lens L5, and the sixth lens L6. When the diaphragm L7 is disposed at different positions, the optical lens may form different front lens groups and rear lens groups.

As shown in FIG. 3, according to the second embodiment of the present disclosure, the fourth lens L4 has an object surface S7 facing the object side and an image surface S8 facing the image side. Further, the object surface S7 of the fourth lens L4 is concave, and the image surface S8 of the fourth lens L4 is concave. In other words, the fourth lens L4 has two surfaces S7 and S8, which are two concave surfaces, and the fourth lens is a biconcave lens. Further, according to this embodiment of the present disclosure, the fourth lens L4 has a negative focal power.

According to this embodiment of the present disclosure, the fifth lens L5 has an object surface S9 facing the object side, and an image surface S10 facing the image side. Further, the object surface S9 of the fifth lens L5 is convex, and the image surface S10 of the fifth lens L5 is convex. In other words, the fifth lens L5 is a biconvex lens. Further, the fifth lens L5 has a positive focal power.

Further, the image surface S8 of the fourth lens L4 and the object surface S9 of the fifth lens L5 are disposed to face each other. In other words, the image surface S8 of the fourth lens L4 and the object surface S9 of the fifth lens L5 are disposed to face each other. In this embodiment, the concave surface of the fourth lens L4 and the convex surfaces of the fifth lens L5 are disposed to face each other.

According to this embodiment of the present disclosure, the sixth lens L6 has an object surface S11 facing the object side, and an image surface S12 facing the image side. Further, the object surface S11 of the sixth lens L6 is convex, and the image surface S12 of the sixth lens L6 is convex. In other words, the sixth lens L6 is a biconvex lens. Further, the sixth lens L6 has a positive focal power. The aberration and distortion are further corrected by the sixth lens L6, so that the imaging quality of the optical lens is better.

It is worth mentioning that, in this embodiment of the present disclosure, the sixth lens L6 is used to appropriately increase the distortion of the lens edge of the front lenses of the optical lens, so that light at a large angle can reach the imaging plane L10 with a predetermined size, such as the photosensitive chip surface. Moreover, the image can be continuously corrected by software post-processing, so that the image formed by the light after passing through the sixth lens L6 is restored to normal, namely obtaining large-angle imaging.

According to this embodiment of the present disclosure, the optical lens further includes a plane lens L9 for protecting the optical lens by isolation. Of course, in other embodiments of the present disclosure, the plane lens L9 may not be provided, and the present disclosure is not limited in this respect.

Referring to FIG. 3, according to this embodiment of the present disclosure, the first lens L1 of the optical lens has a convex surface and a concave surface, and the second lens L2 has a concave surface and a convex surface, wherein the convex surface of the first lens L1 is disposed to face the object side, the concave surface of the first lens L1 is disposed to face the image side, the concave surface of the second lens L2 is disposed to face the object side, and the convex surface of the second lens L2 is disposed to face the image side. The third lens L3 has two convex surfaces facing the object side and the image side, respectively. The fourth lens L4 has two concave surfaces facing the object side and the image side, respectively, and the fifth lens L5 has two convex surfaces facing the object side and the image side, respectively, wherein the concave surface of the fourth lens L4 and the convex surface of the fifth lens L5 is disposed to face each other. The sixth lens L6 has two convex surfaces, which are disposed to face the object side and the image side, respectively.

According to this embodiment of the present disclosure, the achromatic lens group of the optical lens is preferably a glued lens. In other words, the fourth lens L4 and the fifth lens L5 are glued together to form the achromatic lens group. At this time, since the fourth lens L4 and the fifth lens L5 are glued together, the image surface S8 of the concave surface of the fourth lens L4 and the object surface S9 of the convex surface of the fifth lens L5 are disposed in a glued manner to face each other. Of course, in other embodiments of the present disclosure, the achromatic lens group may also be a separation-type achromatic lens group. It would be understood that when the achromatic lens group is a separation-type achromatic lens group, the fourth lens L4 and the fifth lens L5 are separately disposed.

It is worth mentioning that the first lens L1 and the second lens L2 may be made of a glass material, or may be made of other materials having good light transmission performance, such as plastics and resins. It would be understood by those skilled in the art that in the optical lens of the present disclosure, light enters from the first lens L1, and is transmitted to the second lens L2 after being converged by the first lens L1. Therefore, light at a large angle can be collected by the first lens L1. Further, the light reaches the second lens L2 after passing through the first lens L1, and the light converged by the first lens L1 is appropriately diverged by the second lens L2 to be transmitted to the rear of the optical lens. Therefore, the refractive indices Nd of the first lens L1 and the second lens L2 need to match with each other. However, it would be understood by those skilled in the art that the refractive indices Nd of the first lens L1 and the second lens L2 are not a limitation of the present disclosure. On the other hand, in the present disclosure, the first lens L1 and the second lens L2 are provided with an Abbe constant Vd, so that the lens has better image quality. However, it should be understood by those skilled in the art that the Abbe constants Vd of the first lens L1 and the second lens L2 are not a limitation of the present disclosure.

As shown in FIG. 3, it is a structural schematic view of the optical lens according to the second embodiment of the present disclosure. The optical lens includes, sequentially from the object side to the image side, a front lens group, a diaphragm L7, a rear lens group, a filter element L8, a plane lens L9, and an imaging plane L10.

Herein, the front lens group includes, sequentially from the object side to the image side: a first lens L1, a second lens L2, and a third lens L3, the first lens L1 being a meniscus lens having a negative focal power, the second lens L2 being a meniscus lens having a positive focal power, the concave surface of the first lens L1 being opposite to the concave surface of the second lens L2, and the third lens L3 being a biconvex lens having positive focal power; and the rear lens group includes, sequentially from the object side to the image side: a fourth lens L4, a fifth lens L5, and a sixth lens L6, the fourth lens LA being a biconcave lens having a negative focal power, the fifth lens L5 being a biconvex lens having a positive focal power, and the concave surface of the fourth lens L4 being opposite to the convex surface of the fifth lens L5. Further, the concave surface of the fourth lens L4 and the convex surface of the fifth lens L5 are glued. The sixth lens L6 is a biconvex lens having a positive focal power.

In this embodiment, the first lens L1 satisfies the following condition: $0.5 \leq R1/(R2+d1) \leq 1.5$;

where R1 is a radius of curvature of the object surface S1 of the first lens L1, R2 is a radius of curvature of the image surface S2 of the first lens L1, and d1 is a center thickness of the first lens L1.

The second lens L2 satisfies the following condition: $0.45 \leq |R4|/(|R3|+d2) \leq 1.3$;

where R3 is a radius of curvature of the object surface S3 of the second lens L2, R4 is a radius of curvature of the image surface S4 of the second lens L2, and d2 is a center thickness of the second lens L2.

By the above conditions, the relationships between the respective radii of curvature and thickness of the first lens L1 and the second lens L2 are restricted so that the first lens L1 and the second lens L2 are close to a concentric circle. Therefore, when the concave surfaces of the first lens L1 and the second lens L2 are oppositely disposed, light at a large angle can be collected to enter the optical lens, and be appropriately diverged by the second lens L2 to be transmitted backward.

In this embodiment of the present disclosure, the focal length F1 of the first lens L1 and the overall focal length F of the optical lens satisfy the following condition: $-3.5 \leq F1/F \leq -1$.

The focal length F2 of the second lens L2 and the overall focal length F of the optical lens satisfy the following condition: $|F2/F| \geq 5.0$.

If the maximum field of view of the optical lens is FOVm and the image height corresponding to the maximum field of view of the optical lens is Ym, then $(FOVm \times F)/Ym \geq 45°$.

In this embodiment of the present disclosure, the first lens L1, the second lens L2, and the sixth lens L6 are aspherical lenses.

Preferably, the first lens L1, the second lens L2, and the sixth lens L6 are glass aspherical lenses, and the third lens L3, the fourth lens L4, and the fifth lens L5 are spherical lenses. It should be understood by those skilled in the art that the first lens L1, the second lens L2, and the sixth lens L6 are not limited to glass aspherical lenses, and may be plastic aspherical lenses, glass spherical lenses or the like. The third lens L3, the fourth lens L4, and the fifth lens L5 are not limited to glass spherical lenses, and may be glass aspheric surfaces, plastic aspheric surfaces, resin aspheric surfaces or the like. The present disclosure is not limited in this respect. In particular, in some embodiments of the present disclosure, the optical lens is composed of six lenses consisting of three glass spherical surfaces and three glass aspheric surfaces. For example, the first lens L1, the second lens L2, and the sixth lens L6 are glass aspherical lenses, and the third lens L3, the fourth lens L4, and the fifth lens L5 are glass spherical lenses, so that the optical lens has the characteristics of a long focal length and a large field of view, and the resolution of the optical lens is ensured by the glass aspherical lenses while reducing chromatic aberration.

In this embodiment of the present disclosure, the first lens L1, the second lens L2, and the sixth lens L6 are aspherical lenses. The first lens L1 and the second lens L2 are close to the concentric lens, and are aspherical, so that light at a large angle can be effectively and smoothly converged, and due to the aspherical setting, the processing difficulty of the conventional spherical concentric lenses is avoided.

Further, in some embodiments, the object surface S1 of the first lens L1 has a central region S101 and an edge region S102 extending outwardly from the central region S101, the central region S101 of the object surface S1 of the first lens L1 is convex, and the edge region S102 of the object surface S1 of the first lens L1 is concave. It should be understood by those skilled in the art that the specific structure of the aspherical surface and the specific structures and ranges of the central and edge regions of the first lens L1 are not a limitation of the present disclosure.

The aspherical lens surfaces of the first lens L1, the second lens L2, and the sixth lens L6 satisfy the formula (1) given in the first embodiment.

As shown in FIG. 4, it is a graph of the optical performance of this embodiment of the present disclosure. It can be seen from the MTF graph of the optical lens that the optical lens has higher resolution and better optical performance.

Parameters of the optical lens of this embodiment of the present disclosure are as shown in Tables 3 and 4 below. It should be noted that the two surfaces, i.e. the object surface and the image surface, of the first lens L1, are S1 and S2, respectively, the two surfaces, i.e. the object surface and the image surface, of the second lens L2, are S3 and S4, respectively, the two surfaces, i.e. the object surface and the image surface, of the third lens L3, are S5 and S6, respectively, the two surfaces, i.e. the object surface and the image surface, of the fourth lens L4, are S7 and S8, respectively, the two surfaces, i.e. the object surface and the image surface, of the fifth lens L5, are S9 and S10, respectively, the two surfaces, i.e. the object surface and the image surface, of the sixth lens L6, are S11 and S12, respectively, the two surfaces of the filter element L8 are S13 and S14, respectively, the two surfaces of the plane lens L9 are S15 and S16, respectively, and the imaging plane is S17; and S1-S17 are in one-to-one correspondence with the surface numbers in Tables 3 and 4 below.

TABLE 3

Parameters of the optical lens of the second embodiment

| Surface No. | Radius of curvature R | Center thickness d | Refractive index Nd | Abbe constant Vd |
|---|---|---|---|---|
| 1 | 4.9664 | 2.8200 | 1.81 | 41.0 |
| 2 | 2.5583 | 3.6000 | | |
| 3 | −6.5060 | 1.8000 | 1.52 | 64.2 |
| 4 | −6.6931 | 0.1303 | | |
| 5 | 15.4290 | 2.3500 | 1.89 | 33.0 |
| 6 | −24.9135 | 1.6743 | | |
| 7 | Infinity | 0.3000 | | |
| 8 | −50.8376 | 0.6500 | 1.85 | 23.8 |
| 9 | 5.2969 | 2.5328 | 1.80 | 46.6 |
| 10 | −16.8294 | 0.1000 | | |
| 11 | 6.5203 | 3.5709 | 1.50 | 81.6 |
| 12 | −129.0863 | 1.0000 | | |
| 13 | Infinity | 0.5500 | 1.52 | 64.1 |
| 14 | Infinity | 1.0000 | | |
| 15 | Infinity | 0.4000 | 1.52 | 64.1 |
| 16 | Infinity | 1.6349 | | |
| 17 | Infinity | | | |

TABLE 4

Aspheric coefficients of the second embodiment

| Surface No. | K | A | B | C | D | E |
|---|---|---|---|---|---|---|
| 1 | −0.974825 | −7.1163E−04 | −6.3087E−05 | −1.0205E−06 | 1.1853E−07 | −1.7272E−09 |
| 2 | −1.929128 | −3.6436E−03 | −5.0598E−04 | 4.6798E−05 | −1.7681E−06 | 4.6772E−08 |
| 3 | 0.454572 | −8.7787E−04 | 1.1282E−05 | −1.9950E−06 | 4.9797E−07 | −1.9178E−09 |
| 4 | 1.091477 | 1.0287E−04 | 5.9728E−05 | −8.2220E−07 | 3.1603E−08 | 1.0633E−09 |
| 11 | −2.475537 | 6.9897E−04 | 1.1048E−04 | −1.2620E−05 | 6.7442E−07 | −1.5508E−09 |
| 12 | 0 | −5.7655E−04 | 2.3999E−04 | −1.3337E−05 | 5.9054E−07 | 1.4771E−09 |

Based on the above data, the numerical values of the formulas involved in this embodiment are calculated as follows:

R1/(R2+d1)=0.923, |R4|/(|R3|+d2)=0.806, F1/F=−2.112, |F2|/F=30.457, TTL/F=3.742, (FOVm×F)/Ym=70.633°. As shown in Tables 3 and 4, in this embodiment, as a set of specific embodiment parameters, the optical lenses with these parameters can achieve better optical performance, have a longer overall focal length, and have a larger field of view.

In summary, the optical lens of the present disclosure can satisfy the requirements of miniaturization and realize a long focal length, a large field of view, and a large aperture through the design of the six-lens structure and aspherical lenses close to a concentric circle. Moreover, it can meet the high definition requirements and effectively correct various aberrations of the optical system, especially suitable for in-vehicle camera systems. It can capture distant objects, and the overall field of vision is enlarged. The functions of both the conventional telephoto lens and the conventional wide-angle lens can be realized by one lens, reducing the cost of the in-vehicle camera system and improving the actual performance of the lens.

This embodiment differs from the first embodiment in that the focal power of the second lens is different and the structure of the fourth lens is different in this embodiment.

Third Embodiment

Figure 5:
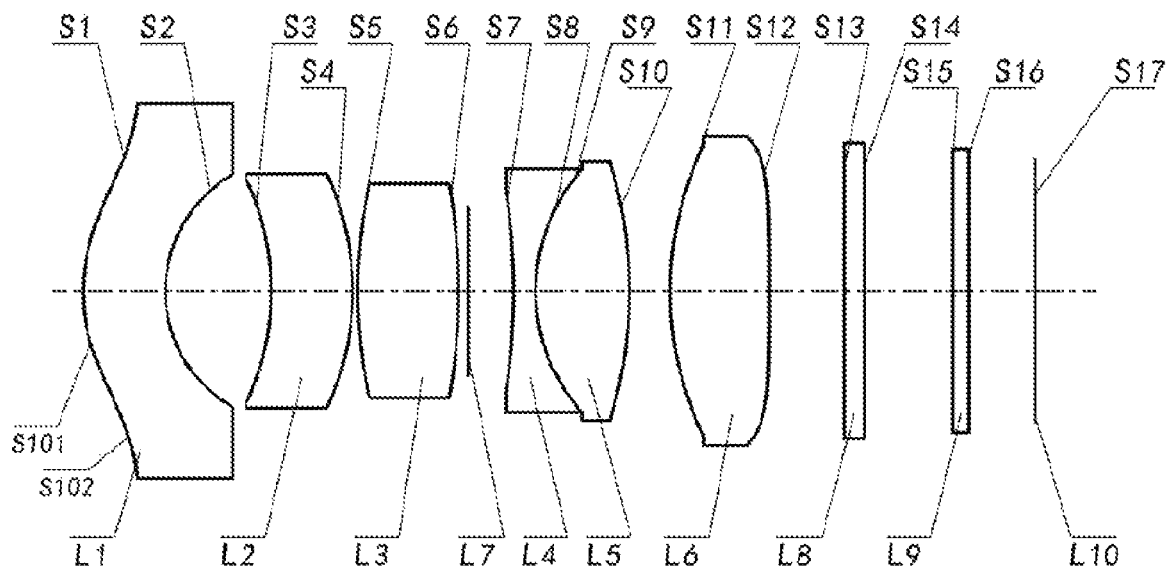
FIG. 5 is a structural schematic view of an optical lens according to a third embodiment of the present disclosure.
Figure 6:
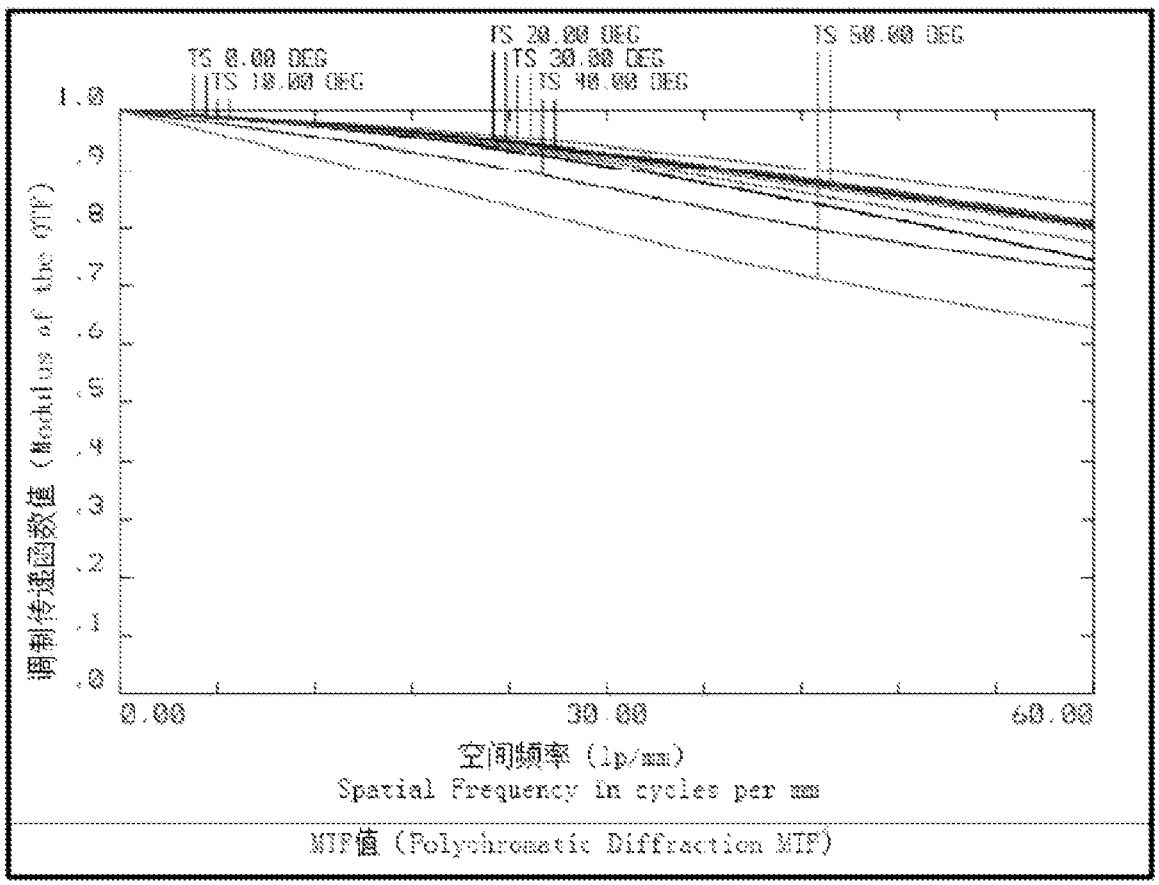
FIG. 6 is a MTF graph of the optical lens according to the third embodiment of the present disclosure.

Referring to FIGS. 5 and 6, an optical lens according to a third embodiment of the present disclosure is explained, wherein the optical lens includes at least one first lens L1, at least one second lens L2, a third lens L3, a fourth lens L4, a fifth lens L5 and a sixth lens L6. The first lens L1, the second lens L2, the third lens L3, the fourth lens L4, the fifth lens L5, and the sixth lens L6 are sequentially arranged along a direction from an object side to an image side.

The first lens L1 has a negative focal power, and the first lens L1 has an object surface S1 facing the object side and an image surface S2 facing the image side. According to this embodiment of the present disclosure, the object surface S1 of the first lens L1 is convex in order to increase the luminous flux of the optical lens. That is, the convex object surface S1 of the first lens L1 converges light at a larger angle to increase the luminous flux entering the optical lens from the object side. Preferably, the object surface S1 of the first lens L1 is an aspherical lens in order to reduce the processing difficulty. Of course, in other embodiments of the present disclosure, the first lens L1 may be a spherical lens.

Further, according to this embodiment of the present disclosure, the image surface S2 of the first lens L1 is concave. That is, the first lens L1 includes two surfaces S1 and S2, one of which is convex, and the other of which is concave. The concave surface and the convex surface form a meniscus shape, and the meniscus is convex toward the object side so as to increase the light entering the optical lens.

It should be noted that, in the imaging system lens group provided by the present disclosure, when the lens surface is convex and the position of the convex surface is not defined, it indicates that the lens surface is convex near the optical axis; When the lens surface is concave and the position of the concave surface is not defined, it indicates that the lens surface is concave near the optical axis.

The second lens L2 has an object surface S3 facing the object side and an image surface S4 facing the image side. According to this embodiment of the present disclosure, the image surface S4 of the second lens L2 is convex to facilitate proper divergence of light passing through the first lens L1 to be transmitted to the rear of the optical lens. The second lens L2 has a positive focal power. That is, the second lens L2 has an effect of transition light to smoothly transition the light of the first lens L1 to the third lens L3. Preferably, the second lens L2 is an aspherical lens so as to reduce the processing difficulty. Of course, in other embodiments of the present disclosure, the second lens L2 may be a spherical lens.

Further, according to this embodiment of the present disclosure, the object surface S3 of the second lens L2 is convex. That is, the second lens L2 includes two surfaces S3 and S4, one of which is convex and the other of which is concave. The convex surface and the concave surface form a meniscus shape, and the meniscus is convex toward the image side to facilitate divergence of light passing through the first lens L1 to be transmitted backward.

It is worth mentioning that the meniscus shapes of the first lens L1 and the second lens L2 are oppositely disposed to be close to a concentric circle structure, so that the optical lens has a smaller field of view, a larger focal length, and a higher angle resolution near the center.

The third lens L3 has an object surface S5 facing the object side, and an image surface S6 facing the image side. The object surface S5 and the image surface S6 of the third lens L3 both are convex to facilitate convergence of the light transmitted by the second lens L2 to be transmitted toward the rear of the optical lens. In other words, the third lens L3 is a biconvex lens having light transition and convergence effects.

According to this embodiment of the present disclosure, the third lens L3 has a positive focal power.

The fourth lens L4 and the fifth lens L5 form an achromatic lens group so as to reduce chromatic aberration of the light transmitted by the front components of the optical lens.

Referring to FIG. 5, the first lens L1, the second lens L2, the third lens L3, the fourth lens L4, the fifth lens L5, and the sixth lens L6 form a front lens group and a rear lens group, wherein the front lens group includes the first lens L1, the second lens L2, and the third lens L3, and the rear lens group includes the fourth lens L4, the fifth lens L5 and the sixth lens L6. The front lens group and the rear lens group are sequentially disposed along the direction from the object side to the image side.

Referring to FIG. 5, according to the third embodiment of the present disclosure, the optical centers of the first lens L1, the second lens L2, the third lens L3, the fourth lens L4, the fifth lens L5 and the sixth lens L6 of the optical lens are coaxial. In other words, the principal optical axes of the first lens L1, the second lens L2, the third lens L3, the fourth lens L4, the fifth lens L5, and the sixth lens L6 of the optical lens are consistent.

Referring to FIG. 5, according to the third embodiment of the present disclosure, the optical lens further includes a diaphragm L7, wherein the front lens group and the rear lens group are separately disposed on both sides of the diaphragm L7, and wherein the optical center of the diaphragm L7 is coaxial with the optical centers of the first lens L1, the second lens L2, the third lens L3, the fourth lens L4, the fifth lens L5 and the sixth lens L6. Preferably, the diaphragm L7 is disposed between the third lens L3 and the fourth lens L4.

It is worth mentioning that, referring to FIG. 5, in this embodiment of the present disclosure, the diaphragm L7 is disposed between the third lens L3 and the fourth lens L4 to reduce the stray light in the optical lens so that the optical lens have a good imaging effect. In other embodiments of the present disclosure, the diaphragm L7 may be disposed at other positions, for example, between the second lens L2 and the third lens L3, between the fourth lens L4 and the fifth lens L5, between the fifth lens L5 and the sixth lens L6 or the like. It should be understood by those skilled in the art that the position of the diaphragm L7 is not a limitation of the present disclosure. In other words, the front lens group is not limited to consist of the first lens L1, the second lens L2, and the third lens L3, and the rear lens group is not limited to consist of the fourth lens L4, the fifth lens L5, and the sixth lens L6. When the diaphragm L7 is disposed at different positions, the optical lens may form different front lens groups and rear lens groups.

As shown in FIG. 5, according to the third embodiment of the present disclosure, the fourth lens L4 has an object surface S7 facing the object side and an image surface S8 facing the image side. Further, the object surface S7 of the fourth lens L4 is convex, and the image surface S8 of the fourth lens L4 is concave. In other words, the fourth lens L4 has two surfaces S7 and S8, which are two concave surfaces. That is, the fourth lens is a biconcave lens. Further, according to this embodiment of the present disclosure, the fourth lens L4 has a negative focal power.

According to this embodiment of the present disclosure, the fifth lens L5 has an object surface S9 facing the object side, and an image surface S10 facing the image side. Further, the object surface S9 of the fifth lens L5 is convex, and the image surface S10 of the fifth lens L5 is convex. In other words, the fifth lens L5 is a biconvex lens. Further, according to this embodiment of the present disclosure, the fifth lens L5 has a positive focal power.

Further, the image surface S8 of the fourth lens L4 and the object surface S9 of the fifth lens L5 are disposed to face each other. In other words, the image surface S8 of the fourth lens L4 and the object surface S9 of the fifth lens L5 are disposed to face each other. In this embodiment, the concave surface of the fourth lens L4 and the convex surfaces of the fifth lens L5 are disposed to face each other.

According to this embodiment of the present disclosure, the sixth lens L6 has an object surface S11 facing the object side, and an image surface S12 facing the image side. Further, the object surface S11 of the sixth lens L6 is convex, and the image surface S12 of the sixth lens L6 is concave. In other words, the sixth lens L6 is a meniscus lens. Further, the sixth lens L6 has a positive focal power. The aberration and distortion are further corrected by the sixth lens L6, so that the imaging quality of the optical lens is better.

It is worth mentioning that, in this embodiment of the present disclosure, the sixth lens L6 is used to appropriately increase the distortion of the lens edge of the front lenses of the optical lens, so that light at a large angle can reach the imaging plane L10 with a predetermined size, such as the photosensitive chip surface. Moreover, the image can be continuously corrected by software post-processing, so that the image formed by the light after passing through the sixth lens L6 is restored to normal, namely obtaining large-angle imaging.

According to this embodiment of the present disclosure, the optical lens further includes a plane lens L9 for protecting the optical lens by isolation. Of course, in other embodiments of the present disclosure, the plane lens L9 may not be provided, and the present disclosure is not limited in this respect.

Referring to FIG. 5, according to this embodiment of the present disclosure, the first lens L1 of the optical lens has a convex surface and a concave surface, and the second lens L2 has a concave surface and a convex surface, wherein the convex surface of the first lens L1 is disposed to face the object side, the concave surface of the first lens L1 is disposed to face the image side, the concave surface of the second lens L2 is disposed to face the object side, and the convex surface of the second lens L2 is disposed to face the image side. The third lens L3 has two convex surfaces facing the object side and the image side, respectively. The fourth lens L4 has two concave surfaces facing the object side and the image side, respectively, and the fifth lens L5 has two convex surfaces facing the object side and the image side, respectively, wherein the concave surface of the fourth lens L4 and the convex surface of the fifth lens L5 is disposed to face each other. The sixth lens L6 has a convex surface and a concave surface, which are disposed to face the object side and the image side, respectively.

According to this embodiment of the present disclosure, the achromatic lens group of the optical lens is preferably a glued lens. In other words, the fourth lens L4 and the fifth lens L5 are glued together to form the achromatic lens group. At this time, since the fourth lens L4 and the fifth lens L5 are glued together, the image surface S8 of the concave surface of the fourth lens L4 and the object surface S9 of the convex surface of the fifth lens L5 are disposed in a glued manner to face each other. Of course, in other embodiments of the present disclosure, the achromatic lens group may also be a separation-type achromatic lens group. It would be understood that when the achromatic lens group is a separation-type achromatic lens group, the fourth lens L4 and the fifth lens L5 are separately disposed.

It is worth mentioning that the first lens L1 and the second lens L2 may be made of a glass material, or may be made of other materials having good light transmission performance, such as plastics and resins. It would be understood by those skilled in the art that in the optical lens of the present disclosure, light enters from the first lens L1, and is transmitted to the second lens L2 after being converged by the first lens L1. Therefore, light at a large angle can be collected by the first lens L1. Further, the light reaches the second lens L2 after passing through the first lens L1, and the light converged by the first lens L1 is appropriately diverged by the second lens L2 to be transmitted to the rear of the optical lens. Therefore, the refractive indices Nd of the first lens L1 and the second lens L2 need to match with each other. However, it would be understood by those skilled in the art that the refractive indices Nd of the first lens L1 and the second lens L2 are not a limitation of the present disclosure. On the other hand, in the present disclosure, the first lens L1 and the second lens L2 are provided with an Abbe constant Vd, so that the lens has better image quality. However, it should be understood by those skilled in the art that the Abbe constants Vd of the first lens L1 and the second lens L2 are not a limitation of the present disclosure.

As shown in FIG. 5, it is a structural schematic view of the optical lens according to the third embodiment of the present disclosure. The optical lens includes, sequentially from the object side to the image side, a front lens group, a diaphragm L7, a rear lens group, a filter element L8, a plane lens L9, and an imaging plane L10.

Herein, the front lens group includes, sequentially from the object side to the image side: a first lens L1, a second lens L2, and a third lens L3, the first lens L1 being a meniscus lens having a negative focal power, the second lens L2 being a meniscus lens having a positive focal power, the concave surface of the first lens L1 being opposite to the concave surface of the second lens L2, and the third lens L3 being a biconvex lens having positive focal power; and the rear lens group includes, sequentially from the object side to the image side: a fourth lens L4, a fifth lens L5, and a sixth lens L6, the fourth lens L4 being a biconcave lens having a negative focal power, the fifth lens L5 being a biconvex lens having a positive focal power, and the concave surface of the fourth lens L4 being opposite to the convex surface of the fifth lens L5. Further, the concave surface of the fourth lens L4 and the convex surface of the fifth lens L5 are glued. The sixth lens L6 is a meniscus lens having a positive focal power.

In this embodiment, the first lens L1 satisfies the following condition: $0.5 \leq R1/(R2+d1) \leq 1.5$;

where R1 is a radius of curvature of the object surface S1 of the first lens L1, R2 is a radius of curvature of the image surface S2 of the first lens L1, and d1 is a center thickness of the first lens L1.

The second lens L2 satisfies the following condition: $0.45 \leq |R4|/(|R3|+d2) \leq 1.3$;

where R3 is a radius of curvature of the object surface S3 of the second lens L2, R4 is a radius of curvature of the image surface S4 of the second lens L2, and d2 is a center thickness of the second lens L2.

By the above conditions, the relationships between the respective radii of curvature and thickness of the first lens L1 and the second lens L2 are restricted so that the first lens L1 and the second lens L2 are close to a concentric circle. Therefore, when the concave surfaces of the first lens L1 and the second lens L2 are oppositely disposed, light at a large angle can be collected to enter the optical lens, and be appropriately diverged by the second lens L2 to be transmitted backward.

In this embodiment of the present disclosure, the focal length F1 of the first lens L1 and the overall focal length F of the optical lens satisfy the following condition: $-3.5 \leq F1/F \leq -1$.

The focal length F2 of the second lens L2 and the overall focal length F of the optical lens satisfy the following condition: $|F2/F| \geq 5.0$.

If the maximum field of view of the optical lens is FOVm and the image height corresponding to the maximum field of view of the optical lens is Ym, then $(FOVm \times F)/Ym \geq 45°$.

In this embodiment of the present disclosure, the first lens L1, the second lens L2, and the sixth lens L6 are aspherical lenses.

Preferably, the first lens L1, the second lens L2, and the sixth lens L6 are glass aspherical lenses, and the third lens L3, the fourth lens L4, and the fifth lens L5 are spherical lenses. It should be understood by those skilled in the art that the first lens L1, the second lens L2, and the sixth lens L6 are not limited to glass aspherical lenses, and may be plastic aspherical or spherical lenses or the like. The third lens L3, the fourth lens L4, and the fifth lens L5 are not limited to glass spherical lenses, and may be glass aspheric surfaces, plastic aspheric surfaces, resin aspheric surfaces or the like. The present disclosure is not limited in this respect. In particular, in some embodiments of the present disclosure, the optical lens is composed of six lenses consisting of three glass spherical surfaces and three glass aspheric surfaces. For example, the first lens L1, the second lens L2, and the sixth lens L6 are glass aspherical lenses, and the third lens L3, the fourth lens L4, and the fifth lens L5 are glass spherical lenses, so that the optical lens has the characteristics of a long focal length and a large field of view, and the resolution of the optical lens is ensured by the glass aspherical lenses while reducing chromatic aberration.

In this embodiment of the present disclosure, the first lens L1, the second lens L2, and the sixth lens L6 are aspherical lenses. The first lens L1 and the second lens L2 are close to the concentric lens, and are aspherical, so that light at a large angle can be effectively and smoothly converged, and due to the aspherical setting, the processing difficulty of the conventional spherical concentric lenses is avoided.

Further, in some embodiments, the object surface S1 of the first lens L1 has a central region S101 and an edge region S102 extending outwardly from the central region S101, the central region S101 of the object surface S1 of the first lens L1 is convex, and the edge region S102 of the object surface S1 of the first lens L1 is concave. It should be understood by those skilled in the art that the specific structure of the aspherical surface and the specific structures and ranges of the central and edge regions of the first lens L1 are not a limitation of the present disclosure.

The aspherical lens surfaces of the first lens L1, the second lens L2, and the sixth lens L6 satisfy the formula (1) given in the first embodiment.

As shown in FIG. 6, it is a graph of the optical performance of this embodiment of the present disclosure. It can be seen from the MTF graph of the optical lens that the optical lens has higher resolution and better optical performance.

Parameters of the optical lens of this embodiment of the present disclosure are as shown in Tables 5 and 6 below. It should be noted that the two surfaces, i.e. the object surface and the image surface, of the first lens L1, are S1 and S2, respectively, the two surfaces, i.e. the object surface and the image surface, of the second lens L2, are S3 and S4, respectively, the two surfaces, i.e. the object surface and the image surface, of the third lens L3, are S5 and S6, respectively, the two surfaces, i.e. the object surface and the image surface, of the fourth lens L4, are S7 and S8, respectively, the two surfaces, i.e. the object surface and the image surface, of the fifth lens L5, are S9 and S10, respectively, the two surfaces, i.e. the object surface and the image surface, of the sixth lens L6, are S11 and S12, respectively, the two surfaces of the filter element L8 are S13 and S14, respectively, the two surfaces of the plane lens L9 are S15 and S16, respectively, and the imaging plane is S17; and S1-S17 are in one-to-one correspondence with the surface numbers in Tables 5 and 6 below.

TABLE 5

Parameters of the optical lens of the third embodiment

| Surface No. | Radius of curvature R | Center thickness d | Refractive index Nd | Abbe constant Vd |
|---|---|---|---|---|
| 1 | 3.8234 | 2.0812 | 1.81 | 40.9 |
| 2 | 2.0011 | 2.6659 | | |
| 3 | −9.2801 | 2.0559 | 1.59 | 61.3 |
| 4 | −8.3799 | 0.1290 | | |
| 5 | 12.1741 | 2.5518 | 1.90 | 31.3 |
| 6 | −16.3170 | −0.0430 | | |
| 7 | Infinity | 1.4341 | | |
| 8 | −17.2801 | 0.5590 | 1.85 | 23.8 |
| 9 | 4.6385 | 2.3618 | 1.80 | 46.6 |
| 10 | −11.1594 | 0.0860 | | |
| 11 | 6.0172 | 2.4939 | 1.50 | 81.6 |
| 12 | 33.6275 | 0.8600 | | |
| 13 | Infinity | 0.5000 | 1.52 | 64.2 |
| 14 | Infinity | 0.8600 | | |
| 15 | Infinity | 0.4000 | 1.52 | 64.1 |
| 16 | Infinity | 1.6813 | | |
| 17 | Infinity | | | |

TABLE 6

Aspheric coefficients of the third embodiment

| Surface No. | K | A | B | C | D | E |
|---|---|---|---|---|---|---|
| 1 | −0.968305 | −9.8531E−04 | −2.3358E−04 | −2.5150E−06 | 8.2714E−07 | −2.0099E−08 |
| 2 | −0.8875726 | −2.6598E−03 | −1.9536E−03 | 2.3206E−04 | −1.5102E−05 | 6.5871E−08 |
| 3 | 2.795989 | −1.3817E−03 | −2.9074E−04 | 1.7953E−05 | 5.0127E−07 | −2.4917E−08 |
| 4 | 0.7232522 | −6.1474E−04 | −1.7708E−04 | 3.6148E−05 | −3.3595E−07 | 1.1253E−08 |
| 11 | −1.835102 | −2.7274E−04 | 9.4589E−05 | −1.9622E−05 | 1.4865E−06 | −6.5722E−09 |
| 12 | −3.87E+18 | −1.4188E−04 | 2.8070E−05 | −2.7007E−07 | −4.9117E−06 | 8.9289E−09 |

Based on the above data, the numerical values of the formulas involved in this embodiment are calculated as follows:
R1/(R2+d1)=0.937, |R4|/(|R3|+d2)=0.739, F1/F=−1.815, |F2|/F=13.531, TTL/F=3.541, (FOVm×F)/Ym=91.490°. As shown in Tables 5 and 6, in this embodiment, as a set of specific embodiment parameters, the optical lenses with these parameters can achieve better optical performance, have a longer overall focal length, and have a larger field of view.

In summary, the optical lens of the present disclosure can satisfy the requirements of miniaturization and realize a long focal length, a large field of view, and a large aperture through the design of the six-lens structure and aspherical lenses close to a concentric circle. Moreover, it can meet the high definition requirements and effectively correct various aberrations of the optical system, especially suitable for in-vehicle camera systems. It can capture distant objects, and the overall field of vision is enlarged. The functions of both the conventional telephoto lens and the conventional wide-angle lens can be realized by one lens, reducing the cost of the in-vehicle camera system and improving the actual performance of the lens.

This embodiment differs from the first embodiment in that the focal power of the second lens is different and the structures of the fourth lens and the sixth lens are different in this embodiment.

Fourth Embodiment

Figure 7:
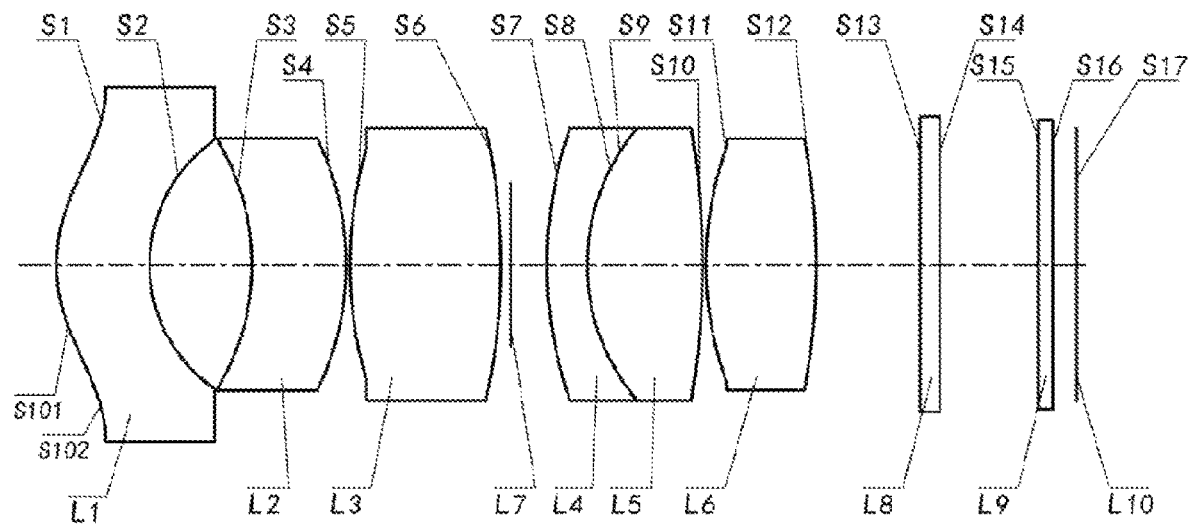
FIG. 7 is a structural schematic view of an optical lens according to a fourth embodiment of the present disclosure.
Figure 8:
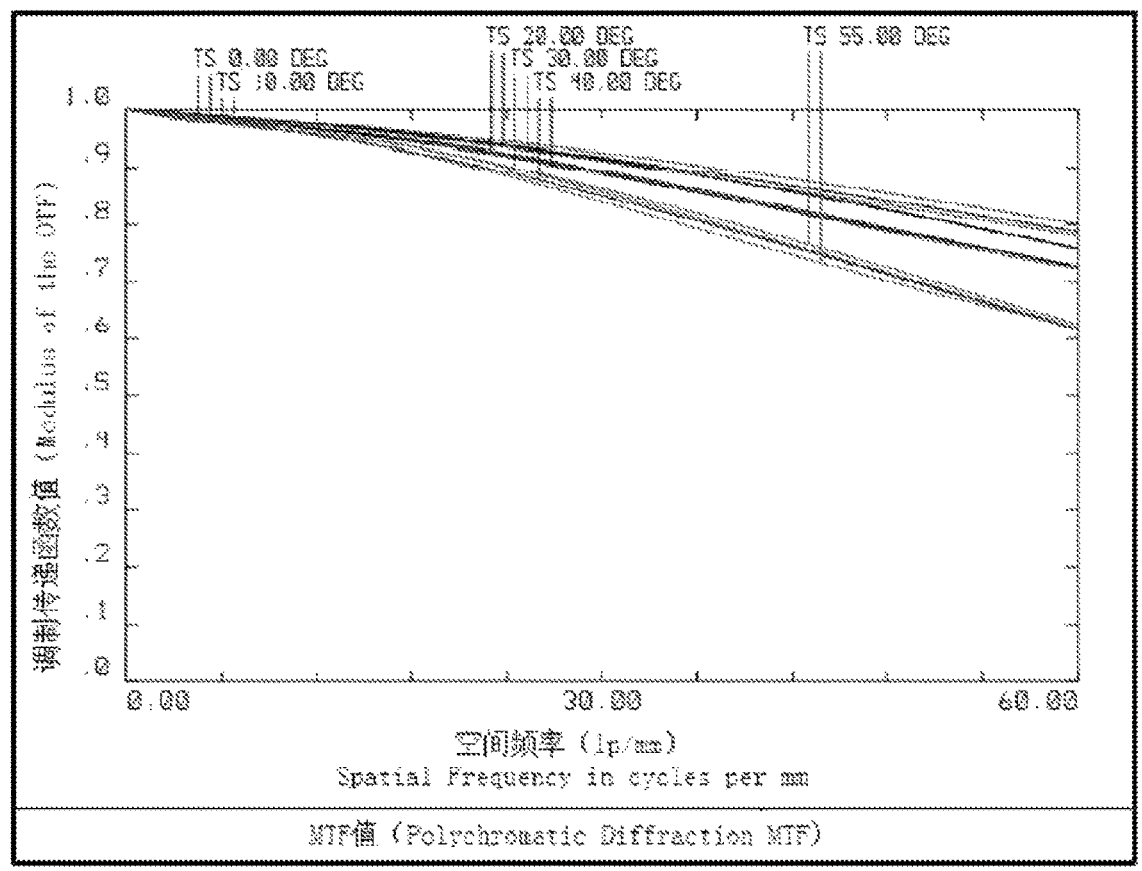
FIG. 8 is a MTF graph of the optical lens according to the fourth embodiment of the present disclosure.

Referring to FIGS. 7 and 8, an optical lens according to a fourth embodiment of the present disclosure is explained, wherein the optical lens includes at least one first lens L1, at least one second lens L2, a third lens L3, a fourth lens L4, a fifth lens L5 and a sixth lens L6. The first lens L1, the second lens L2, the third lens L3, the fourth lens L4, the fifth lens L5, and the sixth lens L6 are sequentially arranged along a direction from an object side to an image side.

The first lens L1 has a negative focal power, and the first lens L1 has an object surface S1 facing the object side and an image surface S2 facing the image side. According to this embodiment of the present disclosure, the object surface S1 of the first lens L1 is convex in order to increase the luminous flux of the optical lens. That is, the convex object surface S1 of the first lens L1 converges light at a larger angle to increase the luminous flux entering the optical lens from the object side. Preferably, the object surface S1 of the first lens L1 is an aspherical lens in order to reduce the processing difficulty. Of course, in other embodiments of the present disclosure, the first lens L1 may be a spherical lens.

Further, according to this embodiment of the present disclosure, the image surface S2 of the first lens L1 is concave. That is, the first lens L1 includes two surfaces S1 and S2, one of which is convex, and the other of which is concave. The concave surface and the convex surface form a meniscus shape, and the meniscus is convex toward the object side so as to increase the light entering the optical lens.

It should be noted that, in the imaging system lens group provided by the present disclosure, when the lens surface is convex and the position of the convex surface is not defined, it indicates that the lens surface is convex near the optical axis; When the lens surface is concave and the position of the concave surface is not defined, it indicates that the lens surface is concave near the optical axis.

The second lens L2 has an object surface S3 facing the object side and an image surface S4 facing the image side. According to this embodiment of the present disclosure, the image surface S4 of the second lens L2 is convex to facilitate proper divergence of light passing through the first lens L1 to be transmitted to the rear of the optical lens. The second lens L2 has a positive focal power. That is, the second lens L2 has an effect of transition light to smoothly transition the light of the first lens L1 to the third lens L3. Preferably, the second lens L2 is an aspherical lens so as to reduce the processing difficulty. Of course, in other embodiments of the present disclosure, the second lens L2 may be a spherical lens.

Further, according to this embodiment of the present disclosure, the object surface S3 of the second lens L2 is convex. That is, the second lens L2 includes two surfaces S3 and S4, one of which is convex and the other of which is concave. The convex surface and the concave surface form a meniscus shape, and the meniscus is convex toward the image side to facilitate divergence of light passing through the first lens L1 to be transmitted backward.

It is worth mentioning that the meniscus shapes of the first lens L1 and the second lens L2 are oppositely disposed to be close to a concentric circle structure, so that the optical lens has a smaller field of view, a larger focal length, and a higher angle resolution near the center.

The third lens L3 has an object surface S5 facing the object side, and an image surface S6 facing the image side. The object surface S5 and the image surface S6 of the third lens L3 both are convex to facilitate convergence of the light transmitted by the second lens L2 to be transmitted toward the rear of the optical lens. In other words, the third lens L3 is a biconvex lens having light transition and convergence effects.

According to this embodiment of the present disclosure, the third lens L3 has a positive focal power.

The fourth lens L4 and the fifth lens L5 form an achromatic lens group so as to reduce chromatic aberration of the light transmitted by the front components of the optical lens.

Referring to FIG. 7, the first lens L1, the second lens L2, the third lens L3, the fourth lens L4, the fifth lens L5, and the sixth lens L6 form a front lens group and a rear lens group, wherein the front lens group includes the first lens L1, the second lens L2, and the third lens L3, and the rear lens group includes the fourth lens L4, the fifth lens L5 and the sixth lens L6. The front lens group and the rear lens group are sequentially disposed along the direction from the object side to the image side.

Referring to FIG. 7, according to this embodiment of the present disclosure, the optical centers of the first lens L1, the second lens L2, the third lens L3, the fourth lens L4, the fifth lens L5 and the sixth lens L6 of the optical lens are coaxial. In other words, the principal optical axes of the first lens L1, the second lens L2, the third lens L3, the fourth lens L4, the fifth lens L5, and the sixth lens L6 of the optical lens are consistent.

Referring to FIG. 7, according to this embodiment of the present disclosure, the optical lens further includes a diaphragm L7, wherein the front lens group and the rear lens group are separately disposed on both sides of the diaphragm L7, and wherein the optical center of the diaphragm L7 is coaxial with the optical centers of the first lens L1, the second lens L2, the third lens L3, the fourth lens L4, the fifth lens L5 and the sixth lens L6. Preferably, the diaphragm L7 is disposed between the third lens L3 and the fourth lens L4.

It is worth mentioning that, referring to FIG. 7, in this embodiment of the present disclosure, the diaphragm L7 is disposed between the third lens L3 and the fourth lens L4 to reduce the stray light in the optical lens so that the optical lens have a good imaging effect. In other embodiments of the present disclosure, the diaphragm L7 may be disposed at other positions, for example, between the second lens L2 and the third lens L3, between the fourth lens L4 and the fifth lens L5, between the fifth lens L5 and the sixth lens L6 or the like. It should be understood by those skilled in the art that the position of the diaphragm L7 is not a limitation of the present disclosure. In other words, the front lens group is not limited to consist of the first lens L1, the second lens L2, and the third lens L3, and the rear lens group is not limited to consist of the fourth lens L4, the fifth lens L5, and the sixth lens L6. When the diaphragm L7 is disposed at different positions, the optical lens may form different front lens groups and rear lens groups.

As shown in FIG. 7, according to this embodiment of the present disclosure, the fourth lens L4 has an object surface S7 facing the object side and an image surface S8 facing the image side. Further, the object surface S7 of the fourth lens L4 is convex, and the image surface S8 of the fourth lens L4 is concave. In other words, the fourth lens L4 has two surfaces S7 and S8, which are a convex surface and a concave surface, respectively, the convex surface and the concave surface form a meniscus shape, and the meniscus is convex toward the object side. Further, according to this embodiment of the present disclosure, the fourth lens L4 has a negative focal power.

According to this embodiment of the present disclosure, the fifth lens L5 has an object surface S9 facing the object side, and an image surface S10 facing the image side. Further, the object surface S9 of the fifth lens L5 is convex, and the image surface S10 of the fifth lens L5 is convex. In other words, the fifth lens L5 is a biconvex lens. Further, according to this embodiment of the present disclosure, the fifth lens L5 has a positive focal power.

Further, the image surface S8 of the fourth lens L4 and the object surface S9 of the fifth lens L5 are disposed to face each other. In other words, the image surface S8 of the fourth lens L4 and the object surface S9 of the fifth lens L5 are disposed to face each other. In this embodiment, the concave surface of the fourth lens L4 and the convex surfaces of the fifth lens L5 are disposed to face each other.

According to this embodiment of the present disclosure, the sixth lens L6 has an object surface S11 facing the object side, and an image surface S12 facing the image side. Further, the object surface S11 of the sixth lens L6 is convex, and the image surface S12 of the sixth lens L6 is convex. In other words, the sixth lens L6 is a biconvex lens. Further, the sixth lens L6 has a positive focal power. The aberration and distortion are further corrected by the sixth lens L6, so that the imaging quality of the optical lens is better.

It is worth mentioning that, in this embodiment of the present disclosure, the sixth lens L6 is used to appropriately increase the distortion of the lens edge of the front lenses of the optical lens, so that light at a large angle can reach the imaging plane L10 with a predetermined size, such as the photosensitive chip surface. Moreover, the image can be continuously corrected by software post-processing, so that the image formed by the light after passing through the sixth lens L6 is restored to normal, namely obtaining large-angle imaging.

According to this embodiment of the present disclosure, the optical lens further includes a plane lens L9 for protecting the optical lens by isolation. Of course, in other embodiments of the present disclosure, the plane lens L9 may not be provided, and the present disclosure is not limited in this respect.

Referring to FIG. 7, according to this embodiment of the present disclosure, the first lens L1 of the optical lens has a convex surface and a concave surface, and the second lens L2 has a concave surface and a convex surface, wherein the convex surface of the first lens L1 is disposed to face the object side, the concave surface of the first lens L1 is disposed to face the image side, the concave surface of the second lens L2 is disposed to face the object side, and the convex surface of the second lens L2 is disposed to face the image side. The third lens L3 has two convex surfaces facing the object side and the image side, respectively. The fourth lens L4 has a convex surface and a concave surface facing the object side and the image side, respectively, and the fifth lens L5 has two convex surfaces facing the object side and the image side, respectively, wherein the concave surface of the fourth lens L4 and the convex surface of the fifth lens L5 is oppositely disposed to face each other. The sixth lens L6 has two convex surfaces, which are disposed to face the object side and the image side, respectively.

According to this embodiment of the present disclosure, the achromatic lens group of the optical lens is preferably a glued lens. In other words, the fourth lens L4 and the fifth lens L5 are glued together to form the achromatic lens group. At this time, since the fourth lens L4 and the fifth lens L5 are glued together, the image surface S8 of the concave surface of the fourth lens L4 and the object surface S9 of the convex surface of the fifth lens L5 are disposed in a glued manner to face each other. Of course, in other embodiments of the present disclosure, the achromatic lens group may also be a separation-type achromatic lens group. It would be understood that when the achromatic lens group is a separation-type achromatic lens group, the fourth lens L4 and the fifth lens L5 are separately disposed.

It is worth mentioning that the first lens L1 and the second lens L2 may be made of a glass material, or may be made of other materials having good light transmission performance, such as plastics and resins. It would be understood by those skilled in the art that in the optical lens of the present disclosure, light enters from the first lens L1, and is transmitted to the second lens L2 after being converged by the first lens L1. Therefore, light at a large angle can be collected by the first lens L1. Further, the light reaches the second lens L2 after passing through the first lens L1, and the light converged by the first lens L1 is appropriately diverged by the second lens L2 to be transmitted to the rear of the optical lens. Therefore, the refractive indices Nd of the first lens L1 and the second lens L2 need to match with each other. However, it would be understood by those skilled in the art that the refractive indices Nd of the first lens L1 and the second lens L2 are not a limitation of the present disclosure. On the other hand, in the present disclosure, the first lens L1 and the second lens L2 are provided with an Abbe constant Vd, so that the lens has better image quality. However, it should be understood by those skilled in the art that the Abbe constants Vd of the first lens L1 and the second lens L2 are not a limitation of the present disclosure.

As shown in FIG. 7, it is a structural schematic view of the optical lens according to the fourth embodiment of the present disclosure. The optical lens includes, sequentially from the object side to the image side, a front lens group, a diaphragm L7, a rear lens group, a filter element L8, a plane lens L9, and an imaging plane L10.

Herein, the front lens group includes, sequentially from the object side to the image side: a first lens L1, a second lens L2, and a third lens L3, the first lens L1 being a meniscus lens having a negative focal power, the second lens L2 being a meniscus lens having a positive focal power, the concave surface of the first lens L1 being opposite to the concave surface of the second lens L2, and the third lens L3 being a biconvex lens having positive focal power; and the rear lens group includes, sequentially from the object side to the image side: a fourth lens L4, a fifth lens L5, and a sixth lens L6, the fourth lens LA being a meniscus lens having a negative focal power, the fifth lens L5 being a biconvex lens having a positive focal power, and the concave surface of the fourth lens L4 being opposite to the convex surface of the fifth lens L5. Further, the concave surface of the fourth lens L4 and the convex surface of the fifth lens L5 are glued. The sixth lens L6 is a biconvex lens having a positive focal power.

In this embodiment, the first lens L1 satisfies the following condition: $0.5 \leq R1/(R2+d1) \leq 1.5$;
where R1 is a radius of curvature of the object surface S1 of the first lens L1, R2 is a radius of curvature of the image surface S2 of the first lens L1, and d1 is a center thickness of the first lens L1.

The second lens L2 satisfies the following condition: $0.45 \leq |R4|/(|R3|+d2) \leq 1.3$;
where R3 is a radius of curvature of the object surface S3 of the second lens L2, R4 is a radius of curvature of the image surface S4 of the second lens L2, and d2 is a center thickness of the second lens L2.

By the above conditions, the relationships between the respective radii of curvature and thickness of the first lens L1 and the second lens L2 are restricted so that the first lens L1 and the second lens L2 are close to a concentric circle. Therefore, when the concave surfaces of the first lens L1 and the second lens L2 are oppositely disposed, light at a large angle can be collected to enter the optical lens, and be appropriately diverged by the second lens L2 to be transmitted backward.

In this embodiment of the present disclosure, the focal length F1 of the first lens L1 and the overall focal length F of the optical lens satisfy the following condition: $-3.5 \leq F1/F \leq -1$.

The focal length F2 of the second lens L2 and the overall focal length F of the optical lens satisfy the following condition: $|F2/F| \geq 5.0$.

If the maximum field of view of the optical lens is FOVm and the image height corresponding to the maximum field of view of the optical lens is Ym, then $(FOVm \times F)/Ym \geq 45°$.

In this embodiment of the present disclosure, the first lens L1, the second lens L2, and the sixth lens L6 are aspherical lenses.

Preferably, the first lens L1, the second lens L2, and the sixth lens L6 are glass aspherical lenses, and the third lens L3, the fourth lens L4, and the fifth lens L5 are spherical lenses. It should be understood by those skilled in the art that the first lens L1, the second lens L2, and the sixth lens L6 are not limited to glass aspherical lenses, and may be plastic aspherical or spherical lenses or the like. The third lens L3, the fourth lens L4, and the fifth lens L5 are not limited to glass spherical lenses, and may be glass aspheric surfaces, plastic aspheric surfaces, resin aspheric surfaces or the like. The present disclosure is not limited in this respect. In particular, in some embodiments of the present disclosure, the optical lens is composed of six lenses consisting of three glass spherical surfaces and three glass aspheric surfaces. For example, the first lens L1, the second lens L2, and the sixth lens L6 are glass aspherical lenses, and the third lens L3, the fourth lens L4, and the fifth lens L5 are glass spherical lenses, so that the optical lens has the characteristics of a long focal length and a large field of view, and the resolution of the optical lens is ensured by the glass aspherical lenses while reducing chromatic aberration.

In this embodiment of the present disclosure, the first lens L1, the second lens L2, and the sixth lens L6 are aspherical lenses. The first lens L1 and the second lens L2 are close to the concentric lens, and are aspherical, so that light at a large angle can be effectively and smoothly converged, and due to the aspherical setting, the processing difficulty of the conventional spherical concentric lenses is avoided.

Further, in some embodiments, the object surface S1 of the first lens L1 has a central region S101 and an edge region S102 extending outwardly from the central region S101, the central region S101 of the object surface S1 of the first lens L1 is convex, and the edge region S102 of the object surface S1 of the first lens L1 is concave. It should be understood by those skilled in the art that the specific structure of the aspherical surface and the specific structures and ranges of the central and edge regions of the first lens L1 are not a limitation of the present disclosure.

The aspherical lens surfaces of the first lens L1, the second lens L2, and the sixth lens L6 satisfy the formula (1) given in the first embodiment.

As shown in FIG. 8, it is a graph of the optical performance of this embodiment of the present disclosure. It can be seen from the MTF graph of the optical lens that the optical lens has higher resolution and better optical performance.

Parameters of the optical lens of this embodiment of the present disclosure are as shown in Tables 7 and 8 below. It should be noted that the two surfaces, i.e. the object surface and the image surface, of the first lens L1, are S1 and S2, respectively, the two surfaces, i.e. the object surface and the image surface, of the second lens L2, are S3 and S4, respectively, the two surfaces, i.e. the object surface and the image surface, of the third lens L3, are S5 and S6, respectively, the two surfaces, i.e. the object surface and the image surface, of the fourth lens L4, are S7 and S8, respectively, the two surfaces, i.e. the object surface and the image surface, of the fifth lens L5, are S9 and S10, respectively, the two surfaces, i.e. the object surface and the image surface, of the sixth lens L6, are S11 and S12, respectively, the two surfaces of the filter element L8 are S13 and S14, respectively, the two surfaces of the plane lens L9 are S15 and S16, respectively, and the imaging plane is S17; and S1-S17 are in one-to-one correspondence with the surface numbers in Tables 7 and 8 below.

TABLE 7

Parameters of the optical lens of the fourth embodiment

| Surface No. | Radius of curvature R | Center thickness d | Refractive index Nd | Abbe constant Vd |
|---|---|---|---|---|
| 1 | 4.2475 | 2.4849 | 1.86 | 36.6 |
| 2 | 2.4718 | 2.8683 | | |
| 3 | −7.0386 | 2.6337 | 1.58 | 61.1 |
| 4 | −7.7488 | 0.1000 | | |
| 5 | 14.6014 | 4.1000 | 1.90 | 37.1 |
| 6 | −12.8969 | −0.1000 | | |
| 7 | Infinity | 1.0177 | | |
| 8 | 40.1873 | 1.1466 | 1.92 | 20.9 |
| 9 | 7.6891 | 2.6188 | 1.76 | 52.3 |
| 10 | −23.1237 | 0.1000 | | |
| 11 | 10.0000 | 2.8000 | 1.50 | 81.6 |
| 12 | −269.3559 | 1.0000 | | |
| 13 | Infinity | 0.5500 | 1.52 | 64.2 |
| 14 | Infinity | 1.7598 | | |
| 15 | Infinity | 0.4000 | 1.52 | 64.2 |
| 16 | Infinity | 0.3212 | | |
| 17 | Infinity | | | |

TABLE 8

Aspheric coefficients of the fourth embodiment

| Surface No. | K | A | B | C | D | E |
|---|---|---|---|---|---|---|
| 1 | −0.9590625 | −6.4944E−04 | −1.2078E−04 | −5.3975E−07 | 2.2275E−07 | −4.1417E−09 |
| 2 | −1.773352 | −2.8145E−03 | −7.9828E−04 | 7.6984E−05 | −3.4482E−06 | 1.1862E−07 |
| 3 | −0.00224598 | −1.4175E−03 | −4.8587E−05 | 1.2482E−05 | −1.6969E−07 | −1.9919E−08 |
| 4 | −0.195443 | −5.2260E−04 | 1.2933E−04 | 5.0857E−05 | −2.1495E−06 | 1.1890E−07 |
| 11 | −6.253544 | 4.5344E−04 | 5.5237E−05 | −1.0361E−05 | 6.9645E−07 | −1.8079E−08 |
| 12 | 5561.805 | −1.9695E−03 | 1.8189E−04 | −8.2462E−05 | −1.9847E−07 | 2.0609E−08 |

Based on the above data, the numerical values of the formulas involved in this embodiment are calculated as follows:
R1/(R2+d1)=0.857, |R4|/(|R3|+d2)=0.801, F1/F=−3.124, |F2|/F=58.026, TTL/F=3.818, (FOVm×F)/Ym=89.823°. As shown in Tables 7 and 8, in this embodiment, as a set of specific embodiment parameters, the optical lenses with these parameters can achieve better optical performance, have a longer overall focal length, and have a larger field of view.

In summary, the optical lens of the present disclosure can satisfy the requirements of miniaturization and realize a long focal length, a large field of view, and a large aperture through the design of the six-lens structure and aspherical lenses close to a concentric circle. Moreover, it can meet the high definition requirements and effectively correct various aberrations of the optical system, especially suitable for in-vehicle camera systems. It can capture distant objects, and the overall field of vision is enlarged. The functions of both the conventional telephoto lens and the conventional wide-angle lens can be realized by one lens, reducing the cost of the in-vehicle camera system and improving the actual performance of the lens.

This embodiment of the present disclosure differs from the first embodiment in that the focal power of the second lens L2 is different.

Fifth Embodiment

Figure 9:
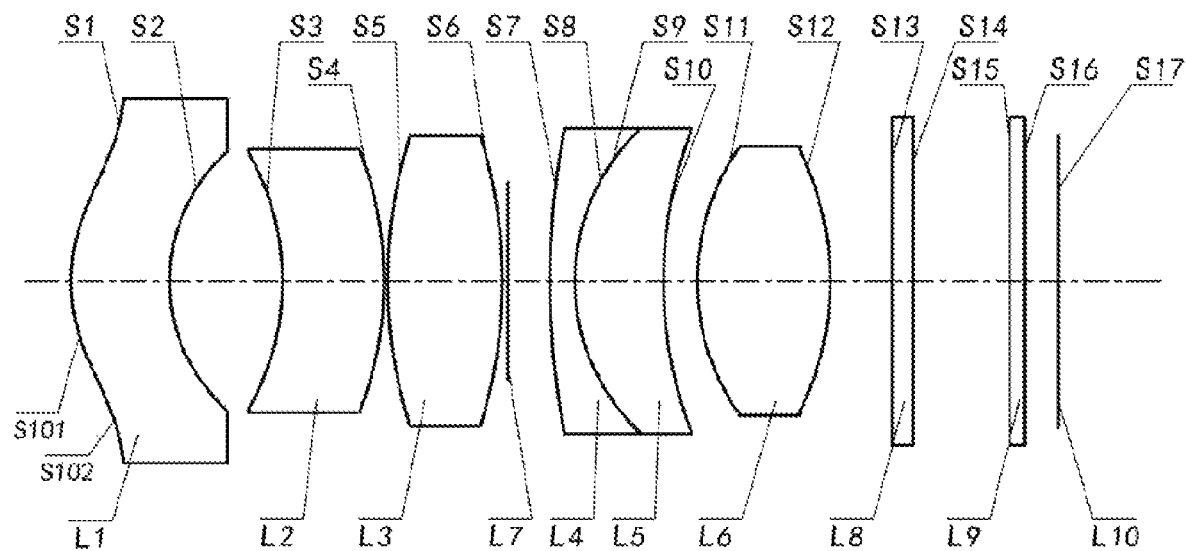
FIG. 9 is a structural schematic view of an optical lens according to a fifth embodiment of the present disclosure.
Figure 10:
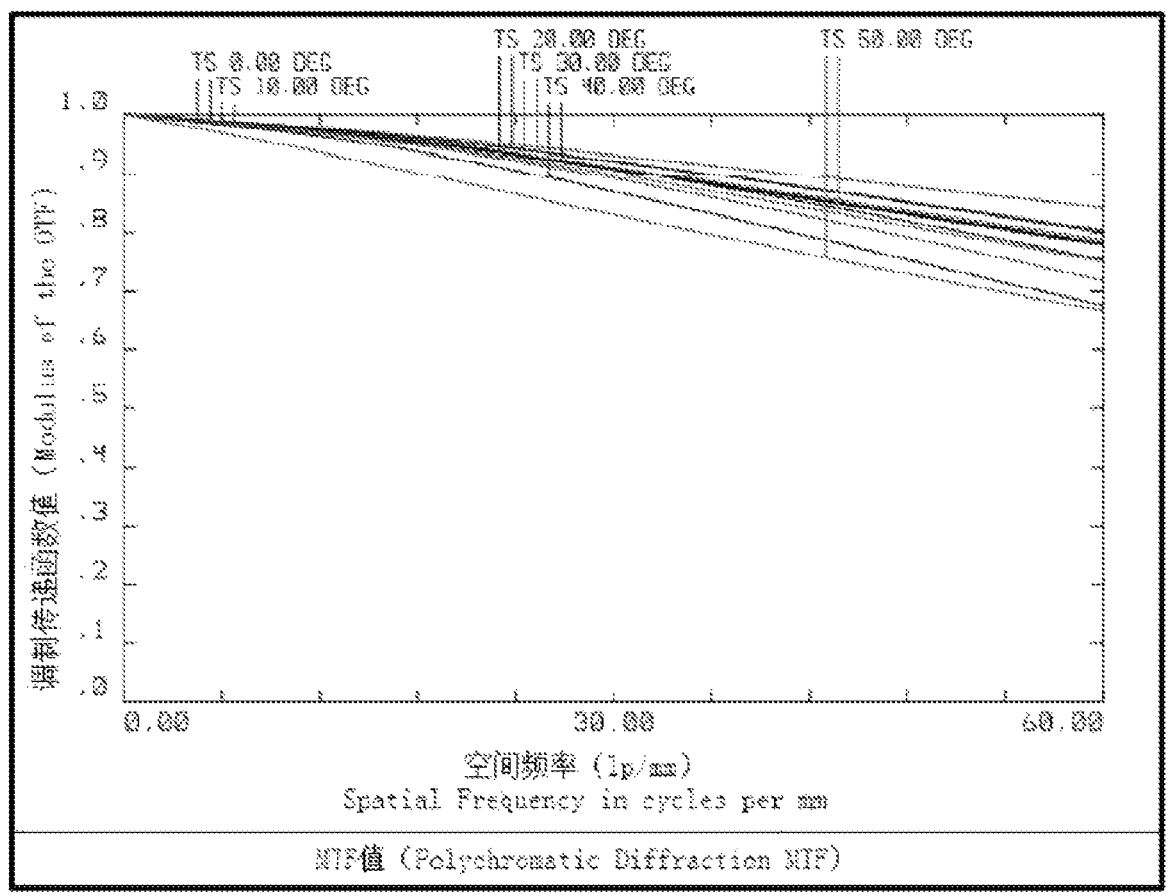
FIG. 10 is a MTF graph of the optical lens according to the fifth embodiment of the present disclosure.

Referring to FIGS. 9 and 10, an optical lens according to a fifth embodiment of the present disclosure is explained, wherein the optical lens includes at least one first lens L1, at least one second lens L2, a third lens L3, a fourth lens L4, a fifth lens L5 and a sixth lens L6. The first lens L1, the second lens L2, the third lens L3, the fourth lens L4, the fifth lens L5, and the sixth lens L6 are sequentially arranged along a direction from an object side to an image side.

The first lens L1 has a negative focal power, and the first lens L1 has an object surface S1 facing the object side and an image surface S2 facing the image side. According to this embodiment of the present disclosure, the object surface S1 of the first lens L1 is convex in order to increase the luminous flux of the optical lens. That is, the convex object surface S1 of the first lens L1 converges light at a larger angle to increase the luminous flux entering the optical lens from the object side. Preferably, the object surface S1 of the first lens L1 is an aspherical lens in order to reduce the processing difficulty. Of course, in other embodiments of the present disclosure, the first lens L1 may be a spherical lens.

Further, according to this embodiment of the present disclosure, the image surface S2 of the first lens L1 is concave. That is, the first lens L1 includes two surfaces S1 and S2, one of which is convex, and the other of which is concave. The concave surface and the convex surface form a meniscus shape, and the meniscus is convex toward the object side so as to increase the light entering the optical lens.

It should be noted that, in the imaging system lens group provided by the present disclosure, when the lens surface is convex and the position of the convex surface is not defined, it indicates that the lens surface is convex near the optical axis; When the lens surface is concave and the position of the concave surface is not defined, it indicates that the lens surface is concave near the optical axis.

The second lens L2 has an object surface S3 facing the object side and an image surface S4 facing the image side. According to this embodiment of the present disclosure, the image surface S4 of the second lens L2 is convex to facilitate proper divergence of light passing through the first lens L1 to be transmitted to the rear of the optical lens. The second lens L2 has a negative focal power. That is, the second lens L2 has an effect of transition light to smoothly transition the light of the first lens L1 to the third lens L3. Preferably, the second lens L2 is an aspherical lens so as to reduce the processing difficulty. Of course, in other embodiments of the present disclosure, the second lens L2 may be a spherical lens.

Further, according to this embodiment of the present disclosure, the object surface S3 of the second lens L2 is convex. That is, the second lens L2 includes two surfaces S3 and S4, one of which is convex and the other of which is concave. The convex surface and the concave surface form a meniscus shape, and the meniscus is convex toward the image side to facilitate divergence of light passing through the first lens L1 to be transmitted backward.

It is worth mentioning that the meniscus shapes of the first lens L1 and the second lens L2 are oppositely disposed to be close to a concentric circle structure, so that the optical lens has a smaller field of view, a larger focal length, and a higher angle resolution near the center.

The third lens L3 has an object surface S5 facing the object side, and an image surface S6 facing the image side. The object surface S5 and the image surface S6 of the third lens L3 both are convex to facilitate convergence of the light transmitted by the second lens L2 to be transmitted toward the rear of the optical lens. In other words, the third lens L3 is a biconvex lens having light transition and convergence effects.

According to this embodiment of the present disclosure, the third lens L3 has a positive focal power.

The fourth lens L4 and the fifth lens L5 form an achromatic lens group so as to reduce chromatic aberration of the light transmitted by the front components of the optical lens.

Referring to FIG. 9, the first lens L1, the second lens L2, the third lens L3, the fourth lens L4, the fifth lens L5, and the sixth lens L6 form a front lens group and a rear lens group, wherein the front lens group includes the first lens L1, the second lens L2, and the third lens L3, and the rear lens group includes the fourth lens L4, the fifth lens L5 and the sixth lens L6. The front lens group and the rear lens group are sequentially disposed along the direction from the object side to the image side.

Referring to FIG. 9, according to this embodiment of the present disclosure, the optical centers of the first lens L1, the second lens L2, the third lens L3, the fourth lens L4, the fifth lens L5 and the sixth lens L6 of the optical lens are coaxial. In other words, the principal optical axes of the first lens L1, the second lens L2, the third lens L3, the fourth lens L4, the fifth lens L5, and the sixth lens L6 of the optical lens are consistent.

Referring to FIG. 9, according to the first embodiment of the present disclosure, the optical lens further includes a diaphragm L7, wherein the front lens group and the rear lens group are separately disposed on both sides of the diaphragm L7, and wherein the optical center of the diaphragm L7 is coaxial with the optical centers of the first lens L1, the second lens L2, the third lens L3, the fourth lens L4, the fifth lens L5 and the sixth lens L6. Preferably, the diaphragm L7 is disposed between the third lens L3 and the fourth lens L4.

It is worth mentioning that, referring to FIG. 9, in this embodiment of the present disclosure, the diaphragm L7 is disposed between the third lens L3 and the fourth lens L4 to reduce the stray light in the optical lens so that the optical lens have a good imaging effect. In other embodiments of the present disclosure, the diaphragm L7 may be disposed at other positions, for example, between the second lens L2 and the third lens L3, between the fourth lens L4 and the fifth lens L5, between the fifth lens L5 and the sixth lens L6 or the like. It should be understood by those skilled in the art that the position of the diaphragm L7 is not a limitation of the present disclosure. In other words, the front lens group is not limited to consist of the first lens L1, the second lens L2, and the third lens L3, and the rear lens group is not limited to consist of the fourth lens L4, the fifth lens L5, and the sixth lens L6. When the diaphragm L7 is disposed at different positions, the optical lens may form different front lens groups and rear lens groups.

As shown in FIG. 9, according to this embodiment of the present disclosure, the fourth lens L4 has an object surface S7 facing the object side and an image surface S8 facing the image side. Further, the object surface S7 of the fourth lens L4 is convex, and the image surface S8 of the fourth lens L4 is concave. In other words, the fourth lens L4 has two surfaces S7 and S8, which are a convex surface and a concave surface, respectively, the convex surface and the concave surface form a meniscus shape, and the meniscus is convex toward the object side. Further, according to this embodiment of the present disclosure, the fourth lens L4 has a negative focal power.

According to this embodiment of the present disclosure, the fifth lens L5 has an object surface S9 facing the object side, and an image surface S10 facing the image side. Further, the object surface S9 of the fifth lens L5 is convex, and the image surface S10 of the fifth lens L5 is concave. In other words, the fifth lens L5 is a meniscus lens, and the meniscus is convex toward the object side. Further, according to this embodiment of the present disclosure, the fifth lens L5 has a positive focal power.

Further, the image surface S8 of the fourth lens L4 and the object surface S9 of the fifth lens L5 are disposed to face each other. In other words, the image surface S8 of the fourth lens L4 and the object surface S9 of the fifth lens L5 are disposed to face each other. In this embodiment, the concave surface of the fourth lens L4 and the convex surfaces of the fifth lens L5 are disposed to face each other.

According to this embodiment of the present disclosure, the sixth lens L6 has an object surface S11 facing the object side, and an image surface S12 facing the image side. Further, the object surface S11 of the sixth lens L6 is convex, and the image surface S12 of the sixth lens L6 is convex. In other words, the sixth lens L6 is a biconvex lens. Further, the sixth lens L6 has a positive focal power. The aberration and distortion are further corrected by the sixth lens L6, so that the imaging quality of the optical lens is better.

It is worth mentioning that, in this embodiment of the present disclosure, the sixth lens L6 is used to appropriately increase the distortion of the lens edge of the front lenses of the optical lens, so that light at a large angle can reach the imaging plane L10 with a predetermined size, such as the photosensitive chip surface. Moreover, the image can be continuously corrected by software post-processing, so that the image formed by the light after passing through the sixth lens L6 is restored to normal, namely obtaining large-angle imaging.

According to this embodiment of the present disclosure, the optical lens further includes a plane lens L9 for protecting the optical lens by isolation. Of course, in other embodiments of the present disclosure, the plane lens L9 may not be provided, and the present disclosure is not limited in this respect.

Referring to FIG. 9, according to this embodiment of the present disclosure, the first lens L1 of the optical lens has a convex surface and a concave surface, and the second lens L2 has a concave surface and a convex surface, wherein the convex surface of the first lens L1 is disposed to face the object side, the concave surface of the first lens L1 is disposed to face the image side, the concave surface of the second lens L2 is disposed to face the object side, and the convex surface of the second lens L2 is disposed to face the image side. The third lens L3 has two convex surfaces facing the object side and the image side, respectively. The fourth lens L4 has a convex surface and a concave surface facing the object side and the image side, respectively, and the fifth lens L5 has two convex surfaces facing the object side and the image side, respectively, wherein the concave surface of the fourth lens L4 and the convex surface of the fifth lens L5 is oppositely disposed to face each other. The sixth lens L6 has two convex surfaces, which are disposed to face the object side and the image side, respectively.

According to this embodiment of the present disclosure, the achromatic lens group of the optical lens is preferably a glued lens. In other words, the fourth lens L4 and the fifth lens L5 are glued together to form the achromatic lens group. At this time, since the fourth lens L4 and the fifth lens L5 are glued together, the image surface S8 of the concave surface of the fourth lens L4 and the object surface S9 of the convex surface of the fifth lens L5 are disposed in a glued manner to face each other. Of course, in other embodiments of the present disclosure, the achromatic lens group may also be a separation-type achromatic lens group. It would be understood that when the achromatic lens group is a separation-type achromatic lens group, the fourth lens L4 and the fifth lens L5 are separately disposed.

It is worth mentioning that the first lens L1 and the second lens L2 may be made of a glass material, or may be made of other materials having good light transmission performance, such as plastics and resins. It would be understood by those skilled in the art that in the optical lens of the present disclosure, light enters from the first lens L1, and is transmitted to the second lens L2 after being converged by the first lens L1. Therefore, light at a large angle can be collected by the first lens L1. Further, the light reaches the second lens L2 after passing through the first lens L1, and the light converged by the first lens L1 is appropriately diverged by the second lens L2 to be transmitted to the rear of the optical lens. Therefore, the refractive indices Nd of the first lens L1 and the second lens L2 need to match with each other. However, it would be understood by those skilled in the art that the refractive indices Nd of the first lens L1 and the second lens L2 are not a limitation of the present disclosure. On the other hand, in the present disclosure, the first lens L1 and the second lens L2 are provided with an Abbe constant Vd, so that the lens has better image quality. However, it should be understood by those skilled in the art that the Abbe constants Vd of the first lens L1 and the second lens L2 are not a limitation of the present disclosure.

As shown in FIG. 9, it is a structural schematic view of the optical lens according to the fifth embodiment of the present disclosure. The optical lens includes, sequentially from the object side to the image side, a front lens group, a diaphragm L7, a rear lens group, a filter element L8, a plane lens L9, and an imaging plane L10.

Herein, the front lens group includes, sequentially from the object side to the image side: a first lens L1, a second lens L2, and a third lens L3, the first lens L1 being a meniscus lens having a negative focal power, the second lens L2 being a meniscus lens having a negative focal power, the concave surface of the first lens L1 being opposite to the concave surface of the second lens L2, and the third lens L3 being a biconvex lens having positive focal power; and the rear lens group includes, sequentially from the object side to the image side: a fourth lens L4, a fifth lens L5, and a sixth lens L6, the fourth lens L4 being a meniscus lens having a negative focal power, the fifth lens L5 being a meniscus lens having a positive focal power, and the concave surface of the fourth lens L4 being opposite to the convex surface of the fifth lens L5. Further, the concave surface of the fourth lens L4 and the convex surface of the fifth lens L5 are glued. The sixth lens L6 is a biconvex lens having a positive focal power.

In this embodiment, the first lens L1 satisfies the following condition: $0.5 \leq R1/(R2+d1) \leq 1.5$;

where R1 is a radius of curvature of the object surface S1 of the first lens L1, R2 is a radius of curvature of the image surface S2 of the first lens L1, and d1 is a center thickness of the first lens L1.

The second lens L2 satisfies the following condition: $0.45 \leq |R4|/(|R3|+d2) \leq 1.3$;

where R3 is a radius of curvature of the object surface S3 of the second lens L2, R4 is a radius of curvature of the image surface S4 of the second lens L2, and d2 is a center thickness of the second lens L2.

By the above conditions, the relationships between the respective radii of curvature and thickness of the first lens L1 and the second lens L2 are restricted so that the first lens L1 and the second lens L2 are close to a concentric circle. Therefore, when the concave surfaces of the first lens L1 and the second lens L2 are oppositely disposed, light at a large angle can be collected to enter the optical lens, and be appropriately diverged by the second lens L2 to be transmitted backward.

In this embodiment of the present disclosure, the focal length F1 of the first lens L1 and the overall focal length F of the optical lens satisfy the following condition: $-3.5 \leq F1/F \leq -1$.

The focal length F2 of the second lens L2 and the overall focal length F of the optical lens satisfy the following condition: $|F2/F| \geq 5.0$.

If the maximum field of view of the optical lens is FOVm and the image height corresponding to the maximum field of view of the optical lens is Ym, then $(FOVm \times F)/Ym \geq 45°$.

In this embodiment of the present disclosure, the first lens L1, the second lens L2, and the sixth lens L6 are aspherical lenses.

Preferably, the first lens L1, the second lens L2, and the sixth lens L6 are glass aspherical lenses, and the third lens L3, the fourth lens L4, and the fifth lens L5 are spherical lenses. It should be understood by those skilled in the art that the first lens L1, the second lens L2, and the sixth lens L6 are not limited to glass aspherical lenses, and may be plastic aspherical or spherical lenses or the like. The third lens L3, the fourth lens L4, and the fifth lens L5 are not limited to glass spherical lenses, and may be glass aspheric surfaces, plastic aspheric surfaces, resin aspheric surfaces or the like. The present disclosure is not limited in this respect. In particular, in some embodiments of the present disclosure, the optical lens is composed of six lenses consisting of three glass spherical surfaces and three glass aspheric surfaces. For example, the first lens L1, the second lens L2, and the sixth lens L6 are glass aspherical lenses, and the third lens L3, the fourth lens L4, and the fifth lens L5 are glass spherical lenses, so that the optical lens has the characteristics of a long focal length and a large field of view, and the resolution of the optical lens is ensured by the glass aspherical lenses while reducing chromatic aberration.

In this embodiment of the present disclosure, the first lens L1, the second lens L2, and the sixth lens L6 are aspherical lenses. The first lens L1 and the second lens L2 are close to the concentric lens, and are aspherical, so that light at a large angle can be effectively and smoothly converged, and due to the aspherical setting, the processing difficulty of the conventional spherical concentric lenses is avoided.

Further, in some embodiments, the object surface S1 of the first lens L1 has a central region S101 and an edge region S102 extending outwardly from the central region S101, the central region S101 of the object surface S1 of the first lens L1 is convex, and the edge region S102 of the object surface S1 of the first lens L1 is concave. It should be understood by those skilled in the art that the specific structure of the aspherical surface and the specific structures and ranges of the central and edge regions of the first lens L1 are not a limitation of the present disclosure.

The aspherical lens surfaces of the first lens L1, the second lens L2, and the sixth lens L6 satisfy the formula (1) given in the first embodiment.

As shown in FIG. 10, it is a graph of the optical performance of this embodiment of the present disclosure. It can be seen from the MTF graph of the optical lens that the optical lens has higher resolution and better optical performance.

Parameters of the optical lens of this embodiment of the present disclosure are as shown in Tables 9 and 10 below. It should be noted that the two surfaces, i.e. the object surface and the image surface, of the first lens L1, are S1 and S2, respectively, the two surfaces, i.e. the object surface and the image surface, of the second lens L2, are S3 and S4, respectively, the two surfaces, i.e. the object surface and the image surface, of the third lens L3, are S5 and S6, respectively, the two surfaces, i.e. the object surface and the image surface, of the fourth lens L4, are S7 and S8, respectively, the two surfaces, i.e. the object surface and the image surface, of the fifth lens L5, are S9 and S10, respectively, the two surfaces, i.e. the object surface and the image surface, of the sixth lens L6, are S11 and S12, respectively, the two surfaces of the filter element L8 are S13 and S14, respectively, the two surfaces of the plane lens L9 are S15 and S16, respectively, and the imaging plane is S17; and S1-S17 are in one-to-one correspondence with the surface numbers in Tables 9 and 10 below.

TABLE 9

Parameters of the optical lens of the fifth embodiment

| Surface No. | Radius of curvature R | Center thickness d | Refractive index Nd | Abbe constant Vd |
|---|---|---|---|---|
| 1 | 5.1284 | 2.5800 | 1.81 | 40.9 |
| 2 | 2.3517 | 2.9458 | | |
| 3 | −7.5032 | 2.6600 | 1.81 | 40.9 |
| 4 | −8.7623 | 0.1000 | | |
| 5 | 12.8327 | 3.0000 | 1.90 | 37.1 |
| 6 | −15.5327 | 0.1357 | | |
| 7 | Infinity | 1.1108 | | |
| 8 | 21.4464 | 0.6500 | 1.92 | 20.9 |
| 9 | 5.8000 | 3.0000 | 1.50 | 81.6 |
| 10 | 135.9052 | 0.2000 | | |
| 11 | 7.0000 | 2.8000 | 1.50 | 81.6 |
| 12 | −17.8204 | 1.5000 | | |
| 13 | Infinity | 0.5500 | 1.52 | 64.2 |
| 14 | Infinity | 1.5000 | | |
| 15 | Infinity | 0.4000 | 1.52 | 64.2 |
| 16 | Infinity | 0.8693 | | |
| 17 | Infinity | | | |

TABLE 10

Aspheric coefficients of the fifth embodiment

| Surface No. | K | A | B | C | D | E |
|---|---|---|---|---|---|---|
| 1 | −0.7734714 | −2.4660E−03 | −1.9457E−04 | 7.1243E−06 | 4.2572E−08 | −2.5996E−09 |
| 2 | −1.007374 | −4.3224E−03 | −1.3469E−03 | 1.6456E−04 | −1.0684E−05 | 3.2449E−07 |
| 3 | −1.507036 | −1.3737E−03 | −1.0084E−04 | 9.3691E−06 | 1.0179E−06 | −5.9436E−08 |
| 4 | −1.979089 | −3.2995E−04 | 3.9076E−06 | 4.1590E−06 | −6.2126E−08 | −5.6871E−09 |
| 11 | −1.593386 | 5.8667E−04 | 1.6222E−04 | −1.1357E−05 | 5.5035E−08 | −3.4995E−09 |
| 12 | −100.0041 | −2.7144E−03 | 3.9714E−04 | −1.6299E−05 | −8.1284E−09 | 5.3382E−08 |

Based on the above data, the numerical values of the formulas involved in this embodiment are calculated as follows:
R1/(R2+d1)=1.040, |R4|/(|R3|+d2)=0.854, F1/F=−1.427, |F2|/F=185.133, TTL/F=3.734, (FOVm×F)/Ym=97.039°. As shown in Tables 9 and 10, in this embodiment, as a set of specific embodiment parameters, the optical lenses with these parameters can achieve better optical performance, have a longer overall focal length, and have a larger field of view.

In summary, the optical lens of the present disclosure can satisfy the requirements of miniaturization and realize a long focal length, a large field of view, and a large aperture through the design of the six-lens structure and aspherical lenses close to a concentric circle. Moreover, it can meet the high definition requirements and effectively correct various aberrations of the optical system, especially suitable for in-vehicle camera systems. It can capture distant objects, and the overall field of vision is enlarged. The functions of both the conventional telephoto lens and the conventional wide-angle lens can be realized by one lens, reducing the cost of the in-vehicle camera system and improving the actual performance of the lens.

This embodiment of the present disclosure differs from the first embodiment in that the structure of the fifth lens L5 is different.

Sixth Embodiment

Figure 11:
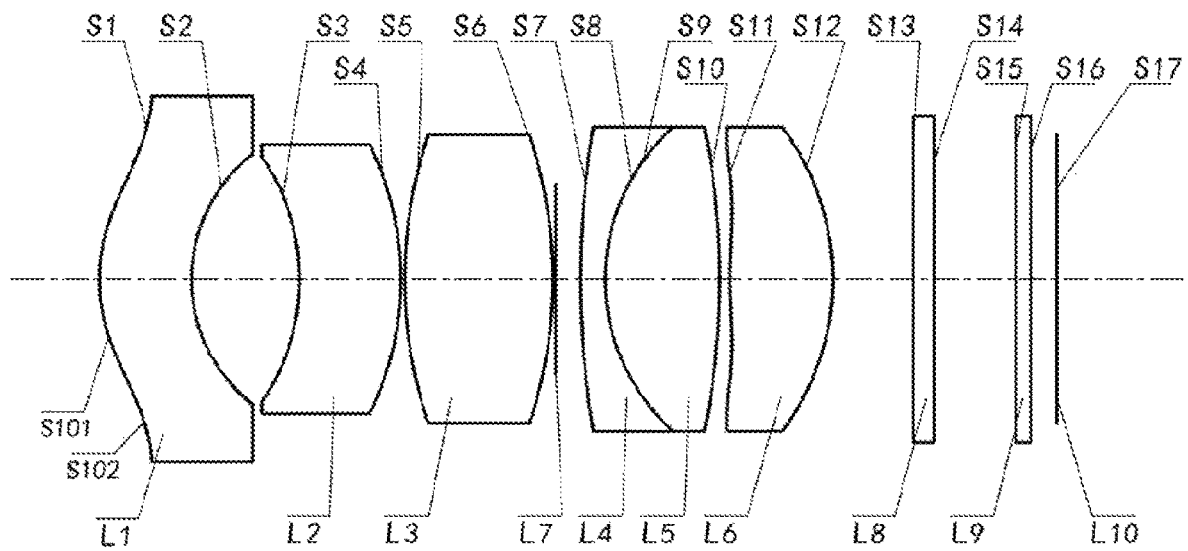
FIG. 11 is a structural schematic view of an optical lens according to a sixth embodiment of the present disclosure.
Figure 12:
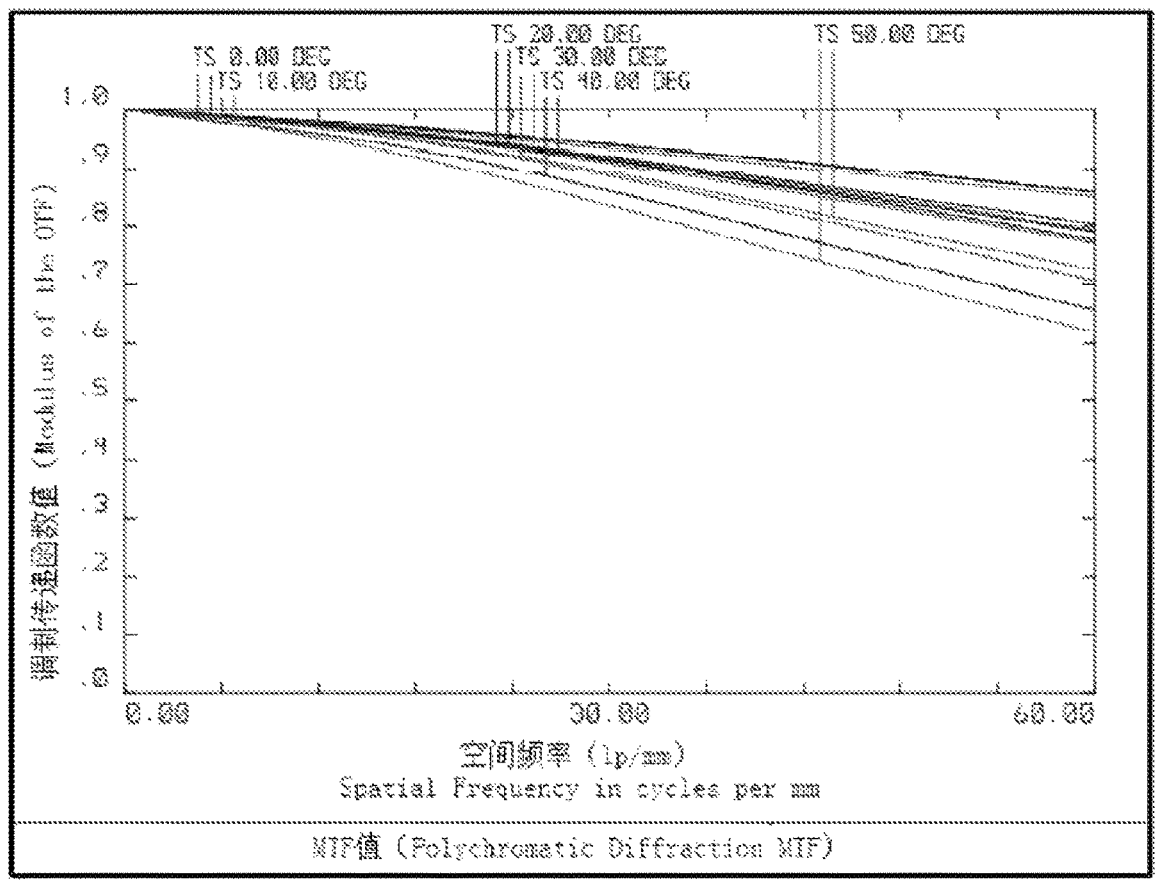
FIG. 12 is a MTF graph of the optical lens according to the sixth embodiment of the present disclosure.

Referring to FIGS. 11 and 12, an optical lens according to a sixth embodiment of the present disclosure is explained, wherein the optical lens includes at least one first lens L1, at least one second lens L2, a third lens L3, a fourth lens L4, a fifth lens L5 and a sixth lens L6. The first lens L1, the second lens L2, the third lens L3, the fourth lens L4, the fifth lens L5, and the sixth lens L6 are sequentially arranged along a direction from an object side to an image side.

The first lens L1 has a negative focal power, and the first lens L1 has an object surface S1 facing the object side and an image surface S2 facing the image side. According to this embodiment of the present disclosure, the object surface S1 of the first lens L1 is convex in order to increase the luminous flux of the optical lens. That is, the convex object surface S1 of the first lens L1 converges light at a larger angle to increase the luminous flux entering the optical lens from the object side. Preferably, the object surface S1 of the first lens L1 is an aspherical lens in order to reduce the processing difficulty. Of course, in other embodiments of the present disclosure, the first lens L1 may be a spherical lens.

Further, according to this embodiment of the present disclosure, the image surface S2 of the first lens L1 is concave. That is, the first lens L1 includes two surfaces S1 and S2, one of which is convex, and the other of which is concave. The concave surface and the convex surface form a meniscus shape, and the meniscus is convex toward the object side so as to increase the light entering the optical lens.

It should be noted that, in the imaging system lens group provided by the present disclosure, when the lens surface is convex and the position of the convex surface is not defined, it indicates that the lens surface is convex near the optical axis; When the lens surface is concave and the position of the concave surface is not defined, it indicates that the lens surface is concave near the optical axis.

The second lens L2 has an object surface S3 facing the object side and an image surface S4 facing the image side. According to this embodiment of the present disclosure, the image surface S4 of the second lens L2 is convex to facilitate proper divergence of light passing through the first lens L1 to be transmitted to the rear of the optical lens. The second lens L2 has a negative focal power. That is, the second lens L2 has an effect of transition light to smoothly transition the light of the first lens L1 to the third lens L3. Preferably, the second lens L2 is an aspherical lens so as to reduce the processing difficulty. Of course, in other embodiments of the present disclosure, the second lens L2 may be a spherical lens.

Further, according to this embodiment of the present disclosure, the object surface S3 of the second lens L2 is convex. That is, the second lens L2 includes two surfaces S3 and S4, one of which is convex and the other of which is concave. The convex surface and the concave surface form a meniscus shape, and the meniscus is convex toward the image side to facilitate divergence of light passing through the first lens L1 to be transmitted backward.

It is worth mentioning that the meniscus shapes of the first lens L1 and the second lens L2 are oppositely disposed to be close to a concentric circle structure, so that the optical lens has a smaller field of view, a larger focal length, and a higher angle resolution near the center.

The third lens L3 has an object surface S5 facing the object side, and an image surface S6 facing the image side. The object surface S5 and the image surface S6 of the third lens L3 both are convex to facilitate convergence of the light transmitted by the second lens L2 to be transmitted toward the rear of the optical lens. In other words, the third lens L3 is a biconvex lens having light transition and convergence effects.

According to this embodiment of the present disclosure, the third lens L3 has a positive focal power.

The fourth lens L4 and the fifth lens L5 form an achromatic lens group so as to reduce chromatic aberration of the light transmitted by the front components of the optical lens.

Referring to FIG. 11, the first lens L1, the second lens L2, the third lens L3, the fourth lens L4, the fifth lens L5, and the sixth lens L6 form a front lens group and a rear lens group, wherein the front lens group includes the first lens L1, the second lens L2, and the third lens L3, and the rear lens group includes the fourth lens L4, the fifth lens L5 and the sixth lens L6. The front lens group and the rear lens group are sequentially disposed along the direction from the object side to the image side.

Referring to FIG. 11, according to this embodiment of the present disclosure, the optical centers of the first lens L1, the second lens L2, the third lens L3, the fourth lens L4, the fifth lens L5 and the sixth lens L6 of the optical lens are coaxial. In other words, the principal optical axes of the first lens L1, the second lens L2, the third lens L3, the fourth lens L4, the fifth lens L5, and the sixth lens L6 of the optical lens are consistent.

Referring to FIG. 11, according to this embodiment of the present disclosure, the optical lens further includes a diaphragm L7, wherein the front lens group and the rear lens group are separately disposed on both sides of the diaphragm L7, and wherein the optical center of the diaphragm L7 is coaxial with the optical centers of the first lens L1, the second lens L2, the third lens L3, the fourth lens L4, the fifth lens L5 and the sixth lens L6. Preferably, the diaphragm L7 is disposed between the third lens L3 and the fourth lens L4.

It is worth mentioning that, referring to FIG. 11, in this embodiment of the present disclosure, the diaphragm L7 is disposed between the third lens L3 and the fourth lens L4 to reduce the stray light in the optical lens so that the optical lens have a good imaging effect. In other embodiments of the present disclosure, the diaphragm L7 may be disposed at other positions, for example, between the second lens L2 and the third lens L3, between the fourth lens L4 and the fifth lens L5, between the fifth lens L5 and the sixth lens L6 or the like. It should be understood by those skilled in the art that the position of the diaphragm L7 is not a limitation of the present disclosure. In other words, the front lens group is not limited to consist of the first lens L1, the second lens L2, and the third lens L3, and the rear lens group is not limited to consist of the fourth lens L4, the fifth lens L5, and the sixth lens L6. When the diaphragm L7 is disposed at different positions, the optical lens may form different front lens groups and rear lens groups.

As shown in FIG. 11, according to this embodiment of the present disclosure, the fourth lens L4 has an object surface S7 facing the object side and an image surface S8 facing the image side. Further, the object surface S7 of the fourth lens L4 is convex, and the image surface S8 of the fourth lens L4 is concave. In other words, the fourth lens L4 has two surfaces S7 and S8, which are a convex surface and a concave surface, respectively, the convex surface and the concave surface form a meniscus shape, and the meniscus is convex toward the object side. Further, according to this embodiment of the present disclosure, the fourth lens L4 has a negative focal power.

According to this embodiment of the present disclosure, the fifth lens L5 has an object surface S9 facing the object side, and an image surface S10 facing the image side. Further, the object surface S9 of the fifth lens L5 is convex, and the image surface S10 of the fifth lens L5 is convex. In other words, the fifth lens L5 is a biconvex lens. Further, according to this embodiment of the present disclosure, the fifth lens L5 has a positive focal power.

Further, the image surface S8 of the fourth lens L4 and the object surface S9 of the fifth lens L5 are disposed to face each other. In other words, the image surface S8 of the fourth lens L4 and the object surface S9 of the fifth lens L5 face each other. In this embodiment, the concave surface of the fourth lens L4 and the convex surfaces of the fifth lens L5 are oppositely disposed.

According to this embodiment of the present disclosure, the sixth lens L6 has an object surface S11 facing the object side, and an image surface S12 facing the image side. Further, the object surface S11 of the sixth lens L6 is convex, and the image surface S12 of the sixth lens L6 is convex. In other words, the sixth lens L6 is a biconvex lens. Further, the sixth lens L6 has a positive focal power. The aberration and distortion are further corrected by the sixth lens L6, so that the imaging quality of the optical lens is better.

It is worth mentioning that, in this embodiment of the present disclosure, the sixth lens L6 is used to appropriately increase the distortion of the lens edge of the front lenses of the optical lens, so that light at a large angle can reach the imaging plane L10 with a predetermined size, such as the photosensitive chip surface. Moreover, the image can be continuously corrected by software post-processing, so that the image formed by the light after passing through the sixth lens L6 is restored to normal, namely obtaining large-angle imaging.

According to this embodiment of the present disclosure, the optical lens further includes a plane lens L9 for protecting the optical lens by isolation. Of course, in other embodiments of the present disclosure, the plane lens L9 may not be provided, and the present disclosure is not limited in this respect.

Referring to FIG. 11, according to this embodiment of the present disclosure, the first lens L1 of the optical lens has a convex surface and a concave surface, and the second lens L2 has a concave surface and a convex surface, wherein the convex surface of the first lens L1 is disposed to face the object side, the concave surface of the first lens L1 is disposed to face the image side, the concave surface of the second lens L2 is disposed to face the object side, and the convex surface of the second lens L2 is disposed to face the image side. The third lens L3 has two convex surfaces facing the object side and the image side, respectively. The fourth lens L4 has a convex surface and a concave surface facing the object side and the image side, respectively, and the fifth lens L5 has two convex surfaces facing the object side and the image side, respectively, wherein the concave surface of the fourth lens L4 and the convex surface of the fifth lens L5 is oppositely disposed to face each other. The sixth lens L6 has two convex surfaces, which are disposed to face the object side and the image side, respectively.

According to this embodiment of the present disclosure, the achromatic lens group of the optical lens is preferably a glued lens. In other words, the fourth lens L4 and the fifth lens L5 are glued together to form the achromatic lens group. At this time, since the fourth lens L4 and the fifth lens L5 are glued together, the image surface S8 of the concave surface of the fourth lens L4 and the object surface S9 of the convex surface of the fifth lens L5 are disposed in a glued manner to face each other. Of course, in other embodiments of the present disclosure, the achromatic lens group may also be a separation-type achromatic lens group. It would be understood that when the achromatic lens group is a separation-type achromatic lens group, the fourth lens L4 and the fifth lens L5 are separately disposed.

It is worth mentioning that the first lens L1 and the second lens L2 may be made of a glass material, or may be made of other materials having good light transmission performance, such as plastics and resins. It would be understood by those skilled in the art that in the optical lens of the present disclosure, light enters from the first lens L1, and is transmitted to the second lens L2 after being converged by the first lens L1. Therefore, light at a large angle can be collected by the first lens L1. Further, the light reaches the second lens L2 after passing through the first lens L1, and the light converged by the first lens L1 is appropriately diverged by the second lens L2 to be transmitted to the rear of the optical lens. Therefore, the refractive indices Nd of the first lens L1 and the second lens L2 need to match with each other. However, it would be understood by those skilled in the art that the refractive indices Nd of the first lens L1 and the second lens L2 are not a limitation of the present disclosure. On the other hand, in the present disclosure, the first lens L1 and the second lens L2 are provided with an Abbe constant Vd, so that the lens has better image quality. However, it should be understood by those skilled in the art that the Abbe constants Vd of the first lens L1 and the second lens L2 are not a limitation of the present disclosure.

As shown in FIG. 11, it is a structural schematic view of the optical lens according to the sixth embodiment of the present disclosure. The optical lens includes, sequentially from the object side to the image side, a front lens group, a diaphragm L7, a rear lens group, a filter element L8, a plane lens L9, and an imaging plane L10.

Herein, the front lens group includes, sequentially from the object side to the image side: a first lens L1, a second lens L2, and a third lens L3, the first lens L1 being a meniscus lens having a negative focal power, the second lens L2 being a meniscus lens having a negative focal power, the concave surface of the first lens L1 being opposite to the concave surface of the second lens L2, and the third lens L3 being a biconvex lens having positive focal power; and the rear lens group includes, sequentially from the object side to the image side: a fourth lens L4, a fifth lens L5, and a sixth lens L6, the fourth lens L4 being a meniscus lens having a negative focal power, the fifth lens L5 being a biconvex lens having a positive focal power, and the concave surface of the fourth lens L4 being opposite to the convex surface of the fifth lens L5. Further, the concave surface of the fourth lens L4 and the convex surface of the fifth lens L5 are glued. The sixth lens L6 is a biconvex lens having a positive focal power.

In this embodiment, the first lens L1 satisfies the following condition: $0.5 \leq R1/(R2+d1) \leq 1.5$;
where R1 is a radius of curvature of the object surface S1 of the first lens L1, R2 is a radius of curvature of the image surface S2 of the first lens L1, and d1 is a center thickness of the first lens L1.

The second lens L2 satisfies the following condition: $0.45 \leq |R4|/(|R3|+d2) \leq 1.3$;
where R3 is a radius of curvature of the object surface S3 of the second lens L2, R4 is a radius of curvature of the image surface S4 of the second lens L2, and d2 is a center thickness of the second lens L2.

By the above conditions, the relationships between the respective radii of curvature and thickness of the first lens L1 and the second lens L2 are restricted so that the first lens L1 and the second lens L2 are close to a concentric circle. Therefore, when the concave surfaces of the first lens L1 and the second lens L2 are oppositely disposed, light at a large angle can be collected to enter the optical lens, and be appropriately diverged by the second lens L2 to be transmitted backward.

In this embodiment of the present disclosure, the focal length F1 of the first lens L1 and the overall focal length F of the optical lens satisfy the following condition: $-3.5 \leq F1/F \leq -1$.

The focal length F2 of the second lens L2 and the overall focal length F of the optical lens satisfy the following condition: $|F2/F| \geq 5.0$.

If the maximum field of view of the optical lens is FOVm and the image height corresponding to the maximum field of view of the optical lens is Ym, then $(FOVm \times F)/Ym \geq 45°$.

In this embodiment of the present disclosure, the first lens L1, the second lens L2, and the sixth lens L6 are aspherical lenses.

Preferably, the first lens L1, the second lens L2, and the sixth lens L6 are glass aspherical lenses, and the third lens L3, the fourth lens L4, and the fifth lens L5 are spherical lenses. It should be understood by those skilled in the art that the first lens L1, the second lens L2, and the sixth lens L6 are not limited to glass aspherical lenses, and may be plastic aspherical or spherical lenses or the like. The third lens L3, the fourth lens L4, and the fifth lens L5 are not limited to glass spherical lenses, and may be glass aspheric surfaces, plastic aspheric surfaces, resin aspheric surfaces or the like. The present disclosure is not limited in this respect. In particular, in some embodiments of the present disclosure, the optical lens is composed of six lenses consisting of three glass spherical surfaces and three glass aspheric surfaces. For example, the first lens L1, the second lens L2, and the sixth lens L6 are glass aspherical lenses, and the third lens L3, the fourth lens L4, and the fifth lens L5 are glass spherical lenses, so that the optical lens has the characteristics of a long focal length and a large field of view, and the resolution of the optical lens is ensured by the glass aspherical lenses while reducing chromatic aberration.

In this embodiment of the present disclosure, the first lens L1, the second lens L2, and the sixth lens L6 are aspherical lenses. The first lens L1 and the second lens L2 are close to the concentric lens, and are aspherical, so that light at a large angle can be effectively and smoothly converged, and due to the aspherical setting, the processing difficulty of the conventional spherical concentric lenses is avoided.

Further, in some embodiments, the object surface S1 of the first lens L1 has a central region S101 and an edge region S102 extending outwardly from the central region S101, the central region S101 of the object surface S1 of the first lens L1 is convex, and the edge region S102 of the object surface S1 of the first lens L1 is concave. It should be understood by those skilled in the art that the specific structure of the aspherical surface and the specific structures and ranges of the central and edge regions of the first lens L1 are not a limitation of the present disclosure.

The aspherical lens surfaces of the first lens L1, the second lens L2, and the sixth lens L6 satisfy the formula (1) given in the first embodiment.

As shown in FIG. 12, it is a graph of the optical performance of this embodiment of the present disclosure. It can be seen from the MTF graph of the optical lens that the optical lens has higher resolution and better optical performance.

Parameters of the optical lens of this embodiment of the present disclosure are as shown in Tables 11 and 12 below. It should be noted that the two surfaces, i.e. the object surface and the image surface, of the first lens L1, are S1 and S2, respectively, the two surfaces, i.e. the object surface and the image surface, of the second lens L2, are S3 and S4, respectively, the two surfaces, i.e. the object surface and the image surface, of the third lens L3, are S5 and S6, respectively, the two surfaces, i.e. the object surface and the image surface, of the fourth lens L4, are S7 and S8, respectively, the two surfaces, i.e. the object surface and the image surface, of the fifth lens L5, are S9 and S10, respectively, the two surfaces, i.e. the object surface and the image surface, of the sixth lens L6, are S11 and S12, respectively, the two surfaces of the filter element L8 are S13 and S14, respectively, the two surfaces of the plane lens L9 are S15 and S16, respectively, and the imaging plane is S17; and S1-S17 are in one-to-one correspondence with the surface numbers in Tables 11 and 12 below.

TABLE 11

Parameters of the optical lens of the sixth embodiment

| Surface No. | Radius of curvature R | Center thickness d | Refractive index Nd | Abbe constant Vd |
|---|---|---|---|---|
| 1 | 4.8520 | 2.4189 | 1.81 | 40.9 |
| 2 | 2.5815 | 2.8500 | | |
| 3 | −6.3611 | 2.6600 | 1.86 | 36.6 |
| 4 | −7.6405 | 0.1000 | | |
| 5 | 12.5325 | 3.5056 | 1.90 | 37.1 |
| 6 | −12.5325 | 0.0030 | | |
| 7 | Infinity | 0.8961 | | |
| 8 | 22.0087 | 0.6500 | 1.92 | 20.9 |
| 9 | 5.6200 | 3.0000 | 1.50 | 81.6 |
| 10 | −20.3591 | 0.1749 | | |
| 11 | 19.0000 | 2.8000 | 1.50 | 81.6 |
| 12 | −13.0000 | 1.5000 | | |
| 13 | Infinity | 0.5500 | 1.52 | 64.2 |
| 14 | Infinity | 2.1474 | | |
| 15 | Infinity | 0.4000 | 1.52 | 64.2 |
| 16 | Infinity | 0.3691 | | |
| 17 | Infinity | | | |

TABLE 12

Aspheric coefficients of the sixth embodiment

| Surface No. | K | A | B | C | D | E |
|---|---|---|---|---|---|---|
| 1 | −1.17222 | −1.3623E−03 | −1.3685E−04 | 1.4424E−06 | 2.6998E−07 | −6.7463E−09 |
| 2 | −1.085924 | −3.5967E−03 | −8.6722E−04 | 1.1455E−04 | −6.9582E−06 | 1.6094E−07 |
| 3 | 0.154065 | −1.0838E−04 | −2.0721E−05 | 3.5541E−05 | −1.5618E−06 | 1.7341E−08 |
| 4 | −0.190863 | −1.8193E−05 | −2.8590E−05 | 1.0776E−05 | −7.2336E−07 | 1.7372E−08 |
| 11 | −48.045994 | −5.3806E−04 | −5.3048E−05 | 5.4919E−06 | −2.0341E−06 | 2.3821E−08 |
| 12 | −5.159199 | −3.0265E−03 | 1.2368E−04 | −1.5823E−05 | 3.9491E−07 | −1.2384E−08 |

Based on the above data, the numerical values of the formulas involved in this embodiment are calculated as follows:
R1/(R2+d1)=0.970, |R4|/(|R3|+d2)=0.847, F1/F=−2.020, F2|/F=178.681, TTL/F=3.731, (FOVm×F)/Ym=77.492°. As shown in Tables 11 and 12, in this embodiment, as a set of specific embodiment parameters, the optical lenses with these parameters can achieve better optical performance, have a longer overall focal length, and have a larger field of view.

In summary, the optical lens of the present disclosure can satisfy the requirements of miniaturization and realize a long focal length, a large field of view, and a large aperture through the design of the six-lens structure and aspherical lenses close to a concentric circle. Moreover, it can meet the high definition requirements and effectively correct various aberrations of the optical system, especially suitable for in-vehicle camera systems. It can capture distant objects, and the overall field of vision is enlarged. The functions of both the conventional telephoto lens and the conventional wide-angle lens can be realized by one lens, reducing the cost of the in-vehicle camera system and improving the actual performance of the lens.

Seventh Embodiment

Figure 13:
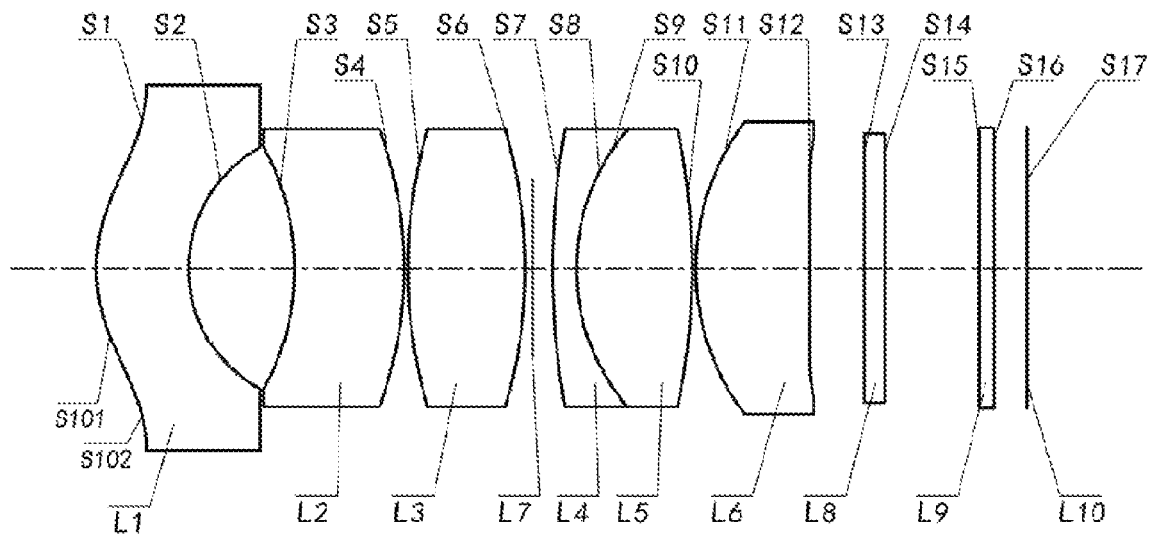
FIG. 13 is a structural schematic view of an optical lens according to a seventh embodiment of the present disclosure.
Figure 14:
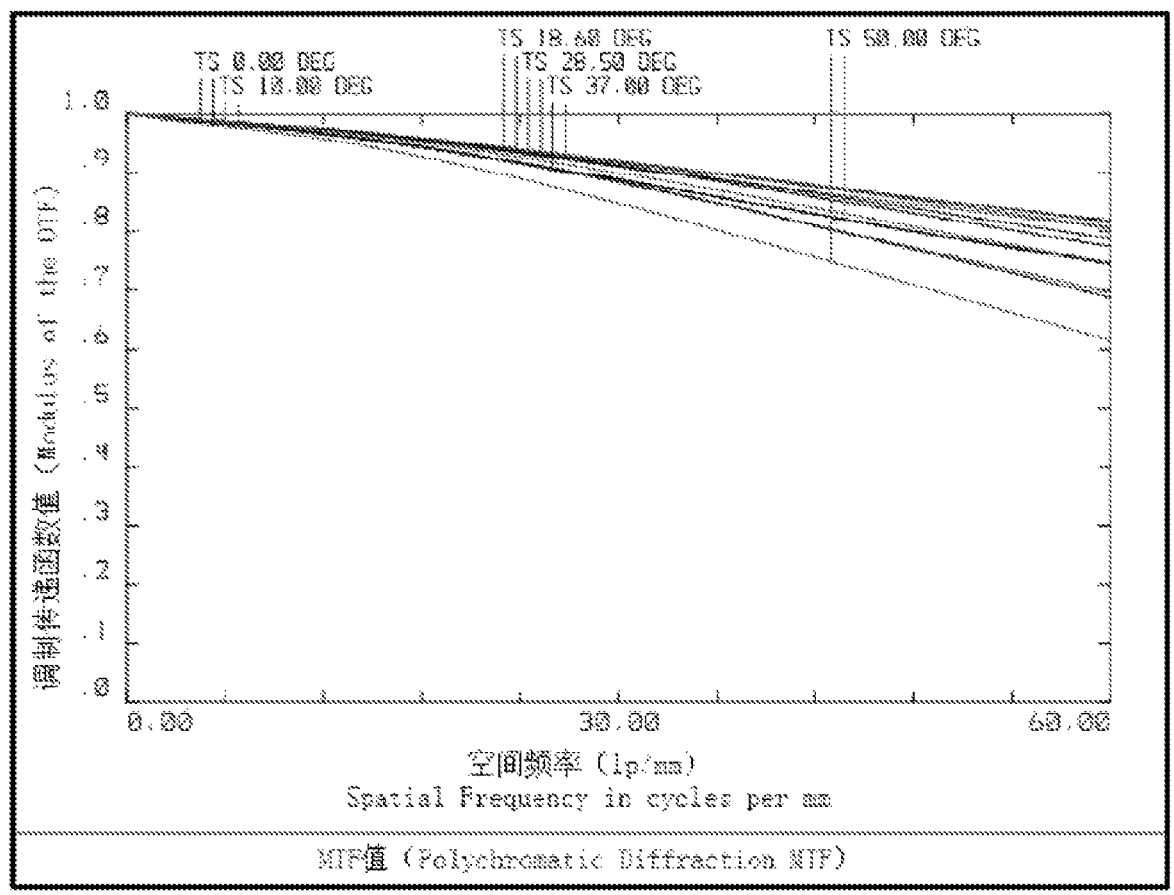
FIG. 14 is a MTF graph of the optical lens according to the seventh embodiment of the present disclosure.

Referring to FIGS. 13 and 14, an optical lens according to a seventh embodiment of the present disclosure is explained, wherein the optical lens includes at least one first lens L1, at least one second lens L2, a third lens L3, a fourth lens L4, a fifth lens L5 and a sixth lens L6. The first lens L1, the second lens L2, the third lens L3, the fourth lens L4, the fifth lens L5, and the sixth lens L6 are sequentially arranged along a direction from an object side to an image side.

The first lens L1 has a negative focal power, and the first lens L1 has an object surface S1 facing the object side and an image surface S2 facing the image side. According to this embodiment of the present disclosure, the object surface S1 of the first lens L1 is convex in order to increase the luminous flux of the optical lens. That is, the convex object surface S1 of the first lens L1 converges light at a larger angle to increase the luminous flux entering the optical lens from the object side. Preferably, the object surface S1 of the first lens L1 is an aspherical lens in order to reduce the processing difficulty. Of course, in other embodiments of the present disclosure, the first lens L1 may be a spherical lens.

Further, according to this embodiment of the present disclosure, the image surface S2 of the first lens L1 is concave. That is, the first lens L1 includes two surfaces S1 and S2, one of which is convex, and the other of which is concave. The concave surface and the convex surface form a meniscus shape, and the meniscus is convex toward the object side so as to increase the light entering the optical lens.

It should be noted that, in the imaging system lens group provided by the present disclosure, when the lens surface is convex and the position of the convex surface is not defined, it indicates that the lens surface is convex near the optical axis; When the lens surface is concave and the position of the concave surface is not defined, it indicates that the lens surface is concave near the optical axis.

The second lens L2 has an object surface S3 facing the object side and an image surface S4 facing the image side. According to this embodiment of the present disclosure, the image surface S4 of the second lens L2 is convex to facilitate proper divergence of light passing through the first lens L1 to be transmitted to the rear of the optical lens. The second lens L2 has a negative focal power. That is, the second lens L2 has an effect of transition light to smoothly transition the light of the first lens L1 to the third lens L3. Preferably, the second lens L2 is an aspherical lens so as to reduce the processing difficulty. Of course, in other embodiments of the present disclosure, the second lens L2 may be a spherical lens.

Further, according to this embodiment of the present disclosure, the object surface S3 of the second lens L2 is convex. That is, the second lens L2 includes two surfaces S3 and S4, one of which is convex and the other of which is concave. The convex surface and the concave surface form a meniscus shape, and the meniscus is convex toward the image side to facilitate divergence of light passing through the first lens L1 to be transmitted backward.

It is worth mentioning that the meniscus shapes of the first lens L1 and the second lens L2 are oppositely disposed to be close to a concentric circle structure, so that the optical lens has a smaller field of view, a larger focal length, and a higher angle resolution near the center.

The third lens L3 has an object surface S5 facing the object side, and an image surface S6 facing the image side. The object surface S5 and the image surface S6 of the third lens L3 both are convex to facilitate convergence of the light transmitted by the second lens L2 to be transmitted toward the rear of the optical lens. In other words, the third lens L3 is a biconvex lens having light transition and convergence effects.

According to this embodiment of the present disclosure, the third lens L3 has a positive focal power.

The fourth lens L4 and the fifth lens L5 form an achromatic lens group so as to reduce chromatic aberration of the light transmitted by the front components of the optical lens.

Referring to FIG. 13, the first lens L1, the second lens L2, the third lens L3, the fourth lens L4, the fifth lens L5, and the sixth lens L6 form a front lens group and a rear lens group, wherein the front lens group includes the first lens L1, the second lens L2, and the third lens L3, and the rear lens group includes the fourth lens L4, the fifth lens L5 and the sixth lens L6. The front lens group and the rear lens group are sequentially disposed along the direction from the object side to the image side.

Referring to FIG. 13, according to this embodiment of the present disclosure, the optical centers of the first lens L1, the second lens L2, the third lens L3, the fourth lens L4, the fifth lens L5 and the sixth lens L6 of the optical lens are coaxial. In other words, the principal optical axes of the first lens L1, the second lens L2, the third lens L3, the fourth lens L4, the fifth lens L5, and the sixth lens L6 of the optical lens are consistent.

Referring to FIG. 13, according to this embodiment of the present disclosure, the optical lens further includes a diaphragm L7, wherein the front lens group and the rear lens group are separately disposed on both sides of the diaphragm L7, and wherein the optical center of the diaphragm L7 is coaxial with the optical centers of the first lens L1, the second lens L2, the third lens L3, the fourth lens L4, the fifth lens L5 and the sixth lens L6. Preferably, the diaphragm L7 is disposed between the third lens L3 and the fourth lens L4.

It is worth mentioning that, referring to FIG. 13, in this embodiment of the present disclosure, the diaphragm L7 is disposed between the third lens L3 and the fourth lens L4 to reduce the stray light in the optical lens so that the optical lens have a good imaging effect. In other embodiments of the present disclosure, the diaphragm L7 may be disposed at other positions, for example, between the second lens L2 and the third lens L3, between the fourth lens L4 and the fifth lens L5, between the fifth lens L5 and the sixth lens L6 or the like. It should be understood by those skilled in the art that the position of the diaphragm L7 is not a limitation of the present disclosure. In other words, the front lens group is not limited to consist of the first lens L1, the second lens L2, and the third lens L3, and the rear lens group is not limited to consist of the fourth lens L4, the fifth lens L5, and the sixth lens L6. When the diaphragm L7 is disposed at different positions, the optical lens may form different front lens groups and rear lens groups.

As shown in FIG. 13, according to this embodiment of the present disclosure, the fourth lens L4 has an object surface S7 facing the object side and an image surface S8 facing the image side. Further, the object surface S7 of the fourth lens L4 is convex, and the image surface S8 of the fourth lens L4 is concave. In other words, the fourth lens L4 has two surfaces S7 and S8, which are a convex surface and a concave surface, respectively, the convex surface and the concave surface form a meniscus shape, and the meniscus is convex toward the object side. Further, according to this embodiment of the present disclosure, the fourth lens L4 has a negative focal power.

According to this embodiment of the present disclosure, the fifth lens L5 has an object surface S9 facing the object side, and an image surface S10 facing the image side. Further, the object surface S9 of the fifth lens L5 is convex, and the image surface S10 of the fifth lens L5 is convex. In other words, the fifth lens L5 is a biconvex lens. Further, according to this embodiment of the present disclosure, the fifth lens L5 has a positive focal power.

Further, the image surface S8 of the fourth lens L4 and the object surface S9 of the fifth lens L5 are disposed to face each other. In other words, the image surface S8 of the fourth lens L4 and the object surface S9 of the fifth lens L5 are disposed to face each other. In this embodiment, the concave surface of the fourth lens L4 and the convex surfaces of the fifth lens L5 are disposed to face each other.

According to this embodiment of the present disclosure, the sixth lens L6 has an object surface S11 facing the object side, and an image surface S12 facing the image side. Further, the object surface S11 of the sixth lens L6 is convex, and the image surface S12 of the sixth lens L6 is concave. In other words, the sixth lens L6 is a meniscus lens, and the meniscus is convex toward the object side. Further, the sixth lens L6 has a positive focal power. The aberration and distortion are further corrected by the sixth lens L6, so that the imaging quality of the optical lens is better.

It is worth mentioning that, in this embodiment of the present disclosure, the sixth lens L6 is used to appropriately increase the distortion of the lens edge of the front lenses of the optical lens, so that light at a large angle can reach the imaging plane L10 with a predetermined size, such as the photosensitive chip surface. Moreover, the image can be continuously corrected by software post-processing, so that the image formed by the light after passing through the sixth lens L6 is restored to normal, namely obtaining large-angle imaging.

According to this embodiment of the present disclosure, the optical lens further includes a plane lens L9 for protecting the optical lens by isolation. Of course, in other embodiments of the present disclosure, the plane lens L9 may not be provided, and the present disclosure is not limited in this respect.

Referring to FIG. 13, according to this embodiment of the present disclosure, the first lens L1 of the optical lens has a convex surface and a concave surface, and the second lens L2 has a concave surface and a convex surface, wherein the convex surface of the first lens L1 is disposed to face the object side, the concave surface of the first lens L1 is disposed to face the image side, the concave surface of the second lens L2 is disposed to face the object side, and the convex surface of the second lens L2 is disposed to face the image side. The third lens L3 has two convex surfaces facing the object side and the image side, respectively. The fourth lens L4 has a convex surface and a concave surface facing the object side and the image side, respectively, and the fifth lens L5 has two convex surfaces facing the object side and the image side, respectively, wherein the concave surface of the fourth lens L4 and the convex surface of the fifth lens L5 is oppositely disposed to face each other. The sixth lens L6 has a convex surface and a concave surface, which are disposed to face the object side and the image side, respectively.

According to this embodiment of the present disclosure, the achromatic lens group of the optical lens is preferably a glued lens. In other words, the fourth lens L4 and the fifth lens L5 are glued together to form the achromatic lens group. At this time, since the fourth lens L4 and the fifth lens L5 are glued together, the image surface S8 of the concave surface of the fourth lens L4 and the object surface S9 of the convex surface of the fifth lens L5 are disposed in a glued manner to face each other. Of course, in other embodiments of the present disclosure, the achromatic lens group may also be a separation-type achromatic lens group. It would be understood that when the achromatic lens group is a separation-type achromatic lens group, the fourth lens L4 and the fifth lens L5 are separately disposed.

It is worth mentioning that the first lens L1 and the second lens L2 may be made of a glass material, or may be made of other materials having good light transmission performance, such as plastics and resins. It would be understood by those skilled in the art that in the optical lens of the present disclosure, light enters from the first lens L1, and is transmitted to the second lens L2 after being converged by the first lens L1. Therefore, light at a large angle can be collected by the first lens L1. Further, the light reaches the second lens L2 after passing through the first lens L1, and the light converged by the first lens L1 is appropriately diverged by the second lens L2 to be transmitted to the rear of the optical lens. Therefore, the refractive indices Nd of the first lens L1 and the second lens L2 need to match with each other. However, it would be understood by those skilled in the art that the refractive indices Nd of the first lens L1 and the second lens L2 are not a limitation of the present disclosure. On the other hand, in the present disclosure, the first lens L1 and the second lens L2 are provided with an Abbe constant Vd, so that the lens has better image quality. However, it should be understood by those skilled in the art that the Abbe constants Vd of the first lens L1 and the second lens L2 are not a limitation of the present disclosure.

As shown in FIG. 13, it is a structural schematic view of the optical lens according to the seventh embodiment of the present disclosure. The optical lens includes, sequentially from the object side to the image side, a front lens group, a diaphragm L7, a rear lens group, a filter element L8, a plane lens L9, and an imaging plane L10.

Herein, the front lens group includes, sequentially from the object side to the image side: a first lens L1, a second lens L2, and a third lens L3, the first lens L1 being a meniscus lens having a negative focal power, the second lens L2 being a meniscus lens having a negative focal power, the concave surface of the first lens L1 being opposite to the concave surface of the second lens L2, and the third lens L3 being a biconvex lens having positive focal power; and the rear lens group includes, sequentially from the object side to the image side: a fourth lens L4, a fifth lens L5, and a sixth lens L6, the fourth lens L4 being a meniscus lens having a negative focal power, the fifth lens L5 being a biconvex lens having a positive focal power, and the concave surface of the fourth lens L4 being opposite to the convex surface of the fifth lens L5. Further, the concave surface of the fourth lens L4 and the convex surface of the fifth lens L5 are glued. The sixth lens L6 is a meniscus lens having a positive focal power.

In this embodiment, the first lens L1 satisfies the following condition: $0.5 \leq R1/(R2+d1) \leq 1.5$;
where R1 is a radius of curvature of the object surface S1 of the first lens L1, R2 is a radius of curvature of the image surface S2 of the first lens L1, and d1 is a center thickness of the first lens L1.

The second lens L2 satisfies the following condition: $0.45 \leq |R4|/(|R3|+d2) \leq 1.3$;
where R3 is a radius of curvature of the object surface S3 of the second lens L2, R4 is a radius of curvature of the image surface S4 of the second lens L2, and d2 is a center thickness of the second lens L2.

By the above conditions, the relationships between the respective radii of curvature and thickness of the first lens L1 and the second lens L2 are restricted so that the first lens L1 and the second lens L2 are close to a concentric circle. Therefore, when the concave surfaces of the first lens L1 and the second lens L2 are oppositely disposed, light at a large angle can be collected to enter the optical lens, and be appropriately diverged by the second lens L2 to be transmitted backward.

In this embodiment of the present disclosure, the focal length F1 of the first lens L1 and the overall focal length F of the optical lens satisfy the following condition: $-3.5 \leq F1/F \leq -1$.

The focal length F2 of the second lens L2 and the overall focal length F of the optical lens satisfy the following condition: $|F2/F| \geq 5.0$.

If the optical system of the optical lens has a total track length TTL, and the overall focal length of the optical lens is F, then $2.0 \leq TTL/F \leq 6.0$.

If the maximum field of view of the optical lens is FOVm and the image height corresponding to the maximum field of view of the optical lens is Ym, then $(FOVm \times F)/Ym \geq 45°$.

In this embodiment of the present disclosure, the first lens L1, the second lens L2, and the sixth lens L6 are aspherical lenses.

Preferably, the first lens L1, the second lens L2, and the sixth lens L6 are glass aspherical lenses, and the third lens L3, the fourth lens L4, and the fifth lens L5 are spherical lenses. It should be understood by those skilled in the art that the first lens L1, the second lens L2, and the sixth lens L6 are not limited to glass aspherical lenses, and may be plastic aspherical or spherical lenses or the like. The third lens L3, the fourth lens L4, and the fifth lens L5 are not limited to glass spherical lenses, and may be glass aspheric surfaces, plastic aspheric surfaces, resin aspheric surfaces or the like. The present disclosure is not limited in this respect. In particular, in some embodiments of the present disclosure, the optical lens is composed of six lenses consisting of three glass spherical surfaces and three glass aspheric surfaces. For example, the first lens L1, the second lens L2, and the sixth lens L6 are glass aspherical lenses, and the third lens L3, the fourth lens L4, and the fifth lens L5 are glass spherical lenses, so that the optical lens has the characteristics of a long focal length and a large field of view, and the resolution of the optical lens is ensured by the glass aspherical lenses while reducing chromatic aberration.

In this embodiment of the present disclosure, the first lens L1, the second lens L2, and the sixth lens L6 are aspherical lenses. The first lens L1 and the second lens L2 are close to the concentric lens, and are aspherical, so that light at a large angle can be effectively and smoothly converged, and due to the aspherical setting, the processing difficulty of the conventional spherical concentric lenses is avoided.

Further, in some embodiments, the object surface S1 of the first lens L1 has a central region S101 and an edge region S102 extending outwardly from the central region S101, the central region S101 of the object surface S1 of the first lens L1 is convex, and the edge region S102 of the object surface S1 of the first lens L1 is concave. It should be understood by those skilled in the art that the specific structure of the aspherical surface and the specific structures and ranges of the central and edge regions of the first lens L1 are not a limitation of the present disclosure.

The aspherical lens surfaces of the first lens L1, the second lens L2, and the sixth lens L6 satisfy the formula (1) given in the first embodiment.

As shown in FIG. 14, it is a graph of the optical performance of this embodiment of the present disclosure. It can be seen from the MTF graph of the optical lens that the optical lens has higher resolution and better optical performance.

Parameters of the optical lens of this embodiment of the present disclosure are as shown in Tables 13 and 14 below. It should be noted that the two surfaces, i.e. the object surface and the image surface, of the first lens L1, are S1 and S2, respectively, the two surfaces, i.e. the object surface and the image surface, of the second lens L2, are S3 and S4, respectively, the two surfaces, i.e. the object surface and the image surface, of the third lens L3, are S5 and S6, respectively, the two surfaces, i.e. the object surface and the image surface, of the fourth lens L4, are S7 and S8, respectively, the two surfaces, i.e. the object surface and the image surface, of the fifth lens L5, are S9 and S10, respectively, the two surfaces, i.e. the object surface and the image surface, of the sixth lens L6, are S11 and S12, respectively, the two surfaces of the filter element L8 are S13 and S14, respectively, the two surfaces of the plane lens L9 are S15 and S16, respectively, and the imaging plane is S17; and S1-S17 are in one-to-one correspondence with the surface numbers in Tables 13 and 14 below.

TABLE 13

Parameters of the optical lens of the seventh embodiment

| Surface No. | Radius of curvature R | Center thickness d | Refractive index Nd | Abbe constant Vd |
|---|---|---|---|---|
| 1 | 4.2235 | 2.5216 | 1.59 | 61.2 |
| 2 | 2.3173 | 2.9099 | | |
| 3 | −7.1103 | 3.0102 | 1.81 | 40.9 |
| 4 | −9.4965 | 0.1003 | | |
| 5 | 14.5576 | 3.2126 | 1.90 | 37.1 |
| 6 | −13.5576 | −0.1003 | | |
| 7 | Infinity | 0.8497 | | |
| 8 | 19.5694 | 0.6522 | 1.92 | 20.9 |
| 9 | 5.8700 | 3.1683 | 1.50 | 81.6 |
| 10 | −17.2234 | 0.1003 | | |
| 11 | 7.8803 | 3.1292 | 1.50 | 81.6 |
| 12 | 829.8058 | 1.5051 | | |
| 13 | Infinity | 0.5500 | 1.52 | 64.2 |
| 14 | Infinity | 1.9525 | | |
| 15 | Infinity | 0.4000 | 1.52 | 64.2 |
| 16 | Infinity | 0.1254 | | |
| 17 | Infinity | | | |

TABLE 14

Aspheric coefficients of the seventh embodiment

| Surface No. | K | A | B | C | D | E |
|---|---|---|---|---|---|---|
| 1 | −1.06539 | −8.0610E−04 | −1.7734E−04 | 2.2267E−06 | 2.3283E−07 | −5.6253E−09 |
| 2 | −0.9390998 | −2.2233E−03 | −1.4107E−03 | 1.8546E−04 | −1.4092E−06 | 6.1833E−08 |
| 3 | −1.257638 | −1.0064E−04 | −3.9705E−05 | 2.2839E−06 | 1.3498E−06 | −6.6925E−08 |
| 4 | −1.492346 | −9.5681E−05 | 1.5537E−05 | 3.1981E−06 | −3.6958E−07 | 1.4668E−08 |
| 11 | −4.647512 | 1.0329E−03 | 7.5460E−04 | −6.6992E−06 | 4.1139E−07 | −7.2836E−09 |
| 12 | 33915.57 | −1.1551E−03 | 2.0418E−04 | −8.8223E−06 | 1.5849E−07 | 1.1890E−08 |

Based on the above data, the numerical values of the formulas involved in this embodiment are calculated as follows:
R1/(R2+d1)=0.873, |R4|/(|R3|+d2)=0.938, F1/F=−2.642, |F2|/F=12.411, TTL/F=3.727, (FOVm×F)/Ym=93.578°. As shown in Tables 13 and 14, in this embodiment, as a set of specific embodiment parameters, the optical lenses with these parameters can achieve better optical performance, have a longer overall focal length, and have a larger field of view.

In summary, the optical lens of the present disclosure can satisfy the requirements of miniaturization and realize a long focal length, a large field of view, and a large aperture through the design of the six-lens structure and aspherical lenses close to a concentric circle. Moreover, it can meet the high definition requirements and effectively correct various aberrations of the optical system, especially suitable for in-vehicle camera systems. It can capture distant objects, and the overall field of vision is enlarged. The functions of both the conventional telephoto lens and the conventional wide-angle lens can be realized by one lens, reducing the cost of the in-vehicle camera system and improving the actual performance of the lens.

This embodiment of the present disclosure differs from the first embodiment in that the structure of the sixth lens L6 is different.

Eighth Embodiment

Figure 15:
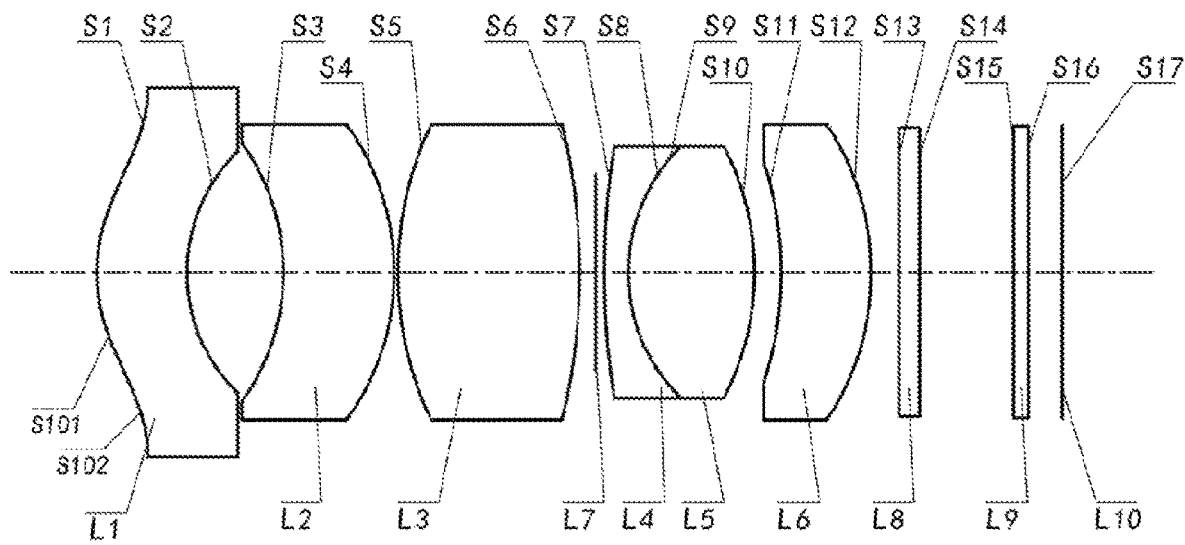
FIG. 15 is a structural schematic view of an optical lens according to an eighth embodiment of the present disclosure.
Figure 16:
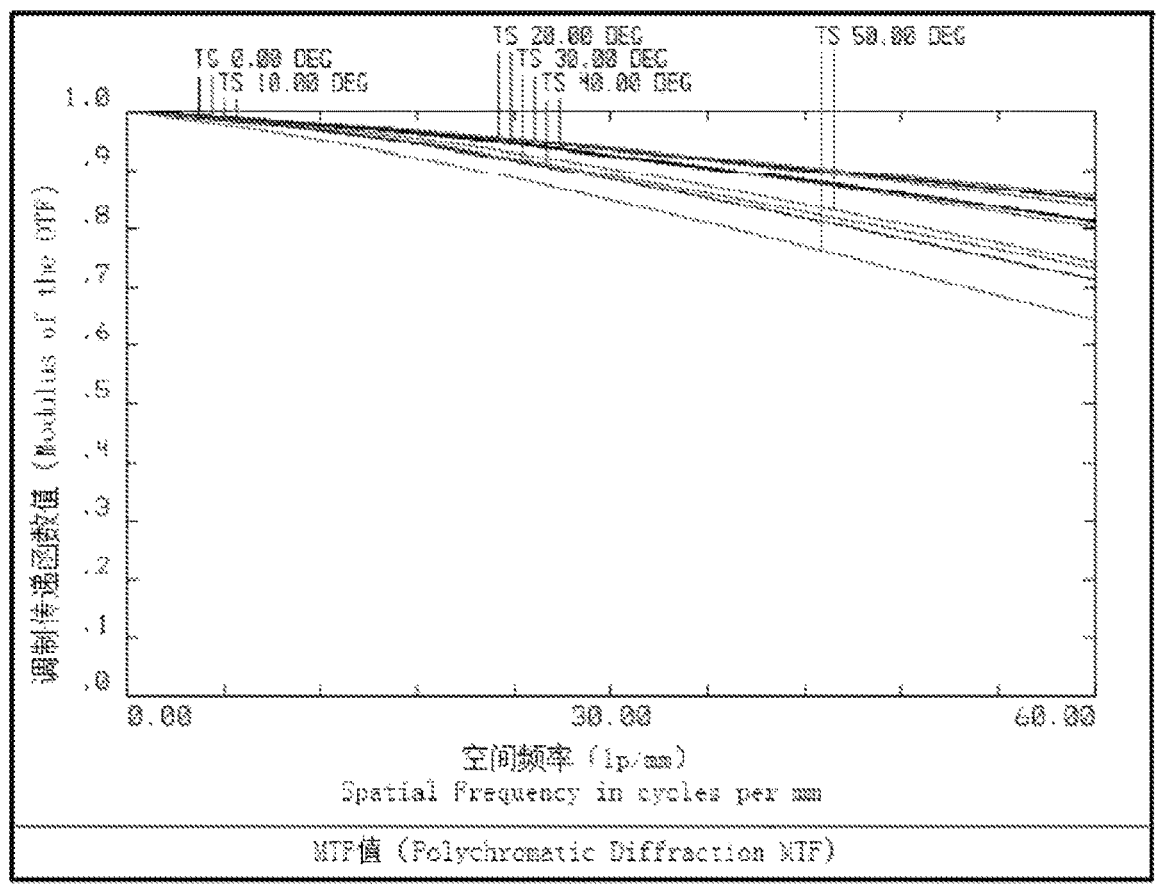
FIG. 16 is a MTF graph of the optical lens according to the eighth embodiment of the present disclosure.

Referring to FIGS. 15 and 16, an optical lens according to an eighth embodiment of the present disclosure is explained, wherein the optical lens includes at least one first lens L1, at least one second lens L2, a third lens L3, a fourth lens L4, a fifth lens L5 and a sixth lens L6. The first lens L1, the second lens L2, the third lens L3, the fourth lens L4, the fifth lens L5, and the sixth lens L6 are sequentially arranged along a direction from an object side to an image side.

The first lens L1 has a negative focal power, and the first lens L1 has an object surface S1 facing the object side and an image surface S2 facing the image side. According to this embodiment of the present disclosure, the object surface S1 of the first lens L1 is convex in order to increase the luminous flux of the optical lens. That is, the convex object surface S1 of the first lens L1 converges light at a larger angle to increase the luminous flux entering the optical lens from the object side. Preferably, the object surface S1 of the first lens L1 is an aspherical lens in order to reduce the processing difficulty. Of course, in other embodiments of the present disclosure, the first lens L1 may be a spherical lens.

Further, according to this embodiment of the present disclosure, the image surface S2 of the first lens L1 is concave. That is, the first lens L1 includes two surfaces S1 and S2, one of which is convex, and the other of which is concave. The concave surface and the convex surface form a meniscus shape, and the meniscus is convex toward the object side so as to increase the light entering the optical lens.

It should be noted that, in the imaging system lens group provided by the present disclosure, when the lens surface is convex and the position of the convex surface is not defined, it indicates that the lens surface is convex near the optical axis; When the lens surface is concave and the position of the concave surface is not defined, it indicates that the lens surface is concave near the optical axis.

The second lens L2 has an object surface S3 facing the object side and an image surface S4 facing the image side. According to this embodiment of the present disclosure, the image surface S4 of the second lens L2 is convex to facilitate proper divergence of light passing through the first lens L1 to be transmitted to the rear of the optical lens. The second lens L2 has a positive focal power. That is, the second lens L2 has an effect of transition light to smoothly transition the light of the first lens L1 to the third lens L3. Preferably, the second lens L2 is an aspherical lens so as to reduce the processing difficulty. Of course, in other embodiments of the present disclosure, the second lens L2 may be a spherical lens.

Further, according to this embodiment of the present disclosure, the object surface S3 of the second lens L2 is convex. That is, the second lens L2 includes two surfaces S3 and S4, one of which is convex and the other of which is concave. The convex surface and the concave surface form a meniscus shape, and the meniscus is convex toward the image side to facilitate divergence of light passing through the first lens L1 to be transmitted backward.

It is worth mentioning that the meniscus shapes of the first lens L1 and the second lens L2 are oppositely disposed to be close to a concentric circle structure, so that the optical lens has a smaller field of view, a larger focal length, and a higher angle resolution near the center.

The third lens L3 has an object surface S5 facing the object side, and an image surface S6 facing the image side. The object surface S5 and the image surface S6 of the third lens L3 both are convex to facilitate convergence of the light transmitted by the second lens L2 to be transmitted toward the rear of the optical lens. In other words, the third lens L3 is a biconvex lens having light transition and convergence effects.

According to this embodiment of the present disclosure, the third lens L3 has a positive focal power.

The fourth lens L4 and the fifth lens L5 form an achromatic lens group so as to reduce chromatic aberration of the light transmitted by the front components of the optical lens.

Referring to FIG. 15, the first lens L1, the second lens L2, the third lens L3, the fourth lens L4, the fifth lens L5, and the sixth lens L6 form a front lens group and a rear lens group, wherein the front lens group includes the first lens L1, the second lens L2, and the third lens L3, and the rear lens group includes the fourth lens L4, the fifth lens L5 and the sixth lens L6. The front lens group and the rear lens group are sequentially disposed along the direction from the object side to the image side.

Referring to FIG. 15, according to this embodiment of the present disclosure, the optical centers of the first lens L1, the second lens L2, the third lens L3, the fourth lens L4, the fifth lens L5 and the sixth lens L6 of the optical lens are coaxial. In other words, the principal optical axes of the first lens L1, the second lens L2, the third lens L3, the fourth lens L4, the fifth lens L5, and the sixth lens L6 of the optical lens are consistent.

Referring to FIG. 15, according to this embodiment of the present disclosure, the optical lens further includes a diaphragm L7, wherein the front lens group and the rear lens group are separately disposed on both sides of the diaphragm L7, and wherein the optical center of the diaphragm L7 is coaxial with the optical centers of the first lens L1, the second lens L2, the third lens L3, the fourth lens L4, the fifth lens L5 and the sixth lens L6. Preferably, the diaphragm L7 is disposed between the third lens L3 and the fourth lens L4.

It is worth mentioning that, referring to FIG. 15, in this embodiment of the present disclosure, the diaphragm L7 is disposed between the third lens L3 and the fourth lens L4 to reduce the stray light in the optical lens so that the optical lens have a good imaging effect. In other embodiments of the present disclosure, the diaphragm L7 may be disposed at other positions, for example, between the second lens L2 and the third lens L3, between the fourth lens L4 and the fifth lens L5, between the fifth lens L5 and the sixth lens L6 or the like. It should be understood by those skilled in the art that the position of the diaphragm L7 is not a limitation of the present disclosure. In other words, the front lens group is not limited to consist of the first lens L1, the second lens L2, and the third lens L3, and the rear lens group is not limited to consist of the fourth lens L4, the fifth lens L5, and the sixth lens L6. When the diaphragm L7 is disposed at different positions, the optical lens may form different front lens groups and rear lens groups.

As shown in FIG. 15, according to this embodiment of the present disclosure, the fourth lens L4 has an object surface S7 facing the object side and an image surface S8 facing the image side. Further, the object surface S7 of the fourth lens L4 is convex, and the image surface S8 of the fourth lens L4 is concave. In other words, the fourth lens L4 has two surfaces S7 and S8, which are a convex surface and a concave surface, respectively, the convex surface and the concave surface form a meniscus shape, and the meniscus is convex toward the object side. Further, according to this embodiment of the present disclosure, the fourth lens L4 has a negative focal power.

According to this embodiment of the present disclosure, the fifth lens L5 has an object surface S9 facing the object side, and an image surface S10 facing the image side. Further, the object surface S9 of the fifth lens L5 is convex, and the image surface S10 of the fifth lens L5 is convex. In other words, the fifth lens L5 is a biconvex lens. Further, according to this embodiment of the present disclosure, the fifth lens L5 has a positive focal power.

Further, the image surface S8 of the fourth lens L4 and the object surface S9 of the fifth lens L5 are disposed to face each other. In other words, the image surface S8 of the fourth lens L4 and the object surface S9 of the fifth lens L5 are disposed to face each other. In this embodiment, the concave surface of the fourth lens L4 and the convex surfaces of the fifth lens L5 are disposed to face each other.

According to this embodiment of the present disclosure, the sixth lens L6 has an object surface S11 facing the object side, and an image surface S12 facing the image side. Further, the object surface S11 of the sixth lens L6 is concave, and the image surface S12 of the sixth lens L6 is convex. In other words, the sixth lens L6 is a meniscus lens, and the meniscus is convex toward the image side. Further, the sixth lens L6 has a negative focal power. The aberration and distortion are further corrected by the sixth lens L6, so that the imaging quality of the optical lens is better.

It is worth mentioning that, in this embodiment of the present disclosure, the sixth lens L6 is used to appropriately increase the distortion of the lens edge of the front lenses of the optical lens, so that light at a large angle can reach the imaging plane L10 with a predetermined size, such as the photosensitive chip surface. Moreover, the image can be continuously corrected by software post-processing, so that the image formed by the light after passing through the sixth lens L6 is restored to normal, namely obtaining large-angle imaging.

According to this embodiment of the present disclosure, the optical lens further includes a plane lens L9 for protecting the optical lens by isolation. Of course, in other embodiments of the present disclosure, the plane lens L9 may not be provided, and the present disclosure is not limited in this respect.

Referring to FIG. 15, according to this embodiment of the present disclosure, the first lens L1 of the optical lens has a convex surface and a concave surface, and the second lens L2 has a concave surface and a convex surface, wherein the convex surface of the first lens L1 is disposed to face the object side, the concave surface of the first lens L1 is disposed to face the image side, the concave surface of the second lens L2 is disposed to face the object side, and the convex surface of the second lens L2 is disposed to face the image side. The third lens L3 has two convex surfaces facing the object side and the image side, respectively. The fourth lens L4 has a convex surface and a concave surface facing the object side and the image side, respectively, and the fifth lens L5 has two convex surfaces facing the object side and the image side, respectively, wherein the concave surface of the fourth lens L4 and the convex surface of the fifth lens L5 is oppositely disposed to face each other. The sixth lens L6 has two convex surfaces, which are disposed to face the object side and the image side, respectively.

According to this embodiment of the present disclosure, the achromatic lens group of the optical lens is preferably a glued lens. In other words, the fourth lens L4 and the fifth lens L5 are glued together to form the achromatic lens group. At this time, since the fourth lens L4 and the fifth lens L5 are glued together, the image surface S8 of the concave surface of the fourth lens L4 and the object surface S9 of the convex surface of the fifth lens L5 are disposed in a glued manner to face each other. Of course, in other embodiments of the present disclosure, the achromatic lens group may also be a separation-type achromatic lens group. It would be understood that when the achromatic lens group is a separation-type achromatic lens group, the fourth lens L4 and the fifth lens L5 are separately disposed.

It is worth mentioning that the first lens L1 and the second lens L2 may be made of a glass material, or may be made of other materials having good light transmission performance, such as plastics and resins. It would be understood by those skilled in the art that in the optical lens of the present disclosure, light enters from the first lens L1, and is transmitted to the second lens L2 after being converged by the first lens L1. Therefore, light at a large angle can be collected by the first lens L1. Further, the light reaches the second lens L2 after passing through the first lens L1, and the light converged by the first lens L1 is appropriately diverged by the second lens L2 to be transmitted to the rear of the optical lens. Therefore, the refractive indices Nd of the first lens L1 and the second lens L2 need to match with each other. However, it would be understood by those skilled in the art that the refractive indices Nd of the first lens L1 and the second lens L2 are not a limitation of the present disclosure. On the other hand, in the present disclosure, the first lens L1 and the second lens L2 are provided with an Abbe constant Vd, so that the lens has better image quality. However, it should be understood by those skilled in the art that the Abbe constants Vd of the first lens L1 and the second lens L2 are not a limitation of the present disclosure.

As shown in FIG. 15, it is a structural schematic view of the optical lens according to the eighth embodiment of the present disclosure. The optical lens includes, sequentially from the object side to the image side, a front lens group, a diaphragm L7, a rear lens group, a filter element L8, a plane lens L9, and an imaging plane L10.

Herein, the front lens group includes, sequentially from the object side to the image side: a first lens L1, a second lens L2, and a third lens L3, the first lens L1 being a meniscus lens having a negative focal power, the second lens L2 being a meniscus lens having a positive focal power, the concave surface of the first lens L1 being opposite to the concave surface of the second lens L2, and the third lens L3 being a biconvex lens having positive focal power; and the rear lens group includes, sequentially from the object side to the image side: a fourth lens L4, a fifth lens L5, and a sixth lens L6, the fourth lens L4 being a meniscus lens having a negative focal power, the fifth lens L5 being a biconvex lens having a positive focal power, and the concave surface of the fourth lens L4 being opposite to the convex surface of the fifth lens L5. Further, the concave surface of the fourth lens L4 and the convex surface of the fifth lens L5 are glued. The sixth lens L6 is a meniscus lens having a negative focal power.

In this embodiment, the first lens L1 satisfies the following condition: $0.5 \leq R1/(R2+d1) \leq 1.5$;

where R1 is a radius of curvature of the object surface S1 of the first lens L1, R2 is a radius of curvature of the image surface S2 of the first lens L1, and d1 is a center thickness of the first lens L1.

The second lens L2 satisfies the following condition: $0.45 \leq |R4|/(|R3|+d2) \leq 1.3$;

where R3 is a radius of curvature of the object surface S3 of the second lens L2, R4 is a radius of curvature of the image surface S4 of the second lens L2, and d2 is a center thickness of the second lens L2.

By the above conditions, the relationships between the respective radii of curvature and thickness of the first lens L1 and the second lens L2 are restricted so that the first lens L1 and the second lens L2 are close to a concentric circle. Therefore, when the concave surfaces of the first lens L1 and the second lens L2 are oppositely disposed, light at a large angle can be collected to enter the optical lens, and be appropriately diverged by the second lens L2 to be transmitted backward.

In this embodiment of the present disclosure, the focal length F1 of the first lens L1 and the overall focal length F of the optical lens satisfy the following condition: $-3.5 \leq F1/F \leq -1$.

The focal length F2 of the second lens L2 and the overall focal length F of the optical lens satisfy the following condition: $|F2/F| \geq 5.0$.

If the optical system of the optical lens has a total track length TTL, and the overall focal length of the optical lens is F, then $2.0 \leq TTL/F \leq 6.0$.

If the maximum field of view of the optical lens is FOVm and the image height corresponding to the maximum field of view of the optical lens is Ym, then $(FOVm \times F)/Ym \geq 45°$.

In this embodiment of the present disclosure, the first lens L1, the second lens L2, and the sixth lens L6 are aspherical lenses.

Preferably, the first lens L1, the second lens L2, and the sixth lens L6 are glass aspherical lenses, and the third lens L3, the fourth lens L4, and the fifth lens L5 are spherical lenses. It should be understood by those skilled in the art that the first lens L1, the second lens L2, and the sixth lens L6 are not limited to glass aspherical lenses, and may be plastic aspherical or spherical lenses or the like. The third lens L3, the fourth lens L4, and the fifth lens L5 are not limited to glass spherical lenses, and may be glass aspheric surfaces, plastic aspheric surfaces, resin aspheric surfaces or the like. The present disclosure is not limited in this respect. In particular, in some embodiments of the present disclosure, the optical lens is composed of six lenses consisting of three glass spherical surfaces and three glass aspheric surfaces. For example, the first lens L1, the second lens L2, and the sixth lens L6 are glass aspherical lenses, and the third lens L3, the fourth lens L4, and the fifth lens L5 are glass spherical lenses, so that the optical lens has the characteristics of a long focal length and a large field of view, and the resolution of the optical lens is ensured by the glass aspherical lenses while reducing chromatic aberration.

In this embodiment of the present disclosure, the first lens L1, the second lens L2, and the sixth lens L6 are aspherical lenses. The first lens L1 and the second lens L2 are close to the concentric lens, and are aspherical, so that light at a large angle can be effectively and smoothly converged, and due to the aspherical setting, the processing difficulty of the conventional spherical concentric lenses is avoided.

Further, in some embodiments, the object surface S1 of the first lens L1 has a central region S101 and an edge region S102 extending outwardly from the central region S101, the central region S101 of the object surface S1 of the first lens L1 is convex, and the edge region S102 of the object surface S1 of the first lens L1 is concave. It should be understood by those skilled in the art that the specific structure of the aspherical surface and the specific structures and ranges of the central and edge regions of the first lens L1 are not a limitation of the present disclosure.

The aspherical lens surfaces of the first lens L1, the second lens L2, and the sixth lens L6 satisfy the formula (1) given in the first embodiment.

As shown in FIG. 16, it is a graph of the optical performance of this embodiment of the present disclosure. It can be seen from the MTF graph of the optical lens that the optical lens has higher resolution and better optical performance.

Parameters of the optical lens of this embodiment of the present disclosure are as shown in Tables 15 and 16 below. It should be noted that the two surfaces, i.e. the object surface and the image surface, of the first lens L1, are S1 and S2, respectively, the two surfaces, i.e. the object surface and the image surface, of the second lens L2, are S3 and S4, respectively, the two surfaces, i.e. the object surface and the image surface, of the third lens L3, are S5 and S6, respectively, the two surfaces, i.e. the object surface and the image surface, of the fourth lens L4, are S7 and S8, respectively, the two surfaces, i.e. the object surface and the image surface, of the fifth lens L5, are S9 and S10, respectively, the two surfaces, i.e. the object surface and the image surface, of the sixth lens L6, are S11 and S12, respectively, the two surfaces of the filter element L8 are S13 and S14, respectively, the two surfaces of the plane lens L9 are S15 and S16, respectively, and the imaging plane is S17; and S1-S17 are in one-to-one correspondence with the surface numbers in Tables 15 and 16 below.

TABLE 15

Parameters of the optical lens of the eighth embodiment

| Surface No. | Radius of curvature R | Center thickness d | Refractive index Nd | Abbe constant Vd |
|---|---|---|---|---|
| 1 | 5.9641 | 2.4339 | 1.81 | 40.9 |
| 2 | 2.7568 | 2.5977 | | |
| 3 | −6.4507 | 3.0000 | 1.81 | 40.9 |
| 4 | −6.4540 | 0.1000 | | |
| 5 | 9.3582 | 4.7000 | 1.90 | 37.1 |
| 6 | −17.0252 | −0.1000 | | |
| 7 | Infinity | 0.2588 | | |
| 8 | 20.4614 | 0.8600 | 1.92 | 20.9 |
| 9 | 4.3077 | 3.4000 | 1.53 | 60.2 |
| 10 | −8.3722 | 0.1000 | | |
| 11 | −22.9600 | 2.4325 | 1.50 | 81.6 |
| 12 | −34.2848 | 1.5000 | | |
| 13 | Infinity | 0.5500 | 1.52 | 64.2 |
| 14 | Infinity | 1.6586 | | |
| 15 | Infinity | 0.4000 | 1.52 | 64.2 |
| 16 | Infinity | 0.1250 | | |
| 17 | Infinity | | | |

TABLE 16

Aspheric coefficients of the eighth embodiment

| Surface No. | K | A | B | C | D | E |
|---|---|---|---|---|---|---|
| 1 | −1.978921 | −2.1392E−03 | −1.2613E−04 | 5.6395E−06 | 3.9365E−08 | −1.0714E−09 |
| 2 | −1.500251 | −2.1479E−03 | −8.3223E−04 | 1.4589E−04 | −7.2360E−06 | 5.1163E−07 |
| 3 | −2.962827 | −1.6979E−03 | −1.8978E−04 | 1.8242E−05 | 4.6182E−07 | −3.1658E−09 |
| 4 | −0.218725 | −1.2550E−04 | −1.9909E−05 | 4.3064E−06 | −5.5250E−07 | −2.1591E−09 |
| 11 | 0 | −3.8120E−03 | 2.4927E−04 | −3.0693E−05 | 2.8948E−07 | 6.0839E−08 |
| 12 | 0 | −5.5343E−03 | 3.1880E−04 | −2.6158E−05 | 1.0499E−06 | −1.4779E−08 |

Based on the above data, the numerical values of the formulas involved in this embodiment are calculated as follows:
R1/(R2+d1)=1.149, |R4|/(|R3|+d2)=0.683, F1/F=−1.492, |F2|/F=5.971, TTL/F=3.742, (FOVm×F)/Ym=82.612°. As shown in Tables 15 and 16, in this embodiment, as a set of specific embodiment parameters, the optical lenses with these parameters can achieve better optical performance, have a longer overall focal length, and have a larger field of view.

In summary, the optical lens of the present disclosure can satisfy the requirements of miniaturization and realize a long focal length, a large field of view, and a large aperture through the design of the six-lens structure and aspherical lenses close to a concentric circle. Moreover, it can meet the high definition requirements and effectively correct various aberrations of the optical system, especially suitable for in-vehicle camera systems. It can capture distant objects, and the overall field of vision is enlarged. The functions of both the conventional telephoto lens and the conventional wide-angle lens can be realized by one lens, reducing the cost of the in-vehicle camera system and improving the actual performance of the lens.

This embodiment of the present disclosure differs from the first embodiment in the focal power of the second lens, and the focal power and structure of the sixth lens.

Ninth Embodiment

Figure 17:
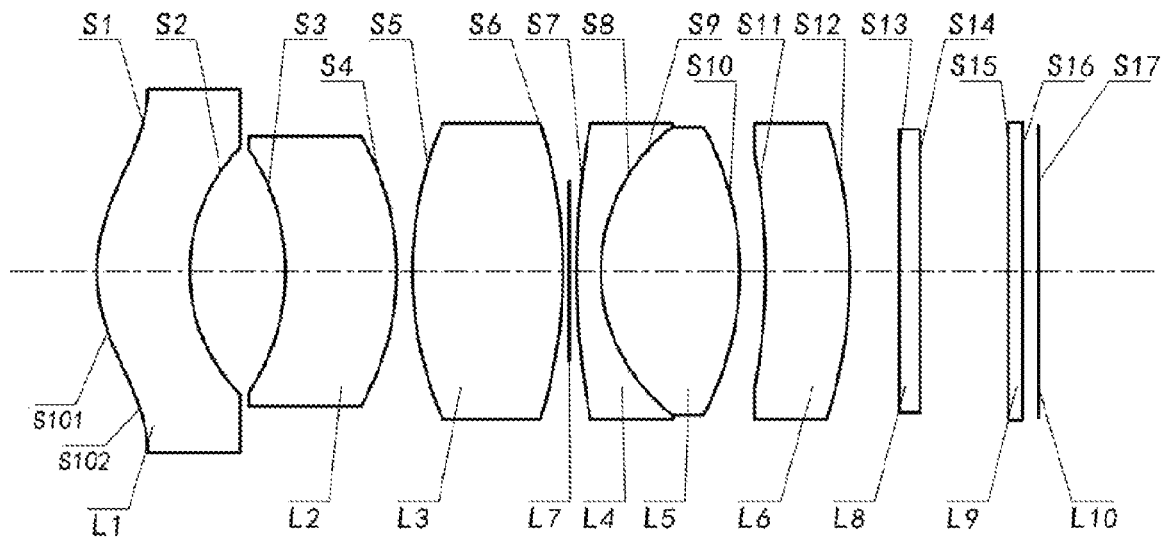
FIG. 17 is a structural schematic view of an optical lens according to a ninth embodiment of the present disclosure.
Figure 18:
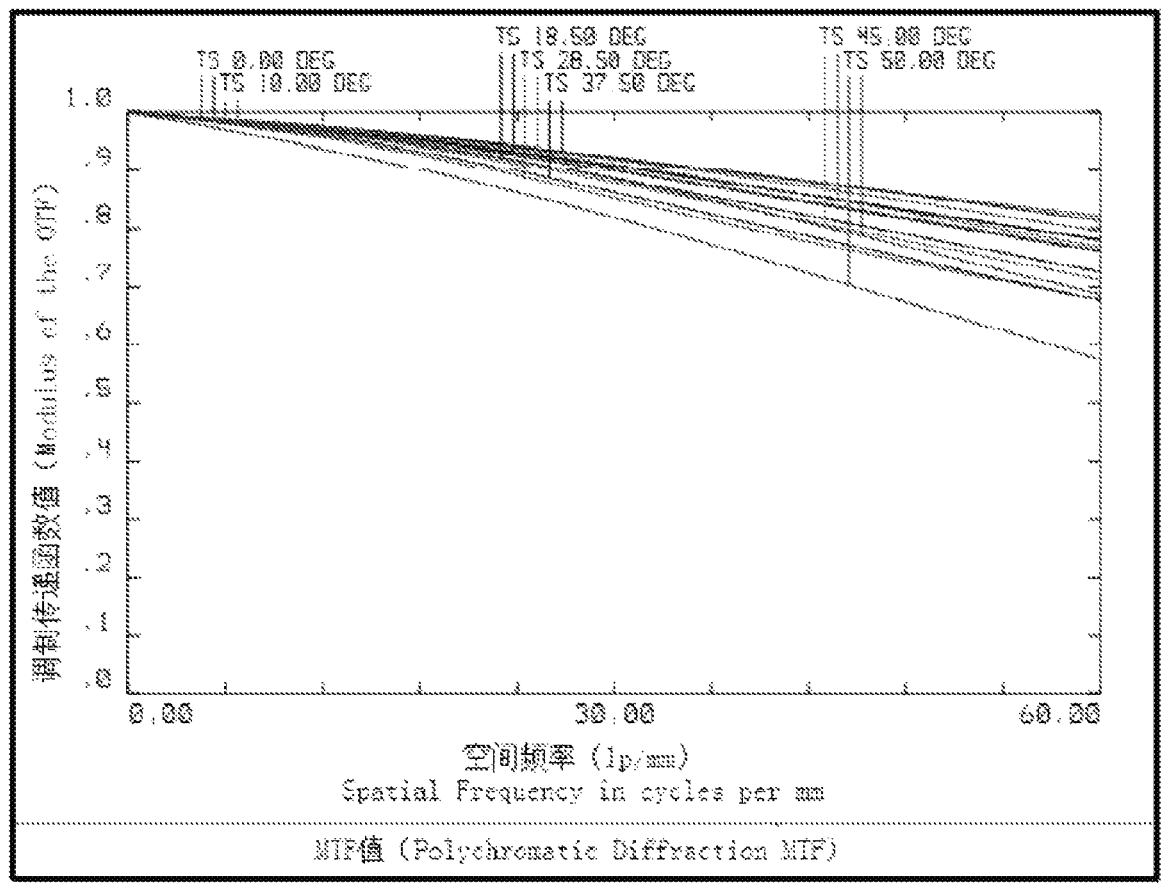
FIG. 18 is a MTF graph of the optical lens according to the ninth embodiment of the present disclosure.

Referring to FIGS. 17 and 18, an optical lens according to a ninth embodiment of the present disclosure is explained, wherein the optical lens includes at least one first lens L1, at least one second lens L2, a third lens L3, a fourth lens L4, a fifth lens L5 and a sixth lens L6. The first lens L1, the second lens L2, the third lens L3, the fourth lens L4, the fifth lens L5, and the sixth lens L6 are sequentially arranged along a direction from an object side to an image side.

The first lens L1 has a negative focal power, and the first lens L1 has an object surface S1 facing the object side and an image surface S2 facing the image side. According to this embodiment of the present disclosure, the object surface S1 of the first lens L1 is convex in order to increase the luminous flux of the optical lens. That is, the convex object surface S1 of the first lens L1 converges light at a larger angle to increase the luminous flux entering the optical lens from the object side. Preferably, the object surface S1 of the first lens L1 is an aspherical lens in order to reduce the processing difficulty. Of course, in other embodiments of the present disclosure, the first lens L1 may be a spherical lens.

Further, according to this embodiment of the present disclosure, the image surface S2 of the first lens L1 is concave. That is, the first lens L1 includes two surfaces S1 and S2, one of which is convex, and the other of which is concave. The concave surface and the convex surface form a meniscus shape, and the meniscus is convex toward the object side so as to increase the light entering the optical lens.

It should be noted that, in the imaging system lens group provided by the present disclosure, when the lens surface is convex and the position of the convex surface is not defined, it indicates that the lens surface is convex near the optical axis; When the lens surface is concave and the position of the concave surface is not defined, it indicates that the lens surface is concave near the optical axis.

The second lens L2 has an object surface S3 facing the object side and an image surface S4 facing the image side. According to this embodiment of the present disclosure, the image surface S4 of the second lens L2 is convex to facilitate proper divergence of light passing through the first lens L1 to be transmitted to the rear of the optical lens. The second lens L2 has a positive focal power. That is, the second lens L2 has an effect of transition light to smoothly transition the light of the first lens L1 to the third lens L3. Preferably, the second lens L2 is an aspherical lens so as to reduce the processing difficulty. Of course, in other embodiments of the present disclosure, the second lens L2 may be a spherical lens.

Further, according to this embodiment of the present disclosure, the object surface S3 of the second lens L2 is convex. That is, the second lens L2 includes two surfaces S3 and S4, one of which is convex and the other of which is concave. The convex surface and the concave surface form a meniscus shape, and the meniscus is convex toward the image side to facilitate divergence of light passing through the first lens L1 to be transmitted backward.

It is worth mentioning that the meniscus shapes of the first lens L1 and the second lens L2 are oppositely disposed to be close to a concentric circle structure, so that the optical lens has a smaller field of view, a larger focal length, and a higher angle resolution near the center.

The third lens L3 has an object surface S5 facing the object side, and an image surface S6 facing the image side. The object surface S5 and the image surface S6 of the third lens L3 both are convex to facilitate convergence of the light transmitted by the second lens L2 to be transmitted toward the rear of the optical lens. In other words, the third lens L3 is a biconvex lens having light transition and convergence effects.

According to this embodiment of the present disclosure, the third lens L3 has a positive focal power.

The fourth lens L4 and the fifth lens L5 form an achromatic lens group so as to reduce chromatic aberration of the light transmitted by the front components of the optical lens.

Referring to FIG. 17, the first lens L1, the second lens L2, the third lens L3, the fourth lens L4, the fifth lens L5, and the sixth lens L6 form a front lens group and a rear lens group, wherein the front lens group includes the first lens L1, the second lens L2, and the third lens L3, and the rear lens group includes the fourth lens L4, the fifth lens L5 and the sixth lens L6. The front lens group and the rear lens group are sequentially disposed along the direction from the object side to the image side.

Referring to FIG. 17, according to this embodiment of the present disclosure, the optical centers of the first lens L1, the second lens L2, the third lens L3, the fourth lens L4, the fifth lens L5 and the sixth lens L6 of the optical lens are coaxial. In other words, the principal optical axes of the first lens L1, the second lens L2, the third lens L3, the fourth lens L4, the fifth lens L5, and the sixth lens L6 of the optical lens are consistent.

Referring to FIG. 17, according to this embodiment of the present disclosure, the optical lens further includes a diaphragm L7, wherein the front lens group and the rear lens group are separately disposed on both sides of the diaphragm L7, and wherein the optical center of the diaphragm L7 is coaxial with the optical centers of the first lens L1, the second lens L2, the third lens L3, the fourth lens L4, the fifth lens L5 and the sixth lens L6. Preferably, the diaphragm L7 is disposed between the third lens L3 and the fourth lens L4.

It is worth mentioning that, referring to FIG. 17, in this embodiment of the present disclosure, the diaphragm L7 is disposed between the third lens L3 and the fourth lens L4 to reduce the stray light in the optical lens so that the optical lens have a good imaging effect. In other embodiments of the present disclosure, the diaphragm L7 may be disposed at other positions, for example, between the second lens L2 and the third lens L3, between the fourth lens L4 and the fifth lens L5, between the fifth lens L5 and the sixth lens L6 or the like. It should be understood by those skilled in the art that the position of the diaphragm L7 is not a limitation of the present disclosure. In other words, the front lens group is not limited to consist of the first lens L1, the second lens L2, and the third lens L3, and the rear lens group is not limited to consist of the fourth lens L4, the fifth lens L5, and the sixth lens L6. When the diaphragm L7 is disposed at different positions, the optical lens may form different front lens groups and rear lens groups.

As shown in FIG. 17, according to this embodiment of the present disclosure, the fourth lens L4 has an object surface S7 facing the object side and an image surface S8 facing the image side. Further, the object surface S7 of the fourth lens L4 is convex, and the image surface S8 of the fourth lens L4 is concave. In other words, the fourth lens L4 has two surfaces S7 and S8, which are a convex surface and a concave surface, respectively, the convex surface and the concave surface form a meniscus shape, and the meniscus is convex toward the object side. Further, according to this embodiment of the present disclosure, the fourth lens L4 has a negative focal power.

According to this embodiment of the present disclosure, the fifth lens L5 has an object surface S9 facing the object side, and an image surface S10 facing the image side. Further, the object surface S9 of the fifth lens L5 is convex, and the image surface S10 of the fifth lens L5 is convex. In other words, the fifth lens L5 is a biconvex lens. Further, according to this embodiment of the present disclosure, the fifth lens L5 has a positive focal power.

Further, the image surface S8 of the fourth lens L4 and the object surface S9 of the fifth lens L5 are disposed to face each other. In other words, the image surface S8 of the fourth lens L4 and the object surface S9 of the fifth lens L5 are disposed to face each other. In this embodiment, the concave surface of the fourth lens L4 and the convex surfaces of the fifth lens L5 are disposed to face each other.

According to this embodiment of the present disclosure, the sixth lens L6 has an object surface S11 facing the object side, and an image surface S12 facing the image side. Further, the object surface S11 of the sixth lens L6 is concave, and the image surface S12 of the sixth lens L6 is concave. In other words, the sixth lens L6 is a biconcave lens. Further, the sixth lens L6 has a negative focal power. The aberration and distortion are further corrected by the sixth lens L6, so that the imaging quality of the optical lens is better.

It is worth mentioning that, in this embodiment of the present disclosure, the sixth lens L6 is used to appropriately increase the distortion of the lens edge of the front lenses of the optical lens, so that light at a large angle can reach the imaging plane L10 with a predetermined size, such as the photosensitive chip surface. Moreover, the image can be continuously corrected by software post-processing, so that the image formed by the light after passing through the sixth lens L6 is restored to normal, namely obtaining large-angle imaging.

According to this embodiment of the present disclosure, the optical lens further includes a plane lens L9 for protecting the optical lens by isolation. Of course, in other embodiments of the present disclosure, the plane lens L9 may not be provided, and the present disclosure is not limited in this respect.

Referring to FIG. 17, according to this embodiment of the present disclosure, the first lens L1 of the optical lens has a convex surface and a concave surface, and the second lens L2 has a concave surface and a convex surface, wherein the convex surface of the first lens L1 is disposed to face the object side, the concave surface of the first lens L1 is disposed to face the image side, the concave surface of the second lens L2 is disposed to face the object side, and the convex surface of the second lens L2 is disposed to face the image side. The third lens L3 has two convex surfaces facing the object side and the image side, respectively. The fourth lens L4 has a convex surface and a concave surface facing the object side and the image side, respectively, and the fifth lens L5 has two convex surfaces facing the object side and the image side, respectively, wherein the concave surface of the fourth lens L4 and the convex surface of the fifth lens L5 is oppositely disposed to face each other. The sixth lens L6 has two concave surfaces, which are disposed to face the object side and the image side, respectively.

According to this embodiment of the present disclosure, the achromatic lens group of the optical lens is preferably a glued lens. In other words, the fourth lens L4 and the fifth lens L5 are glued together to form the achromatic lens group. At this time, since the fourth lens L4 and the fifth lens L5 are glued together, the image surface S8 of the concave surface of the fourth lens L4 and the object surface S9 of the convex surface of the fifth lens L5 are disposed in a glued manner to face each other. Of course, in other embodiments of the present disclosure, the achromatic lens group may also be a separation-type achromatic lens group. It would be understood that when the achromatic lens group is a separation-type achromatic lens group, the fourth lens L4 and the fifth lens L5 are separately disposed.

It is worth mentioning that the first lens L1 and the second lens L2 may be made of a glass material, or may be made of other materials having good light transmission performance, such as plastics and resins. It would be understood by those skilled in the art that in the optical lens of the present disclosure, light enters from the first lens L1, and is transmitted to the second lens L2 after being converged by the first lens L1. Therefore, light at a large angle can be collected by the first lens L1. Further, the light reaches the second lens L2 after passing through the first lens L1, and the light converged by the first lens L1 is appropriately diverged by the second lens L2 to be transmitted to the rear of the optical lens. Therefore, the refractive indices Nd of the first lens L1 and the second lens L2 need to match with each other. However, it would be understood by those skilled in the art that the refractive indices Nd of the first lens L1 and the second lens L2 are not a limitation of the present disclosure. On the other hand, in the present disclosure, the first lens L1 and the second lens L2 are provided with an Abbe constant Vd, so that the lens has better image quality. However, it should be understood by those skilled in the art that the Abbe constants Vd of the first lens L1 and the second lens L2 are not a limitation of the present disclosure.

As shown in FIG. 17, it is a structural schematic view of the optical lens according to the ninth embodiment of the present disclosure. The optical lens includes, sequentially from the object side to the image side, a front lens group, a diaphragm L7, a rear lens group, a filter element L8, a plane lens L9, and an imaging plane L10.

Herein, the front lens group includes, sequentially from the object side to the image side: a first lens L1, a second lens L2, and a third lens L3, the first lens L1 being a meniscus lens having a negative focal power, the second lens L2 being a meniscus lens having a positive focal power, the concave surface of the first lens L1 being opposite to the concave surface of the second lens L2, and the third lens L3 being a biconvex lens having positive focal power; and the rear lens group includes, sequentially from the object side to the image side: a fourth lens L4, a fifth lens L5, and a sixth lens L6, the fourth lens L4 being a meniscus lens having a negative focal power, the fifth lens L5 being a biconvex lens having a positive focal power, and the concave surface of the fourth lens L4 being opposite to the convex surface of the fifth lens L5. Further, the concave surface of the fourth lens L4 and the convex surface of the fifth lens L5 are glued. The sixth lens L6 is a biconcave lens having a negative focal power.

In this embodiment, the first lens L1 satisfies the following condition: $0.5 \leq R1/(R2+d1) \leq 1.5$;
where R1 is a radius of curvature of the object surface S1 of the first lens L1, R2 is a radius of curvature of the image surface S2 of the first lens L1, and d1 is a center thickness of the first lens L1.

The second lens L2 satisfies the following condition: $0.45 \leq |R4|/(|R3|+d2) \leq 1.3$;
where R3 is a radius of curvature of the object surface S3 of the second lens L2, R4 is a radius of curvature of the image surface S4 of the second lens L2, and d2 is a center thickness of the second lens L2.

By the above conditions, the relationships between the respective radii of curvature and thickness of the first lens L1 and the second lens L2 are restricted so that the first lens L1 and the second lens L2 are close to a concentric circle. Therefore, when the concave surfaces of the first lens L1 and the second lens L2 are oppositely disposed, light at a large angle can be collected to enter the optical lens, and be appropriately diverged by the second lens L2 to be transmitted backward.

In this embodiment of the present disclosure, the focal length F1 of the first lens L1 and the overall focal length F of the optical lens satisfy the following condition: $-3.5 \leq F1/F \leq -1$.

The focal length F2 of the second lens L2 and the overall focal length F of the optical lens satisfy the following condition: $|F2/F| \geq 5.0$.

If the optical system of the optical lens has a total track length TTL, and the overall focal length of the optical lens is F, then $2.0 \leq TTL/F \leq 6.0$.

If the maximum field of view of the optical lens is FOVm and the image height corresponding to the maximum field of view of the optical lens is Ym, then $(FOVm \times F)/Ym \geq 45°$.

In this embodiment of the present disclosure, the first lens L1, the second lens L2, and the sixth lens L6 are aspherical lenses.

Preferably, the first lens L1, the second lens L2, and the sixth lens L6 are glass aspherical lenses, and the third lens L3, the fourth lens L4, and the fifth lens L5 are spherical lenses. It should be understood by those skilled in the art that the first lens L1, the second lens L2, and the sixth lens L6 are not limited to glass aspherical lenses, and may be plastic aspherical or spherical lenses or the like. The third lens L3, the fourth lens L4, and the fifth lens L5 are not limited to glass spherical lenses, and may be glass aspheric surfaces, plastic aspheric surfaces, resin aspheric surfaces or the like. The present disclosure is not limited in this respect. In particular, in some embodiments of the present disclosure, the optical lens is composed of six lenses consisting of three glass spherical surfaces and three glass aspheric surfaces. For example, the first lens L1, the second lens L2, and the sixth lens L6 are glass aspherical lenses, and the third lens L3, the fourth lens L4, and the fifth lens L5 are glass spherical lenses, so that the optical lens has the characteristics of a long focal length and a large field of view, and the resolution of the optical lens is ensured by the glass aspherical lenses while reducing chromatic aberration.

In this embodiment of the present disclosure, the first lens L1, the second lens L2, and the sixth lens L6 are aspherical lenses. The first lens L1 and the second lens L2 are close to the concentric lens, and are aspherical, so that light at a large angle can be effectively and smoothly converged, and due to the aspherical setting, the processing difficulty of the conventional spherical concentric lenses is avoided.

Further, in some embodiments, the object surface S1 of the first lens L1 has a central region S101 and an edge region S102 extending outwardly from the central region S101, the central region S101 of the object surface S1 of the first lens L1 is convex, and the edge region S102 of the object surface S1 of the first lens L1 is concave. It should be understood by those skilled in the art that the specific structure of the aspherical surface and the specific structures and ranges of the central and edge regions of the first lens L1 are not a limitation of the present disclosure.

The aspherical lens surfaces of the first lens L1, the second lens L2, and the sixth lens L6 satisfy the formula (1) given in the first embodiment.

As shown in FIG. 18, it is a graph of the optical performance of this embodiment of the present disclosure. It can be seen from the MTF graph of the optical lens that the optical lens has higher resolution and better optical performance.

Parameters of the optical lens of this embodiment of the present disclosure are as shown in Tables 17 and 18 below. It should be noted that the two surfaces, i.e. the object surface and the image surface, of the first lens L1, are S1 and S2, respectively, the two surfaces, i.e. the object surface and the image surface, of the second lens L2, are S3 and S4, respectively, the two surfaces, i.e. the object surface and the image surface, of the third lens L3, are S5 and S6, respectively, the two surfaces, i.e. the object surface and the image surface, of the fourth lens L4, are S7 and S8, respectively, the two surfaces, i.e. the object surface and the image surface, of the fifth lens L5, are S9 and S10, respectively, the two surfaces, i.e. the object surface and the image surface, of the sixth lens L6, are S11 and S12, respectively, the two surfaces of the filter element L8 are S13 and S14, respectively, the two surfaces of the plane lens L9 are S15 and S16, respectively, and the imaging plane is S17; and S1-S17 are in one-to-one correspondence with the surface numbers in Tables 17 and 18 below.

TABLE 17

Parameters of the optical lens of the ninth embodiment

| Surface No. | Radius of curvature R | Center thickness d | Refractive index Nd | Abbe constant Vd |
|---|---|---|---|---|
| 1 | 6.5000 | 2.5037 | 1.81 | 40.9 |
| 2 | 2.9235 | 2.5906 | | |
| 3 | −6.2753 | 3.0000 | 1.81 | 40.9 |
| 4 | −6.7072 | 0.4277 | | |
| 5 | 10.2531 | 4.0608 | 1.90 | 37.1 |
| 6 | −13.6337 | −0.1000 | | |
| 7 | Infinity | 0.4793 | | |
| 8 | 23.8088 | 0.6500 | 1.92 | 20.9 |
| 9 | 4.8600 | 3.7464 | 1.50 | 81.6 |
| 10 | −8.0810 | 0.1000 | | |
| 11 | −63.1041 | 2.2786 | 1.50 | 81.6 |
| 12 | 279.8107 | 1.5000 | | |
| 13 | Infinity | 0.5500 | 1.52 | 64.2 |

TABLE 17-continued

Parameters of the optical lens of the ninth embodiment

| Surface No. | Radius of curvature R | Center thickness d | Refractive index Nd | Abbe constant Vd |
|---|---|---|---|---|
| 14 | Infinity | 1.6940 | | |
| 15 | Infinity | 0.4000 | 1.52 | 64.2 |
| 16 | Infinity | 0.1250 | | |
| 17 | Infinity | | | |

TABLE 18

Aspheric coefficients of the ninth embodiment

| Surface No. | K | A | B | C | D | E |
|---|---|---|---|---|---|---|
| 1 | −1.8543 | −1.9997E−03 | −1.1560E−04 | 2.2771E−05 | −5.2886E−08 | −9.4573E−10 |
| 2 | −2.44619 | −2.4723E−03 | −7.5085E−04 | 1.3839E−04 | −1.1765E−06 | 4.7022E−07 |
| 3 | 0.712885 | −1.3650E−03 | −7.9399E−05 | 1.5092E−06 | 6.4412E−07 | −4.6140E−08 |
| 4 | −0.24082 | 8.6831E−05 | 4.6499E−06 | 4.2465E−06 | −1.0800E−07 | −1.8697E−08 |
| 11 | 0 | −3.0744E−03 | 2.7745E−04 | −2.9488E−05 | 1.1583E−07 | −7.2211E−09 |
| 12 | 0 | −4.4573E−03 | 2.9165E−04 | −2.0576E−05 | 7.3659E−07 | −7.7739E−09 |

Based on the above data, the numerical values of the formulas involved in this embodiment are calculated as follows:
R1/(R2+d1)=1.198, |R4|/(|R3|+d2)=0.723, F1/F=−1.483, |F2|/F=8.851, TTL/F=3.730, (FOVm×F)/Ym=58.952°. As shown in Tables 18 and 19, in this embodiment, as a set of specific embodiment parameters, the optical lenses with these parameters can achieve better optical performance, have a longer overall focal length, and have a larger field of view.

In summary, the optical lens of the present disclosure can satisfy the requirements of miniaturization and realize a long focal length, a large field of view, and a large aperture through the design of the six-lens structure and aspherical lenses close to a concentric circle. Moreover, it can meet the high definition requirements and effectively correct various aberrations of the optical system, especially suitable for in-vehicle camera systems. It can capture distant objects, and the overall field of vision is enlarged. The functions of both the conventional telephoto lens and the conventional wide-angle lens can be realized by one lens, reducing the cost of the in-vehicle camera system and improving the actual performance of the lens.

This embodiment of the present disclosure differs from the first embodiment in the focal power of the second lens L2, and the focal power and structure of the sixth lens L6.

Tenth Embodiment

Figure 19:
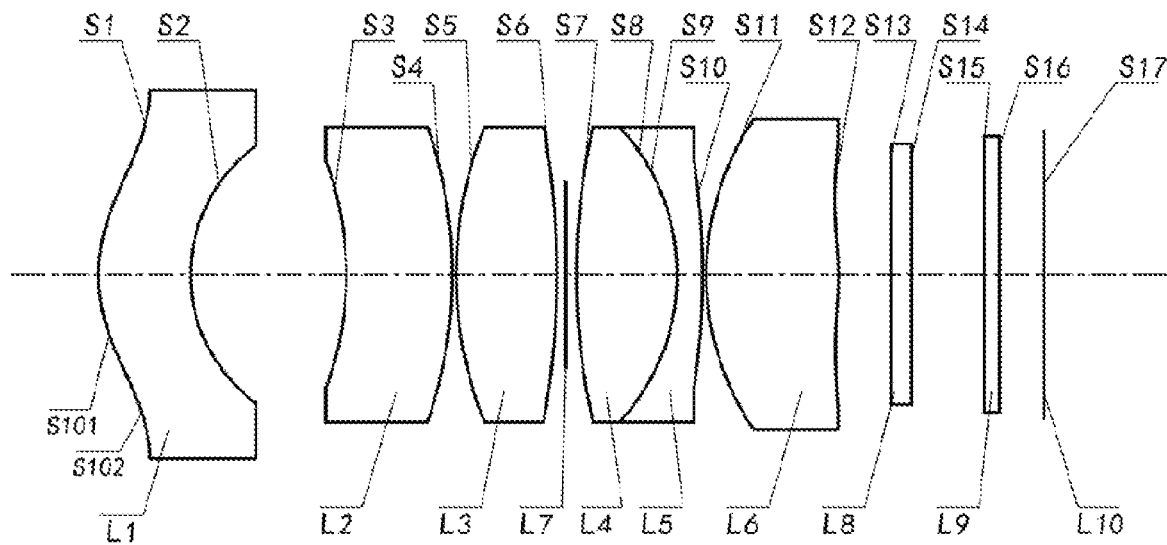
FIG. 19 is a structural schematic view of an optical lens according to a tenth embodiment of the present disclosure.
Figure 20:
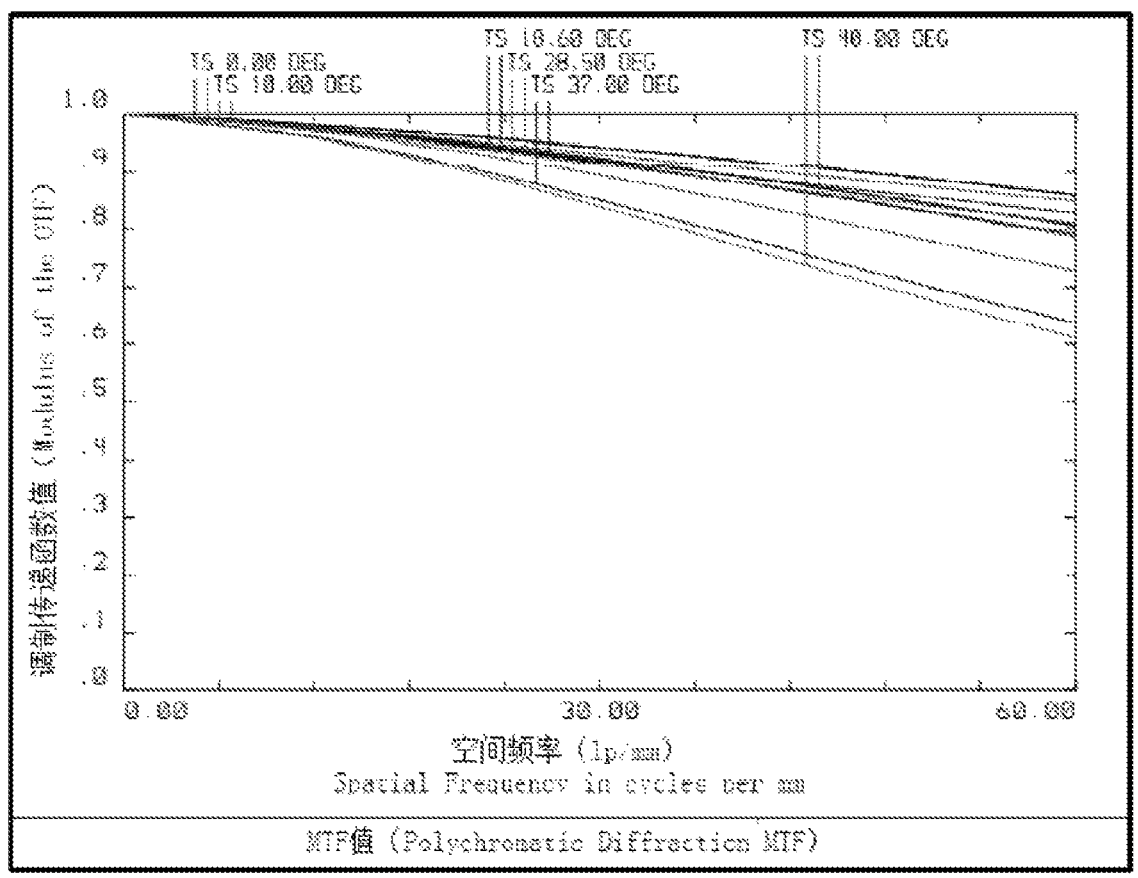
FIG. 20 is a MTF graph of the optical lens according to the tenth embodiment of the present disclosure.

Referring to FIGS. 19 and 20, an optical lens according to a tenth embodiment of the present disclosure is explained, wherein the optical lens includes at least one first lens L1, at least one second lens L2, a third lens L3, a fourth lens L4, a fifth lens L5 and a sixth lens L6. The first lens L1, the second lens L2, the third lens L3, the fourth lens L4, the fifth lens L5, and the sixth lens L6 are sequentially arranged along a direction from an object side to an image side.

The first lens L1 has a negative focal power, and the first lens L1 has an object surface S1 facing the object side and an image surface S2 facing the image side. According to this embodiment of the present disclosure, the object surface S1 of the first lens L1 is convex in order to increase the luminous flux of the optical lens. That is, the convex object surface S1 of the first lens L1 converges light at a larger angle to increase the luminous flux entering the optical lens from the object side. Preferably, the object surface S1 of the first lens L1 is an aspherical lens in order to reduce the processing difficulty. Of course, in other embodiments of the present disclosure, the first lens L1 may be a spherical lens.

Further, according to this embodiment of the present disclosure, the image surface S2 of the first lens L1 is concave. That is, the first lens L1 includes two surfaces S1 and S2, one of which is convex, and the other of which is concave. The concave surface and the convex surface form a meniscus shape, and the meniscus is convex toward the object side so as to increase the light entering the optical lens.

It should be noted that, in the imaging system lens group provided by the present disclosure, when the lens surface is convex and the position of the convex surface is not defined, it indicates that the lens surface is convex near the optical axis; When the lens surface is concave and the position of the concave surface is not defined, it indicates that the lens surface is concave near the optical axis.

The second lens L2 has an object surface S3 facing the object side and an image surface S4 facing the image side. According to this embodiment of the present disclosure, the image surface S4 of the second lens L2 is convex to facilitate proper divergence of light passing through the first lens L1 to be transmitted to the rear of the optical lens. The second lens L2 has a negative focal power. That is, the second lens L2 has an effect of transition light to smoothly transition the light of the first lens L1 to the third lens L3. Preferably, the second lens L2 is an aspherical lens so as to reduce the processing difficulty. Of course, in other embodiments of the present disclosure, the second lens L2 may be a spherical lens.

Further, according to this embodiment of the present disclosure, the object surface S3 of the second lens L2 is convex. That is, the second lens L2 includes two surfaces S3 and S4, one of which is convex and the other of which is concave. The convex surface and the concave surface form a meniscus shape, and the meniscus is convex toward the image side to facilitate divergence of light passing through the first lens L1 to be transmitted backward.

It is worth mentioning that the meniscus shapes of the first lens L1 and the second lens L2 are oppositely disposed to be close to a concentric circle structure, so that the optical lens has a smaller field of view, a larger focal length, and a higher angle resolution near the center.

The third lens L3 has an object surface S5 facing the object side, and an image surface S6 facing the image side. The object surface S5 and the image surface S6 of the third lens L3 both are convex to facilitate convergence of the light transmitted by the second lens L2 to be transmitted toward the rear of the optical lens. In other words, the third lens L3 is a biconvex lens having light transition and convergence effects.

According to this embodiment of the present disclosure, the third lens L3 has a positive focal power.

The fourth lens L4 and the fifth lens L5 form an achromatic lens group so as to reduce chromatic aberration of the light transmitted by the front components of the optical lens.

Referring to FIG. 19, the first lens L1, the second lens L2, the third lens L3, the fourth lens L4, the fifth lens L5, and the sixth lens L6 form a front lens group and a rear lens group, wherein the front lens group includes the first lens L1, the second lens L2, and the third lens L3, and the rear lens group includes the fourth lens L4, the fifth lens L5 and the sixth lens L6. The front lens group and the rear lens group are sequentially disposed along the direction from the object side to the image side.

Referring to FIG. 19, according to this embodiment of the present disclosure, the optical centers of the first lens L1, the second lens L2, the third lens L3, the fourth lens L4, the fifth lens L5 and the sixth lens L6 of the optical lens are coaxial. In other words, the principal optical axes of the first lens L1, the second lens L2, the third lens L3, the fourth lens L4, the fifth lens L5, and the sixth lens L6 of the optical lens are consistent.

Referring to FIG. 19, according to this embodiment of the present disclosure, the optical lens further includes a diaphragm L7, wherein the front lens group and the rear lens group are separately disposed on both sides of the diaphragm L7, and wherein the optical center of the diaphragm L7 is coaxial with the optical centers of the first lens L1, the second lens L2, the third lens L3, the fourth lens L4, the fifth lens L5 and the sixth lens L6. Preferably, the diaphragm L7 is disposed between the third lens L3 and the fourth lens L4.

It is worth mentioning that, referring to FIG. 19, in this embodiment of the present disclosure, the diaphragm L7 is disposed between the third lens L3 and the fourth lens L4 to reduce the stray light in the optical lens so that the optical lens have a good imaging effect. In other embodiments of the present disclosure, the diaphragm L7 may be disposed at other positions, for example, between the second lens L2 and the third lens L3, between the fourth lens L4 and the fifth lens L5, between the fifth lens L5 and the sixth lens L6 or the like. It should be understood by those skilled in the art that the position of the diaphragm L7 is not a limitation of the present disclosure. In other words, the front lens group is not limited to consist of the first lens L1, the second lens L2, and the third lens L3, and the rear lens group is not limited to consist of the fourth lens L4, the fifth lens L5, and the sixth lens L6. When the diaphragm L7 is disposed at different positions, the optical lens may form different front lens groups and rear lens groups.

As shown in FIG. 19, according to this embodiment of the present disclosure, the fourth lens L4 has an object surface S7 facing the object side and an image surface S8 facing the image side. Further, the object surface S7 of the fourth lens L4 is convex, and the image surface S8 of the fourth lens L4 is convex. In other words, the fourth lens L4 has two surfaces S7 and S8, which are two convex surfaces. The fourth lens L4 is a biconvex lens. Further, according to this embodiment of the present disclosure, the fourth lens L4 has a positive focal power.

According to this embodiment of the present disclosure, the fifth lens L5 has an object surface S9 facing the object side, and an image surface S10 facing the image side. Further, the object surface S9 of the fifth lens L5 is concave, and the image surface S10 of the fifth lens L5 is convex. In other words, the fifth lens L5 is a meniscus lens, and the meniscus is convex toward the image side. Further, according to this embodiment of the present disclosure, the fifth lens L5 has a negative focal power.

Further, the image surface S8 of the fourth lens L4 and the object surface S9 of the fifth lens L5 are disposed to face each other. In other words, the image surface S8 of the fourth lens L4 and the object surface S9 of the fifth lens L5 are disposed to face each other. In this embodiment, the convex surface of the fourth lens L4 and the concave surfaces of the fifth lens L5 are disposed to face each other.

According to this embodiment of the present disclosure, the sixth lens L6 has an object surface S11 facing the object side, and an image surface S12 facing the image side. Further, the object surface S1/ of the sixth lens L6 is convex, and the image surface S12 of the sixth lens L6 is convex. In other words, the sixth lens L6 is a biconvex lens. Further, the sixth lens L6 has a positive focal power. The aberration and distortion are further corrected by the sixth lens L6, so that the imaging quality of the optical lens is better.

It is worth mentioning that, in this embodiment of the present disclosure, the sixth lens L6 is used to appropriately increase the distortion of the lens edge of the front lenses of the optical lens, so that light at a large angle can reach the imaging plane L10 with a predetermined size, such as the photosensitive chip surface. Moreover, the image can be continuously corrected by software post-processing, so that the image formed by the light after passing through the sixth lens L6 is restored to normal, namely obtaining large-angle imaging.

According to this embodiment of the present disclosure, the optical lens further includes a plane lens L9 for protecting the optical lens by isolation. Of course, in other embodiments of the present disclosure, the plane lens L9 may not be provided, and the present disclosure is not limited in this respect.

Referring to FIG. 19, according to this embodiment of the present disclosure, the first lens L1 of the optical lens has a convex surface and a concave surface, and the second lens L2 has two convex surfaces, wherein the convex surface of the first lens L1 is disposed to face the object side, the concave surface of the first lens L1 is disposed to face the image side, the concave surface of the second lens L2 is disposed to face the object side, and the convex surface of the second lens L2 is disposed to face the image side. The third lens L3 has two convex surfaces facing the object side and the image side, respectively. The fourth lens L4 has two convex surfaces facing the object side and the image side, respectively, and the fifth lens L5 has a concave surface and a convex surface facing the object side and the image side, respectively, wherein the convex surface of the fourth lens L4 and the concave surface of the fifth lens L5 is oppositely disposed to face each other. The sixth lens L6 has two convex surfaces, which are disposed to face the object side and the image side, respectively.

According to this embodiment of the present disclosure, the achromatic lens group of the optical lens is preferably a glued lens. In other words, the fourth lens L4 and the fifth lens L5 are glued together to form the achromatic lens group. At this time, since the fourth lens L4 and the fifth lens L5 are glued together, the image surface S8 of the convex surface of the fourth lens L4 and the object surface S9 of the concave surface of the fifth lens L5 are disposed in a glued manner to face each other. Of course, in other embodiments of the present disclosure, the achromatic lens group may also be a separation-type achromatic lens group. It would be understood that when the achromatic lens group is a separation-type achromatic lens group, the fourth lens L4 and the fifth lens L5 are separately disposed.

It is worth mentioning that the first lens L1 and the second lens L2 may be made of a glass material, or may be made of other materials having good light transmission performance, such as plastics and resins. It would be understood by those skilled in the art that in the optical lens of the present disclosure, light enters from the first lens L1, and is transmitted to the second lens L2 after being converged by the first lens L1. Therefore, light at a large angle can be collected by the first lens L1. Further, the light reaches the second lens L2 after passing through the first lens L1, and the light converged by the first lens L1 is appropriately diverged by the second lens L2 to be transmitted to the rear of the optical lens. Therefore, the refractive indices Nd of the first lens L1 and the second lens L2 need to match with each other. However, it would be understood by those skilled in the art that the refractive indices Nd of the first lens L1 and the second lens L2 are not a limitation of the present disclosure. On the other hand, in the present disclosure, the first lens L1 and the second lens L2 are provided with an Abbe constant Vd, so that the lens has better image quality. However, it should be understood by those skilled in the art that the Abbe constants Vd of the first lens L1 and the second lens L2 are not a limitation of the present disclosure.

As shown in FIG. 19, it is a structural schematic view of the optical lens according to the tenth embodiment of the present disclosure. The optical lens includes, sequentially from the object side to the image side, a front lens group, a diaphragm L7, a rear lens group, a filter element L8, a plane lens L9, and an imaging plane L10.

Herein, the front lens group includes, sequentially from the object side to the image side: a first lens L1, a second lens L2, and a third lens L3, the first lens L1 being a meniscus lens having a negative focal power, the second lens L2 being a meniscus lens having a negative focal power, the concave surface of the first lens L1 being opposite to the concave surface of the second lens L2, and the third lens L3 being a biconvex lens having positive focal power; and the rear lens group includes, sequentially from the object side to the image side: a fourth lens L4, a fifth lens L5, and a sixth lens L6, the fourth lens L4 being a meniscus lens having a positive focal power, the fifth lens L5 being a biconvex lens having a negative focal power, and the concave surface of the fourth lens L4 being opposite to the convex surface of the fifth lens L5. Further, the concave surface of the fourth lens L4 and the convex surface of the fifth lens L5 are glued. The sixth lens L6 is a biconvex lens having a positive focal power.

In this embodiment, the first lens L1 satisfies the following condition: $0.5 \leq R1/(R2+d1) \leq 1.5$;
where R1 is a radius of curvature of the object surface S1 of the first lens L1, R2 is a radius of curvature of the image surface S2 of the first lens L1, and d1 is a center thickness of the first lens L1.

The second lens L2 satisfies the following condition: $0.45 \leq |R4|/(|R3|+d2) \leq 1.3$;
where R3 is a radius of curvature of the object surface S3 of the second lens L2, R4 is a radius of curvature of the image surface S4 of the second lens L2, and d2 is a center thickness of the second lens L2.

By the above conditions, the relationships between the respective radii of curvature and thickness of the first lens L1 and the second lens L2 are restricted so that the first lens L1 and the second lens L2 are close to a concentric circle. Therefore, when the concave surfaces of the first lens L1 and the second lens L2 are oppositely disposed, light at a large angle can be collected to enter the optical lens, and be appropriately diverged by the second lens L2 to be transmitted backward.

In this embodiment of the present disclosure, the focal length F1 of the first lens L1 and the overall focal length F of the optical lens satisfy the following condition: $-3.5 \leq F1/F \leq -1$.

The focal length F2 of the second lens L2 and the overall focal length F of the optical lens satisfy the following condition: $|F2/F| \geq 5.0$.

If the optical system of the optical lens has a total track length TTL, and the overall focal length of the optical lens is F, then $2.0 \leq TTL/F \leq 6.0$.

If the maximum field of view of the optical lens is FOVm and the image height corresponding to the maximum field of view of the optical lens is Ym, then $(FOVm \times F)/Ym \geq 45°$.

In this embodiment of the present disclosure, the first lens L1, the second lens L2, and the sixth lens L6 are aspherical lenses.

Preferably, the first lens L1, the second lens L2, and the sixth lens L6 are glass aspherical lenses, and the third lens L3, the fourth lens L4, and the fifth lens L5 are spherical lenses. It should be understood by those skilled in the art that the first lens L1, the second lens L2, and the sixth lens L6 are not limited to glass aspherical lenses, and may be plastic aspherical or spherical lenses or the like. The third lens L3, the fourth lens L4, and the fifth lens L5 are not limited to glass spherical lenses, and may be glass aspheric surfaces, plastic aspheric surfaces, resin aspheric surfaces or the like. The present disclosure is not limited in this respect. In particular, in some embodiments of the present disclosure, the optical lens is composed of six lenses consisting of three glass spherical surfaces and three glass aspheric surfaces. For example, the first lens L1, the second lens L2, and the sixth lens L6 are glass aspherical lenses, and the third lens L3, the fourth lens L4, and the fifth lens L5 are glass spherical lenses, so that the optical lens has the characteristics of a long focal length and a large field of view, and the resolution of the optical lens is ensured by the glass aspherical lenses while reducing chromatic aberration.

In this embodiment of the present disclosure, the first lens L1, the second lens L2, and the sixth lens L6 are aspherical lenses. The first lens L1 and the second lens L2 are close to the concentric lens, and are aspherical, so that light at a large angle can be effectively and smoothly converged, and due to the aspherical setting, the processing difficulty of the conventional spherical concentric lenses is avoided.

Further, in some embodiments, the object surface S1 of the first lens L1 has a central region S101 and an edge region S102 extending outwardly from the central region S101, the central region S101 of the object surface S1 of the first lens L1 is convex, and the edge region S102 of the object surface S1 of the first lens L1 is concave. It should be understood by those skilled in the art that the specific structure of the aspherical surface and the specific structures and ranges of the central and edge regions of the first lens L1 are not a limitation of the present disclosure.

The aspherical lens surfaces of the first lens L1, the second lens L2, and the sixth lens L6 satisfy the formula (1) given in the first embodiment.

As shown in FIG. 20, it is a graph of the optical performance of this embodiment of the present disclosure. It can be seen from the MTF graph of the optical lens that the optical lens has higher resolution and better optical performance.

Parameters of the optical lens of this embodiment of the present disclosure are as shown in Tables 19 and 20 below. It should be noted that the two surfaces, i.e. the object surface and the image surface, of the first lens L1, are S1 and S2, respectively, the two surfaces, i.e. the object surface and the image surface, of the second lens L2, are S3 and S4, respectively, the two surfaces, i.e. the object surface and the image surface, of the third lens L3, are S5 and S6, respectively, the two surfaces, i.e. the object surface and the image surface, of the fourth lens L4, are S7 and S8, respectively, the two surfaces, i.e. the object surface and the image surface, of the fifth lens L5, are S9 and S10, respectively, the two surfaces, i.e. the object surface and the image surface, of the sixth lens L6, are S11 and S12, respectively, the two surfaces of the filter element L8 are S13 and S14, respectively, the two surfaces of the plane lens L9 are S15 and S16, respectively, and the imaging plane is S17; and S1-S17 are in one-to-one correspondence with the surface numbers in Tables 19 and 20 below.

TABLE 19

Parameters of the optical lens of the tenth embodiment

| Surface No. | Radius of curvature R | Center thickness d | Refractive index Nd | Abbe constant Vd |
|---|---|---|---|---|
| 1 | 4.3692 | 2.4162 | 1.80 | 40.9 |
| 2 | 2.5522 | 3.8563 | | |
| 3 | −9.5378 | 2.8366 | 1.80 | 40.9 |
| 4 | −12.8901 | 0.1039 | | |
| 5 | 10.8564 | 4.1587 | 1.90 | 37.1 |
| 6 | −22.4014 | −0.1039 | | |
| 7 | Infinity | 0.2697 | | |
| 8 | 20.1697 | 2.3000 | 1.50 | 81.6 |
| 9 | −6.5194 | 0.6753 | 1.92 | 20.9 |
| 10 | −18.3936 | 0.1039 | | |
| 11 | 8.7592 | 3.9834 | 1.50 | 81.6 |
| 12 | −37.8285 | 1.5583 | | |
| 13 | Infinity | 0.5500 | 1.52 | 64.2 |
| 14 | Infinity | 1.2618 | | |
| 15 | Infinity | 0.4000 | 1.52 | 64.2 |
| 16 | Infinity | 1.2891 | | |
| 17 | Infinity | | | |

TABLE 20

Aspheric coefficients of the tenth embodiment

| Surface No. | K | A | B | C | D | E |
|---|---|---|---|---|---|---|
| 1 | −1.287151 | −6.4725E−03 | −1.3349E−04 | 1.2359E−05 | 1.6163E−07 | −3.3718E−09 |
| 2 | −1.946078 | −1.5948E−03 | −1.1736E−04 | 1.5427E−05 | −1.0285E−06 | 3.2996E−07 |
| 3 | −1.648267 | −7.1211E−04 | −3.8923E−05 | 9.7563E−07 | 1.2209E−07 | −5.6355E−09 |
| 4 | 1.536966 | −1.0649E−04 | −1.5640E−05 | 3.5054E−06 | −1.0721E−07 | −1.0554E−09 |
| 11 | −6.42357 | 8.4923E−05 | 6.6215E−05 | −6.3975E−06 | 1.3614E−07 | 4.9213E−09 |
| 12 | −3.5558E+15 | −8.3382E−05 | 1.5449E−05 | −6.9922E−06 | 2.7355E−07 | −4.5369E−09 |

Based on the above data, the numerical values of the formulas involved in this embodiment are calculated as follows:
R1/(R2+d1)=0.879, |R4|/(|R3|+d2)=1.042, F1/F=−2.803, |F2|/F=10.922, TTL/F=3.842, (FOVm×F)/Ym=46.241°. As shown in Tables 19 and 20, in this embodiment, as a set of specific embodiment parameters, the optical lenses with these parameters can achieve better optical performance, have a longer overall focal length, and have a larger field of view.

In summary, the optical lens of the present disclosure can satisfy the requirements of miniaturization and realize a long focal length, a large field of view, and a large aperture through the design of the six-lens structure and aspherical lenses close to a concentric circle. Moreover, it can meet the high definition requirements and effectively correct various aberrations of the optical system, especially suitable for in-vehicle camera systems. It can capture distant objects, and the overall field of vision is enlarged. The functions of both the conventional telephoto lens and the conventional wide-angle lens can be realized by one lens, reducing the cost of the in-vehicle camera system and improving the actual performance of the lens.

This embodiment of the present disclosure differs from the first embodiment in the focal power and structure of the fourth lens L4, and the focal power and structure of the fifth lens L5.

Eleventh Embodiment

Figure 21:
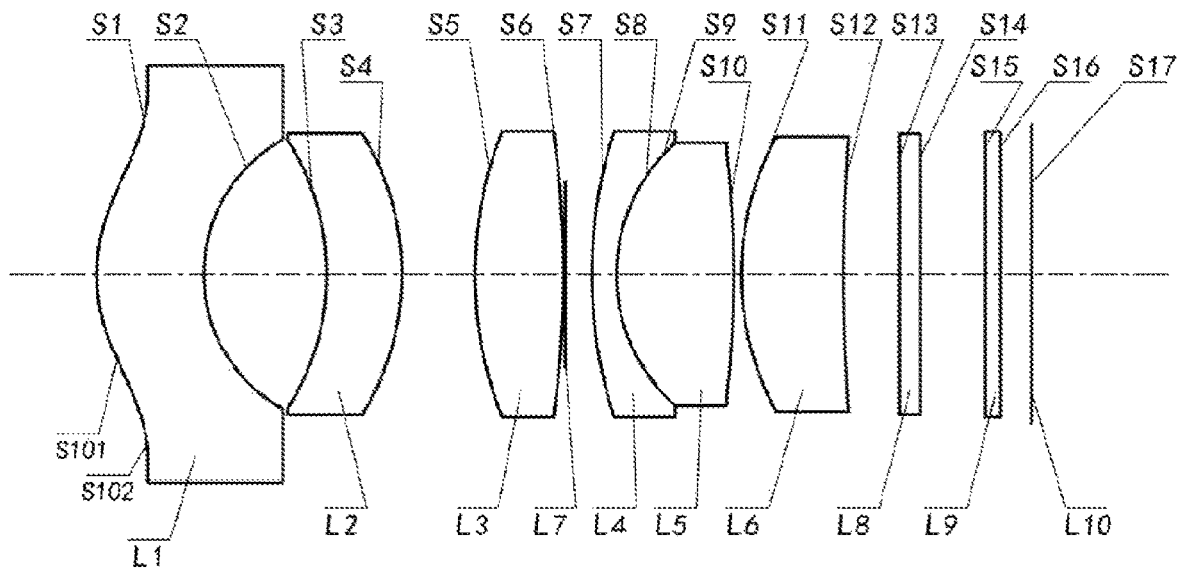
FIG. 21 is a structural schematic view of an optical lens according to an eleventh embodiment of the present disclosure.
Figure 22:
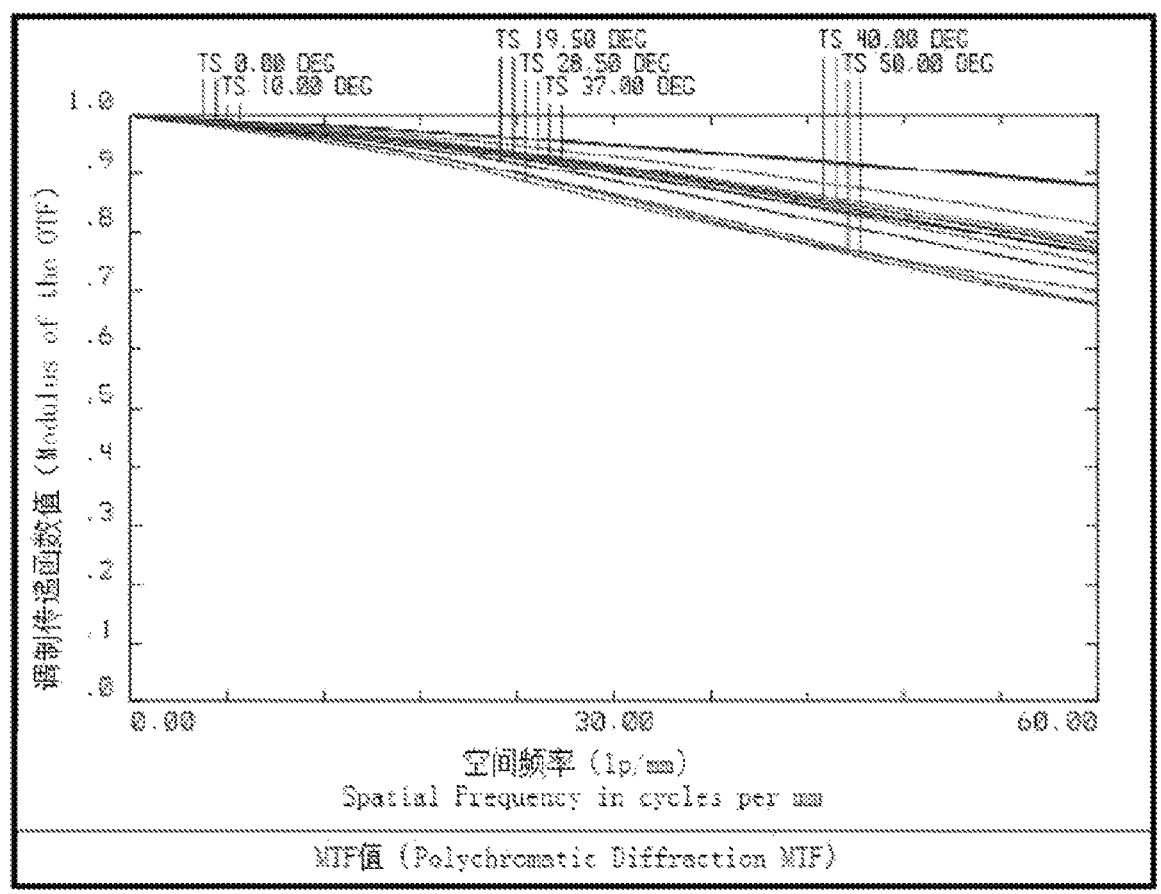
FIG. 22 is a MTF graph of the optical lens according to the eleventh embodiment of the present disclosure.

Referring to FIGS. 21 and 22, an optical lens according to an eleventh embodiment of the present disclosure is explained, wherein the optical lens includes at least one first lens L1, at least one second lens L2, a third lens L3, a fourth lens L4, a fifth lens L5 and a sixth lens L6. The first lens L1, the second lens L2, the third lens L3, the fourth lens L4, the fifth lens L5, and the sixth lens L6 are sequentially arranged along a direction from an object side to an image side.

The first lens L1 has a negative focal power, and the first lens L1 has an object surface S1 facing the object side and an image surface S2 facing the image side. According to this embodiment of the present disclosure, the object surface S1 of the first lens L1 is convex in order to increase the luminous flux of the optical lens. That is, the convex object surface S1 of the first lens L1 converges light at a larger angle to increase the luminous flux entering the optical lens from the object side. Preferably, the object surface S1 of the first lens L1 is an aspherical lens in order to reduce the processing difficulty. Of course, in other embodiments of the present disclosure, the first lens L1 may be a spherical lens.

Further, according to this embodiment of the present disclosure, the image surface S2 of the first lens L1 is concave. That is, the first lens L1 includes two surfaces S1 and S2, one of which is convex, and the other of which is concave. The concave surface and the convex surface form a meniscus shape, and the meniscus is convex toward the object side so as to increase the light entering the optical lens.

It should be noted that, in the imaging system lens group provided by the present disclosure, when the lens surface is convex and the position of the convex surface is not defined, it indicates that the lens surface is convex near the optical axis; When the lens surface is concave and the position of the concave surface is not defined, it indicates that the lens surface is concave near the optical axis.

The second lens L2 has an object surface S3 facing the object side and an image surface S4 facing the image side. According to this embodiment of the present disclosure, the image surface S4 of the second lens L2 is convex to facilitate proper divergence of light passing through the first lens L1 to be transmitted to the rear of the optical lens. The second lens L2 has a positive focal power. That is, the second lens L2 has an effect of transition light to smoothly transition the light of the first lens L1 to the third lens L3. Preferably, the second lens L2 is an aspherical lens so as to reduce the processing difficulty. Of course, in other embodiments of the present disclosure, the second lens L2 may be a spherical lens.

Further, according to this embodiment of the present disclosure, the object surface S3 of the second lens L2 is convex. That is, the second lens L2 includes two surfaces S3 and S4, one of which is convex and the other of which is concave. The convex surface and the concave surface form a meniscus shape, and the meniscus is convex toward the image side to facilitate divergence of light passing through the first lens L1 to be transmitted backward.

It is worth mentioning that the meniscus shapes of the first lens L1 and the second lens L2 are oppositely disposed to be close to a concentric circle structure, so that the optical lens has a smaller field of view, a larger focal length, and a higher angle resolution near the center.

The third lens L3 has an object surface S5 facing the object side, and an image surface S6 facing the image side. The object surface S5 and the image surface S6 of the third lens L3 both are convex to facilitate convergence of the light transmitted by the second lens L2 to be transmitted toward the rear of the optical lens. In other words, the third lens L3 is a biconvex lens having light transition and convergence effects.

According to this embodiment of the present disclosure, the third lens L3 has a positive focal power.

The fourth lens L4 and the fifth lens L5 form an achromatic lens group so as to reduce chromatic aberration of the light transmitted by the front components of the optical lens.

Referring to FIG. 21, the first lens L1, the second lens L2, the third lens L3, the fourth lens L4, the fifth lens L5, and the sixth lens L6 form a front lens group and a rear lens group, wherein the front lens group includes the first lens L1, the second lens L2, and the third lens L3, and the rear lens group includes the fourth lens L4, the fifth lens L5 and the sixth lens L6. The front lens group and the rear lens group are sequentially disposed along the direction from the object side to the image side.

Referring to FIG. 21, according to this embodiment of the present disclosure, the optical centers of the first lens L1, the second lens L2, the third lens L3, the fourth lens L4, the fifth lens L5 and the sixth lens L6 of the optical lens are coaxial. In other words, the principal optical axes of the first lens L1, the second lens L2, the third lens L3, the fourth lens L4, the fifth lens L5, and the sixth lens L6 of the optical lens are consistent.

Referring to FIG. 21, according to this embodiment of the present disclosure, the optical lens further includes a diaphragm L7, wherein the front lens group and the rear lens group are separately disposed on both sides of the diaphragm L7, and wherein the optical center of the diaphragm L7 is coaxial with the optical centers of the first lens L1, the second lens L2, the third lens L3, the fourth lens L4, the fifth lens L5 and the sixth lens L6. Preferably, the diaphragm L7 is disposed between the third lens L3 and the fourth lens L4.

It is worth mentioning that, referring to FIG. 21, in this embodiment of the present disclosure, the diaphragm L7 is disposed between the third lens L3 and the fourth lens L4 to reduce the stray light in the optical lens so that the optical lens have a good imaging effect. In other embodiments of the present disclosure, the diaphragm L7 may be disposed at other positions, for example, between the second lens L2 and the third lens L3, between the fourth lens L4 and the fifth lens L5, between the fifth lens L5 and the sixth lens L6 or the like. It should be understood by those skilled in the art that the position of the diaphragm L7 is not a limitation of the present disclosure. In other words, the front lens group is not limited to consist of the first lens L1, the second lens L2, and the third lens L3, and the rear lens group is not limited to consist of the fourth lens L4, the fifth lens L5, and the sixth lens L6. When the diaphragm L7 is disposed at different positions, the optical lens may form different front lens groups and rear lens groups.

As shown in FIG. 21, according to this embodiment of the present disclosure, the fourth lens L4 has an object surface S7 facing the object side and an image surface S8 facing the image side. Further, the object surface S7 of the fourth lens L4 is convex, and the image surface S8 of the fourth lens L4 is concave. In other words, the fourth lens L4 has two surfaces S7 and S8, which are a convex surface and a concave surface, respectively, the convex surface and the concave surface form a meniscus shape, and the meniscus is convex toward the object side. Further, according to this embodiment of the present disclosure, the fourth lens L4 has a negative focal power.

According to this embodiment of the present disclosure, the fifth lens L5 has an object surface S9 facing the object side, and an image surface S10 facing the image side. Further, the object surface S9 of the fifth lens L5 is convex, and the image surface S10 of the fifth lens L5 is convex. In other words, the fifth lens L5 is a biconvex lens. Further, according to this embodiment of the present disclosure, the fifth lens L5 has a positive focal power.

Further, the image surface S8 of the fourth lens L4 and the object surface S9 of the fifth lens L5 are disposed to face each other. In other words, the image surface S8 of the fourth lens L4 and the object surface S9 of the fifth lens L5 are disposed to face each other. In this embodiment, the concave surface of the fourth lens L4 and the convex surfaces of the fifth lens L5 are disposed to face each other.

According to this embodiment of the present disclosure, the sixth lens L6 has an object surface S11 facing the object side, and an image surface S12 facing the image side. Further, the object surface S11 of the sixth lens L6 is convex, and the image surface S12 of the sixth lens L6 is concave. In other words, the sixth lens L6 is a meniscus lens, and the meniscus is convex toward the object side. Further, the sixth lens L6 has a positive focal power. The aberration and distortion are further corrected by the sixth lens L6, so that the imaging quality of the optical lens is better.

It is worth mentioning that, in this embodiment of the present disclosure, the sixth lens L6 is used to appropriately increase the distortion of the lens edge of the front lenses of the optical lens, so that light at a large angle can reach the imaging plane L10 with a predetermined size, such as the photosensitive chip surface. Moreover, the image can be continuously corrected by software post-processing, so that the image formed by the light after passing through the sixth lens L6 is restored to normal, namely obtaining large-angle imaging.

According to this embodiment of the present disclosure, the optical lens further includes a plane lens L9 for protecting the optical lens by isolation. Of course, in other embodiments of the present disclosure, the plane lens L9 may not be provided, and the present disclosure is not limited in this respect.

Referring to FIG. 21, according to this embodiment of the present disclosure, the first lens L1 of the optical lens has a convex surface and a concave surface, and the second lens L2 has a concave surface and a convex surface, wherein the convex surface of the first lens L1 is disposed to face the object side, the concave surface of the first lens L1 is disposed to face the image side, the concave surface of the second lens L2 is disposed to face the object side, and the convex surface of the second lens L2 is disposed to face the image side. The third lens L3 has two convex surfaces facing the object side and the image side, respectively. The fourth lens L4 has a convex surface and a concave surface facing the object side and the image side, respectively, and the fifth lens L5 has two convex surfaces facing the object side and the image side, respectively, wherein the concave surface of the fourth lens L4 and the convex surface of the fifth lens L5 is oppositely disposed to face each other. The sixth lens L6 has a convex surface and a concave surface, which are disposed to face the object side and the image side, respectively.

According to this embodiment of the present disclosure, the achromatic lens group of the optical lens is preferably a glued lens. In other words, the fourth lens L4 and the fifth lens L5 are glued together to form the achromatic lens group. At this time, since the fourth lens L4 and the fifth lens L5 are glued together, the image surface S8 of the concave surface of the fourth lens L4 and the object surface S9 of the convex surface of the fifth lens L5 are disposed in a glued manner to face each other. Of course, in other embodiments of the present disclosure, the achromatic lens group may also be a separation-type achromatic lens group. It would be understood that when the achromatic lens group is a separation-type achromatic lens group, the fourth lens L4 and the fifth lens L5 are separately disposed.

It is worth mentioning that the first lens L1 and the second lens L2 may be made of a glass material, or may be made of other materials having good light transmission performance, such as plastics and resins. It would be understood by those skilled in the art that in the optical lens of the present disclosure, light enters from the first lens L1, and is transmitted to the second lens L2 after being converged by the first lens L1. Therefore, light at a large angle can be collected by the first lens L1. Further, the light reaches the second lens L2 after passing through the first lens L1, and the light converged by the first lens L1 is appropriately diverged by the second lens L2 to be transmitted to the rear of the optical lens. Therefore, the refractive indices Nd of the first lens L1 and the second lens L2 need to match with each other. However, it would be understood by those skilled in the art that the refractive indices Nd of the first lens L1 and the second lens L2 are not a limitation of the present disclosure. On the other hand, in the present disclosure, the first lens L1 and the second lens L2 are provided with an Abbe constant Vd, so that the optical lens has better image quality. However, it should be understood by those skilled in the art that the Abbe constants Vd of the first lens L1 and the second lens L2 are not a limitation of the present disclosure.

As shown in FIG. 21, it is a structural schematic view of the optical lens according to the eleventh embodiment of the present disclosure. The optical lens includes, sequentially from the object side to the image side, a front lens group, a diaphragm L7, a rear lens group, a filter element L8, a plane lens L9, and an imaging plane L10.

Herein, the front lens group includes, sequentially from the object side to the image side: a first lens L1, a second lens L2, and a third lens L3, the first lens L1 being a meniscus lens having a negative focal power, the second lens L2 being a meniscus lens having a positive focal power, the concave surface of the first lens L1 being opposite to the concave surface of the second lens L2, and the third lens L3 being a biconvex lens having positive focal power; and the rear lens group includes, sequentially from the object side to the image side: a fourth lens L4, a fifth lens L5, and a sixth lens L6, the fourth lens L4 being a meniscus lens having a negative focal power, the fifth lens L5 being a biconvex lens having a positive focal power, and the concave surface of the fourth lens L4 being opposite to the convex surface of the fifth lens L5. Further, the concave surface of the fourth lens L4 and the convex surface of the fifth lens L5 are glued. The sixth lens L6 is a meniscus lens having a positive focal power.

In this embodiment, the first lens L1 satisfies the following condition: $0.5 \leq R1/(R2+d1) \leq 1.5$;
where R1 is a radius of curvature of the object surface S1 of the first lens L1, R2 is a radius of curvature of the image surface S2 of the first lens L1, and d1 is a center thickness of the first lens L1.

The second lens L2 satisfies the following condition: $0.45 \leq |R4|/(|R3|+d2) \leq 1.3$;
where R3 is a radius of curvature of the object surface S3 of the second lens L2, R4 is a radius of curvature of the image surface S4 of the second lens L2, and d2 is a center thickness of the second lens L2.

By the above conditions, the relationships between the respective radii of curvature and thickness of the first lens L1 and the second lens L2 are restricted so that the first lens L1 and the second lens L2 are close to a concentric circle. Therefore, when the concave surfaces of the first lens L1 and the second lens L2 are oppositely disposed, light at a large angle can be collected to enter the optical lens, and be appropriately diverged by the second lens L2 to be transmitted backward.

In this embodiment of the present disclosure, the focal length F1 of the first lens L1 and the overall focal length F of the optical lens satisfy the following condition: $-3.5 \leq F1/F \leq -1$.

The focal length F2 of the second lens L2 and the overall focal length F of the optical lens satisfy the following condition: $|F2/F| \geq 5.0$.

If the optical system of the optical lens has a total track length TTL, and the overall focal length of the optical lens is F, then $2.0 \leq TTL/F \leq 6.0$.

If the maximum field of view of the optical lens is FOVm and the image height corresponding to the maximum field of view of the optical lens is Ym, then $(FOVm \times F)/Ym \geq 45°$.

In this embodiment of the present disclosure, the first lens L1 and the second lens L2 are aspherical lenses, and the sixth lens L6 is a spherical lens.

Preferably, the first lens L1 and the second lens L2 are glass aspherical lenses, and the third lens L3, the fourth lens L4, the fifth lens L5 and the sixth lens L6 are spherical lenses. It should be understood by those skilled in the art that the first lens L1 and the second lens L2 are not limited to glass aspherical lenses, and may be plastic aspherical or spherical lenses or the like. The third lens L3, the fourth lens L4, the fifth lens L5, and the sixth lens L6 are not limited to glass spherical lenses, and may be glass aspheric surfaces, plastic aspheric surfaces, resin aspheric surfaces or the like. The present disclosure is not limited in this respect. In particular, in some embodiments of the present disclosure, the optical lens is composed of six lenses consisting of four glass spherical surfaces and two glass aspheric surfaces. For example, the first lens L1 and the second lens L2 are glass aspherical lenses, and the third lens L3, the fourth lens L4, the fifth lens L5, and the sixth lens L6 are glass spherical lenses, so that the optical lens has the characteristics of a long focal length and a large field of view, and the resolution of the optical lens is ensured by the glass aspherical lenses while reducing chromatic aberration.

In this embodiment of the present disclosure, the first lens L1 and the second lens L2 are aspherical lenses, and the sixth lens L6 is a spherical lens. The first lens L1 and the second lens L2 are close to the concentric lens, and are aspherical, so that light at a large angle can be effectively and smoothly converged, and due to the aspherical setting, the processing difficulty of the conventional spherical concentric lenses is avoided.

Further, in some embodiments, the object surface S1 of the first lens L1 has a central region S101 and an edge region S102 extending outwardly from the central region S101, the central region S101 of the object surface S1 of the first lens L1 is convex, and the edge region S102 of the object surface S1 of the first lens L1 is concave. It should be understood by those skilled in the art that the specific structure of the aspherical surface and the specific structures and ranges of the central and edge regions of the first lens L1 are not a limitation of the present disclosure.

The aspherical lens surfaces of the first lens L1 and the second lens L2 satisfy the formula (1) given in the first embodiment.

TABLE 21

Parameters of the optical lens of the eleventh embodiment

| Surface No. | Radius of curvature R | Center thickness d | Refractive index Nd | Abbe constant Vd |
|---|---|---|---|---|
| 1 | 4.5123 | 2.8542 | 1.59 | 61.2 |
| 2 | 2.0011 | 3.2789 | | |
| 3 | −8.9864 | 2.0040 | 1.59 | 61.2 |
| 4 | −7.5487 | 1.9445 | | |
| 5 | 10.3445 | 2.3543 | 1.90 | 37.1 |
| 6 | −28.3461 | −0.0602 | | |
| 7 | Infinity | 0.8204 | | |
| 8 | 13.5466 | 0.6518 | 1.92 | 20.9 |
| 9 | 4.8251 | 3.1282 | 1.50 | 81.6 |
| 10 | −26.8576 | 0.2005 | | |
| 11 | 7.7329 | 2.7170 | 1.50 | 81.6 |
| 12 | 45.8171 | 1.5041 | | |
| 13 | Infinity | 0.5515 | 1.52 | 64.2 |
| 14 | Infinity | 1.0027 | | |
| 15 | Infinity | 0.4011 | 1.52 | 64.2 |
| 16 | Infinity | 0.8281 | | |
| 17 | Infinity | | | |

TABLE 22

Aspheric coefficients of the eleventh embodiment

| Surface No. | K | A | B | C | D | E |
|---|---|---|---|---|---|---|
| 1 | −2.436562 | −1.5670E−03 | −1.8242E−04 | 3.3840E−06 | 8.7904E−08 | −2.8099E−09 |
| 2 | −2.934329 | −2.1007E−03 | −1.4025E−03 | 1.4893E−04 | −1.4763E−06 | 2.4676E−08 |
| 3 | 1.727415 | −1.1578E−03 | −8.1327E−05 | −2.7747E−05 | 4.6566E−06 | −1.6485E−07 |
| 4 | 1.195293 | −2.5272E−03 | −8.8916E−05 | 7.3705E−05 | 2.9740E−07 | −2.3993E−08 |

As shown in FIG. 22, it is a graph of the optical performance of this embodiment of the present disclosure. It can be seen from the MTF graph of the optical lens that the optical lens has higher resolution and better optical performance.

Parameters of the optical lens of this embodiment of the present disclosure are as shown in Tables 21 and 22 below. It should be noted that the two surfaces, i.e. the object surface and the image surface, of the first lens L1, are S1 and S2, respectively, the two surfaces, i.e. the object surface and the image surface, of the second lens L2, are S3 and S4, respectively, the two surfaces, i.e. the object surface and the image surface, of the third lens L3, are S5 and S6, respectively, the two surfaces, i.e. the object surface and the image surface, of the fourth lens L4, are S7 and S8, respectively, the two surfaces, i.e. the object surface and the image surface, of the fifth lens L5, are S9 and S10, respectively, the two surfaces, i.e. the object surface and the image surface, of the sixth lens L6, are S11 and S12, respectively, the two surfaces of the filter element L8 are S13 and S14, respectively, the two surfaces of the plane lens L9 are S15 and S16, respectively, and the imaging plane is S17; and S1-S17 are in one-to-one correspondence with the surface numbers in Tables 21 and 22 below.

Based on the above data, the numerical values of the formulas involved in this embodiment are calculated as follows:

$R1/(R2+d1)=0.929$, $|R4|/(|R3|+d2)=0.687$, $F1/F=-1.652$, $|F2|/F=8.247$ $TTL/F=3.795$, $(FOVm \times F)/Ym=93.684°$. As shown in Tables 21 and 22, in this embodiment, as a set of specific embodiment parameters, the optical lenses with these parameters can achieve better optical performance, have a longer overall focal length, and have a larger field of view.

In summary, the optical lens of the present disclosure can satisfy the requirements of miniaturization and realize a long focal length, a large field of view, and a large aperture through the design of the six-lens structure and aspherical lenses close to a concentric circle. Moreover, it can meet the high definition requirements and effectively correct various aberrations of the optical system, especially suitable for in-vehicle camera systems. It can capture distant objects, and the overall field of vision is enlarged. The functions of both the conventional telephoto lens and the conventional wide-angle lens can be realized by one lens, reducing the cost of the in-vehicle camera system and improving the actual performance of the lens.

This embodiment of the present disclosure differs from the first embodiment in the focal power of the second lens L2, and the structure of the sixth lens L6.

It should be understood by those skilled in the art that the embodiments of the present disclosure described in the above description and the accompanying drawings are only exemplary and not limiting to the present disclosure. The objects of the present disclosure have been achieved completely and efficiently. The function and structural principles of the present disclosure have been shown and described in the embodiments, and the embodiments of the present disclosure may be varied or modified without departing from the principles.

The invention claimed is:

1. An optical lens, comprising:
a first lens, the first lens having a negative focal power, an object surface of the first lens being convex and an image surface of the first lens being concave;
a second lens, an object surface of the second lens being concave and an image surface of the second lens being convex;
a third lens, the third lens having a positive focal power, an object surface of the third lens being convex and an image surface of the third lens being convex;
a fourth lens;
a fifth lens; and
a sixth lens,
wherein a maximum field of view FOVm of the optical lens, an overall focal length F of the optical lens and an image height Ym corresponding to the maximum field of view of the optical lens satisfy:
(FOVm×F)/Ym≥58.952°; and
wherein the fourth lens and the fifth lens are glued to each other.

2. The optical lens according to claim 1, wherein the second lens has a negative focal power.

3. The optical lens according to claim 1, wherein the second lens has a positive focal power.

4. The optical lens according to claim 1, wherein the fourth lens has a negative focal power, an object side surface of the fourth lens is concave and an image side surface of the fourth lens is concave.

5. The optical lens according to claim 1, wherein the fourth lens has a negative focal power, an object side surface of the fourth lens is convex and an image side surface of the fourth lens is concave.

6. The optical lens according to claim 1, wherein the fourth lens has a positive focal power, an object side surface of the fourth lens is convex and an image side surface of the fourth lens is convex.

7. The optical lens according to claim 1, wherein the fifth lens has a positive focal power, an object side surface of the fifth lens is convex and an image side surface of the fifth lens is convex.

8. The optical lens according to claim 1, wherein the fifth lens has a positive focal power, an object side surface of the fifth lens is convex and an image side surface of the fifth lens is concave.

9. The optical lens according to claim 1, wherein the fifth lens has a negative focal power, an object side surface of the fifth lens is concave and an image side surface of the fifth lens is convex.

10. The optical lens according to claim 1, wherein the sixth lens has a positive focal power, an object side surface of the sixth lens is convex and an image side surface of the sixth lens is convex.

11. The optical lens according to claim 1, wherein the sixth lens has a positive focal power, an object side surface of the sixth lens is convex and an image side surface of the sixth lens is concave.

12. The optical lens according to claim 1, wherein the sixth lens has a negative focal power, an object side surface of the sixth lens is concave and an image side surface of the sixth lens is convex.

13. The optical lens according to claim 1, wherein the sixth lens has a negative focal power, an object side surface of the sixth lens is concave and an image side surface of the sixth lens is concave.

14. The optical lens according to claim 1, wherein the fourth lens and the fifth lens forms an achromatic lens group, and one of them has a positive focal power and the other has a negative focal power.

15. The optical lens according to claim 1, wherein a radius of curvature R1 of the object surface of the first lens, a radius of curvature R2 of the image surface of the first lens, and a center thickness d1 of the first lends satisfy: $0.5 \leq R1/(R2+d1) \leq 1.198$.

16. The optical lens according to claim 1, wherein a radius of curvature R1 of the object surface of the first lens, a radius of curvature R2 of the image surface of the first lens, and a center thickness d1 of the first lens satisfy: $0.5 \leq R1/(R2+d1) \leq 1.5$.

17. The optical lens according to claim 1, wherein a radius of curvature R3 of the object surface of the second lens, a radius of curvature R4 of the image surface of the second lens, and a center thickness d2 of the second lens satisfy: $0.45 \leq |R4|/(|R3|+d2) \leq 1.3$.

18. The optical lens according to claim 1, wherein a focal length F1 of the first lens and an overall focal length F of the optical lens satisfy: $-3.5 \leq F1/F \leq -1$.

19. The optical lens according to claim 1, wherein a focal length F2 of the second lens and an overall focal length F of the optical lens satisfy: $|F2/F| \geq 5$.

20. The optical lens according to claim 1, wherein a total track length TTL of an optical system of the optical lens and an overall focal length F of the optical lens satisfy: $2.0 \leq TTL/F \leq 6.0$.

21. The optical lens according to claim 1, wherein a focal length F2 of the second lens and an overall focal length F of the optical lens satisfy: $|F2/F| \geq 8.247$; or wherein a total track length TTL of an optical system of the optical lens and an overall focal length F of the optical lens satisfy: $3.541 \leq TTL/F \leq 6.0$.

* * * * *